(12) United States Patent
Tsutsui et al.

(10) Patent No.: US 9,902,139 B2
(45) Date of Patent: Feb. 27, 2018

(54) HEAT SEALABLE PRINTING SHEET

(71) Applicant: CANON FINETECH INC., Misato-shi (JP)

(72) Inventors: Takahiro Tsutsui, Matsudo (JP); Yusuke Sumikawa, Kashiwa (JP); Hiromitsu Hirabayashi, Yokohama (JP)

(73) Assignee: Canon Finetech Nisca, Inc., Misato-shi (JP)

( * ) Notice: Subject to any disclaimer, the term of this patent is extended or adjusted under 35 U.S.C. 154(b) by 0 days.

(21) Appl. No.: 15/078,492

(22) Filed: Mar. 23, 2016

(65) Prior Publication Data

US 2016/0288468 A1   Oct. 6, 2016

(30) Foreign Application Priority Data

Mar. 30, 2015 (JP) ................................. 2015-068370
Jan. 7, 2016 (JP) ................................. 2016-001682

(51) Int. Cl.
| | |
|---|---|
| *B32B 27/36* | (2006.01) |
| *B41M 5/50* | (2006.01) |
| *B41M 5/52* | (2006.01) |

(52) U.S. Cl.
CPC ............. *B32B 27/36* (2013.01); *B41M 5/504* (2013.01); *B41M 5/52* (2013.01); *B32B 2323/10* (2013.01); *B32B 2519/00* (2013.01); *B41M 5/506* (2013.01); *B41M 5/5218* (2013.01); *B41M 5/5254* (2013.01)

(58) Field of Classification Search
CPC ... B41M 5/506; B41M 5/5218; B41M 5/5254
See application file for complete search history.

(56) References Cited

U.S. PATENT DOCUMENTS

| | | | |
|---|---|---|---|
| 6,248,432 B1 * | 6/2001 | Moronuki | B41M 5/52 428/32.22 |
| 6,852,379 B2 | 2/2005 | Kasahara | |
| 9,056,996 B2 | 6/2015 | Himura et al. | |

(Continued)

FOREIGN PATENT DOCUMENTS

| | | |
|---|---|---|
| EP | 0 600 245 A1 | 6/1994 |
| JP | S56-120508 A | 9/1981 |

(Continued)

OTHER PUBLICATIONS

Oct. 10, 2016 European Search Report in European Patent Appln. No. 16162542.1.

(Continued)

*Primary Examiner* — Betelhem Shewareged
(74) *Attorney, Agent, or Firm* — Fitzpatrick, Cella, Harper & Scinto

(57) ABSTRACT

A heat sealable printing sheet includes a sheet-shaped base member, and an ink receiving layer disposed on a first surface of the base member and having a heat sealability. The heat sealable printing sheet further includes a heat sealable layer disposed on a second surface of the base member and made of a heat sealable resin material. The ink receiving layer contains inorganic fine particles, a water soluble resin, and a water dispersible resin. The water dispersible resin has a glass transition temperature (Tg) satisfying $-35°\,C. \leq Tg \leq 35°\,C.$

4 Claims, 33 Drawing Sheets

(56) References Cited

U.S. PATENT DOCUMENTS

| | | | |
|---|---|---|---|
| 9,278,527 B2 | 3/2016 | Aratani et al. | |
| 2003/0219611 A1* | 11/2003 | Barcock | B41M 5/5245 |
| | | | 428/507 |
| 2006/0028527 A1* | 2/2006 | Kaga | B41M 5/508 |
| | | | 347/105 |
| 2006/0281847 A1 | 12/2006 | Furutachi et al. | |
| 2014/0313265 A1 | 10/2014 | Himura et al. | |
| 2015/0042737 A1 | 2/2015 | Tsutsui et al. | |
| 2015/0070437 A1 | 3/2015 | Sumikawa et al. | |

FOREIGN PATENT DOCUMENTS

| | | |
|---|---|---|
| JP | H10-166720 A | 6/1998 |
| JP | H10-226186 A | 8/1998 |
| JP | H10-244749 A | 9/1998 |
| JP | 2001-205920 | 7/2001 |
| JP | 2003-159872 | 6/2003 |
| JP | 2004-130535 | 4/2004 |
| JP | 2005-349797 | 12/2005 |
| JP | 2007-286152 | 11/2007 |
| WO | 2015/038108 A1 | 3/2015 |

OTHER PUBLICATIONS

Gulari, et al., "Photon correlation spectroscopy of particle distributions," J. Chem. Phys., 70(8), Apr. 15, 1979, 3965-3972.

Feb. 21, 2017 Japanese Official Action in Japanese Patent Application No. 2016-001682.

* cited by examiner

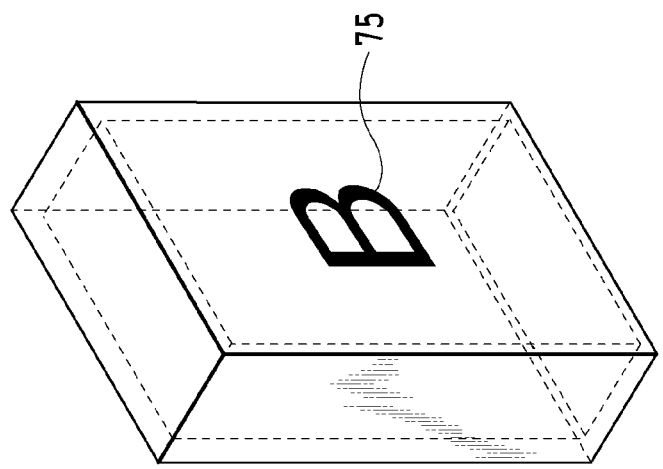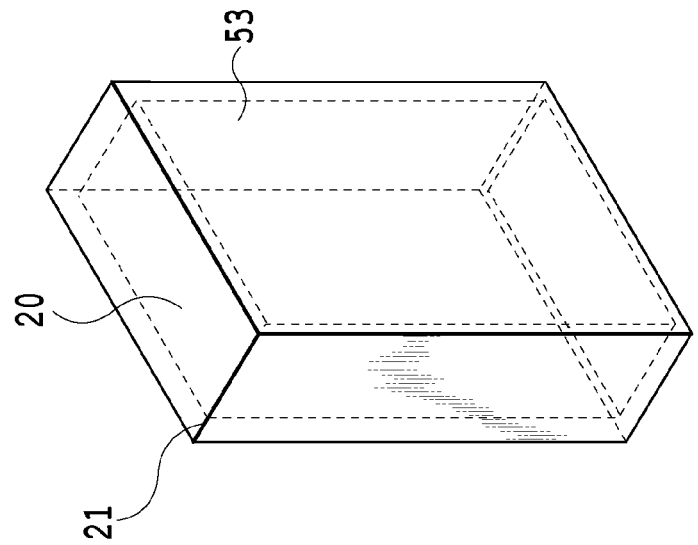
FIG.5

HEAT SEALABLE PRINTING SHEET

BACKGROUND OF THE INVENTION

Field of the Invention

The present invention relates to a heat sealable printing sheet including a sheet-shaped base member, an ink receiving layer having a heat sealability, and a heat sealable layer.

Description of the Related Art

Heretofore, wrapped articles have been widely sold, such as beverages, confectioneries, foods, cigarettes, cassette tapes, and disks. In these articles, packaged objects containing contents are wrapped with a transparent wrapping film. Such packaged objects are provided with such a variety of prints as to bring highly sophisticated preferences and values; for example, a print of a natural sight, seasonable event, or the like in each season to make one feel the season; and a print to add a value as a special gist for a ceremonial occasion or the like. In producing highly value-added wrapped articles, a printed matter has to be altered for each wrapped article.

For example, printing modifications are made as follows. For instance, a fixed part of a printed matter is printed on a packaged object, while only a to-be-altered part of the printed matter is printed on a wrapping film. Then, these two parts are correctly aligned with each other to form a wrapped article. However, since a wrapping film is often printed by gravure printing, the cost per article is high if the number of articles to be printed is small.

Under such a background, inkjet printing has attracted attention as a technique that can be employed for printing of a small number of copies, to which the application of gravure printing is not reasonable. Nevertheless, when a wrapping film is printed by the inkjet process, an ink receiving layer for absorbing an ink needs to be provided in the wrapping film. Further, the ink receiving layer needs to adhere to a heat sealable layer provided on a back surface of the ink receiving layer. Furthermore, the ink receiving layer and the heat sealable layer should be controlled to be kept from adhering to a packaged object during thermal pressure bonding. Japanese Patent Laid-Open No. H10-244749 (1998) discloses a technique related to an ink receiving layer to which a heat sealability is imparted: a printing sheet including an ink receiving layer blended with particulate resin particles obtained from a resin containing an amino group.

However, in the printing sheet disclosed in Japanese Patent Laid-Open No. H10-244749 (1998), since the ink receiving layer is formed of resin particles, it has been difficult to sufficiently ensure the ink absorbability.

Meanwhile, it is also necessary to make a wrapping film less likely to cause a trouble in unwrapping, for example, the film can be torn with a favorable cross section in unwrapping. In general, some wrapping films are provided with a pinch portion which serves as such an opening point for unwrapping as to open the wrapping films surely and easily. However, a wrapping film provided with an ink receiving layer for absorbing an ink has an additional thickness attributed to the ink receiving layer, so that the ink receiving layer may remain as a burr at the torn portion in unwrapping, or the ink receiving layer may peel off from a base member constituting the wrapping film.

Further, a wrapped article as shown in FIG. 3 has to be controlled such that even when a wrapping film is folded at an acute angle, an ink receiving layer needs to be prevented from cracking and peeling off from a base member at the folded portion. However, since the wrapping film provided with the ink receiving layer for absorbing an ink has an additional thickness attributed to the ink receiving layer, the heat sealable printing sheet becomes hard as a whole, and folding may cause the ink receiving layer to peel off from the base member.

SUMMARY OF THE INVENTION

The present invention provides a heat sealable printing sheet having an ink receiving layer not sticky but excellent in printing characteristics, the heat sealable printing sheet having excellent adhesiveness between the ink receiving layer and a heat sealable layer and adhesiveness of the heat sealable layer in itself, having favorable unwrapping characteristics even in a case of unwrapping with a pinch portion provided as an opening point for unwrapping, and being useful as a wrapping film and so forth. Further, the present invention provides a heat sealable printing sheet having favorable foldability even when the sheet is folded at an acute angle, and being useful as a wrapping film and so forth.

The present invention provides heat sealable printing sheets described below.

[1] A heat sealable printing sheet comprising:
a sheet-shaped base member;
an ink receiving layer disposed on a first surface of the base member and having a heat sealability; and
a heat sealable layer disposed on a second surface of the base member and made of a heat sealable resin material, wherein
the ink receiving layer contains inorganic fine particles, a water soluble resin, and a water dispersible resin, and
the water dispersible resin has a glass transition temperature Tg satisfying the following expression (1):

$$-35°\ C. \leq Tg \leq 35°\ C. \qquad (1)$$

[2] The heat sealable printing sheet according to [1], further comprising an adhesive layer disposed between the base member and the ink receiving layer.

[3] The heat sealable printing sheet according to [1] or [2], wherein the water dispersible resin differs from the heat sealable resin material in SP value by 0 or more but less than 2.

[4] The heat sealable printing sheet according to any one of [1] to [3], wherein a content P (g) of the inorganic fine particles, a content A (g) of the water soluble resin, and a content B (g) of the water dispersible resin in the ink receiving layer simultaneously satisfy relations of the following expressions (2) and (3):

$$(A+B)/P = 0.08\ \text{to}\ 0.70, \qquad (2)$$

and $$B/A = 0.1\ \text{to}\ 2.0. \qquad (3)$$

[5] The heat sealable printing sheet according to any one of [1] to [4], wherein the inorganic fine particles have an average particle diameter of 140 to 200 nm.

[6] The heat sealable printing sheet according to any one of [1] to [5], wherein the heat sealable resin material is at least one of polyethylenes and polypropylenes.

[7] The heat sealable printing sheet according to any one of [1] to [6], wherein the ink receiving layer and the heat sealable layer are capable of adhering to each other by thermal pressure bonding.

The present invention makes it possible to provide a heat sealable printing sheet having an ink receiving layer not sticky and excellent in printing characteristics, the heat sealable printing sheet having excellent adhesiveness between the ink receiving layer and a heat sealable layer and adhesiveness of the heat sealable layer in itself, and having favorable unwrapping characteristics even in a case of unwrapping with a pinch portion provided as an opening point for unwrapping. Moreover, the present invention further makes it possible to provide a heat sealable printing sheet having favorable foldability even when the sheet is folded at an acute angle, and being useful as a wrapping film and so forth.

Further features of the present invention will become apparent from the following description of exemplary embodiments (with reference to the attached drawings).

BRIEF DESCRIPTION OF THE DRAWINGS

FIG. 5 is a perspective view schematically showing another example of the wrapped article;

DESCRIPTION OF THE EMBODIMENTS

Figure 1:
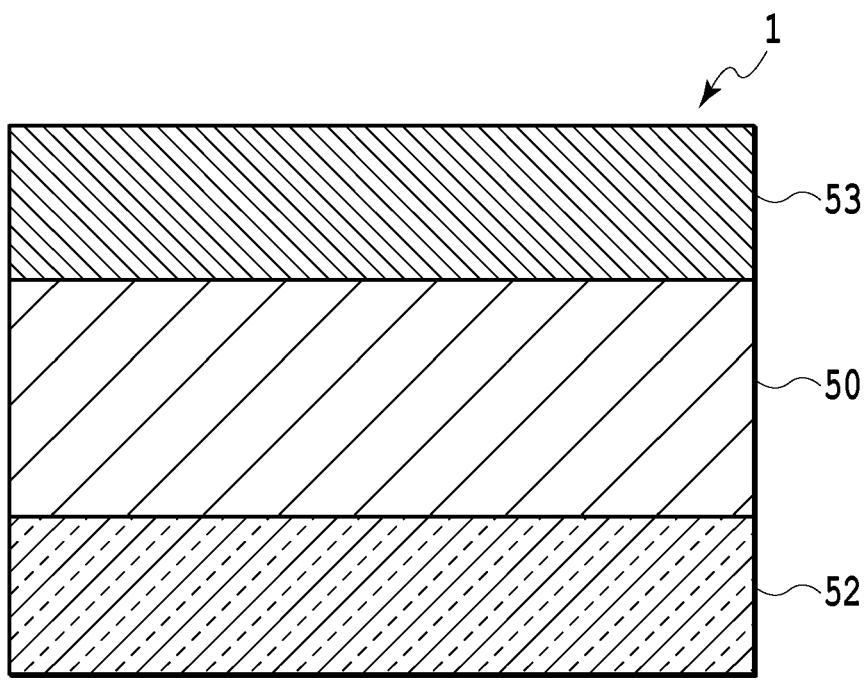
FIG. 1 is a cross-sectional view schematically showing one embodiment of a heat sealable printing sheet of the present invention.

Hereinafter, the present invention will be described in detail with reference to the drawings. However, the present invention is not limited to embodiments described below, and includes all objects having matters specifying the invention. Note that, in the drawings, the same reference signs denote members having the same structure, and the descriptions thereof will be omitted in some cases.

The present inventors have earnestly studied in order to solve the above-described problems. As a result, the inventors have found out a heat sealable printing sheet excellent in printing characteristics, adhesiveness between an ink receiving layer and a heat sealable layer, unwrapping characteristics, and foldability.

The heat sealable printing sheet of the present invention is suitably applicable to an inkjet process. To achieve a sufficient image density by the inkjet process, an ink receiving layer has to absorb a large amount of inks. For this reason, an ink receiving layer on a heat sealable printing sheet needs to have a slightly large thickness, which also brings about the inkjet-specific problem.

For example, it is necessary to satisfy the adhesiveness between an ink receiving layer and a heat sealable layer and the adhesiveness of the heat sealable layer in itself, while ensuring the transparency and ink absorbability of the ink receiving layer. However, when a porous ink receiving layer containing inorganic fine particles is used to satisfy the ink absorbability, the ink receiving layer is whitened, impairing the transparency of the film, and decreasing the adhesiveness between the ink receiving layer containing inorganic fine particles and the heat sealable layer in some cases. Hence, in the heat sealable printing sheet of the present invention, a water dispersible resin is added to the ink receiving layer, and the glass transition temperature (Tg) of the water dispersible resin is precisely set to increase the heat sealing characteristics of the ink receiving layer. Thus, the above-described problem has been overcome. Moreover, by focusing on a water soluble resin and the water dispersible resin constituting the ink receiving layer, and added amounts of these are set. Thereby, a heat sealability is imparted to the ink receiving layer, and the adhesiveness between the water dispersible resin component of the ink receiving layer having a heat sealability and the heat-sealable-layer constituting material component is increased by a strong intermolecular force. Thus, the above-described problem has been overcome. Further, the particle diameter of the inorganic fine particles is reduced to prevent decreases of the ink absorbability and the film transparency due to the whitening of the ink receiving layer, and the surface roughness of the ink receiving layer is set to increase the number of fine asperities. These increase the contact area between the ink receiving layer and the heat sealable layer, and increase an anchor effect. As a result, it has been found out that the above problem can be further solved. Further, the materials and added amounts of the water soluble resin and the water dispersible resin constituting the ink receiving layer are set in such a manner that these resins exhibit SP values close to the SP value of the heat sealable material. Thereby, a heat sealability is imparted to the ink receiving layer, and the adhesiveness between the ink receiving layer having a heat sealability and the heat sealable layer is increased by a strong intermolecular force. As a result, it has also been found out that the above-described problem can be further solved.

On the other hand, in a case where a heat sealable printing sheet is used as a wrapping film, an ink receiving layer having a larger thickness may cause a burr at a torn portion in unwrapping, or the ink receiving layer may peel off from a base member. Moreover, in a case where a heat sealable printing sheet is folded at an acute angle for wrapping, an ink receiving layer may crack, or the ink receiving layer may peel off from a base member. Hence, the present invention precisely sets the glass transition temperature (Tg) of the water dispersible resin, forms a film by using the water dispersible resin in the ink receiving layer, and increases the adhesion between the ink receiving layer and a base member to overcome the above-described problem. Further, by focusing on the water soluble resin and the water dispersible resin in the ink receiving layer, the added amounts of these resins are set. This maintains the film strength of the ink receiving layer sufficiently as a binder function just to immobilize the inorganic fine particles, thus overcoming the problems that the ink receiving layer cracks, and that the ink receiving layer peels off from the base member. Furthermore, it has been found out that the water dispersible resin in the ink receiving layer is capable of increasing the adhesion between the base member and the ink receiving layer, and can solve the above-described problem. Specifically, as the water soluble resin and the water dispersible resin in the ink receiving layer, ones having SP values close to the SP value of the base member are selected. As a result, it has been found out that these increase the adhesiveness between the base member and the ink receiving layer, and can further solve the above-described problem. Additionally, providing an adhesive layer between the base member and the ink receiving layer not only increases the adhesion between the base member and the ink receiving layer, but also makes it possible to set the heat sealable printing sheet in a flexible form. As a result, it has found out that the above-described problem can be further solved.

Now, the SP value will be described. An SP value means a solubility parameter, and is also called the Hildebrand parameter. According to the regular solution theory, it is hypothesized that the force acting between a solvent and a solute is only an intermolecular force. Hence, the solubility parameter is used as a scale representing an intermolecular force. Although actual solutions are not always regular solutions, it is empirically known that the smaller a difference in SP value between two components, the greater the solubility.

According to the regular solution theory, only an intermolecular force is modeled as a force acting between a solvent and a solute. Accordingly, it can be assumed that the interaction uniting liquid molecules is only an intermolecular force. A cohesive energy $\Delta E$ of a liquid and an entropy of vaporization have a relation of $\Delta H = \Delta E + P \Delta V$. From a molar heat of vaporization $\Delta H$ and a molar volume V, a solubility parameter is defined by the following equation. To put it differently, a solubility parameter is calculated from $(cal/cm^3)^{1/2}$: the square root of heat of vaporization required to vaporize 1 $cm^3$ of a liquid.

$$\delta = \sqrt{(\Delta H - RT)/V}$$

An actual solution is rarely a regular solution, and a force other than an intermolecular force such as hydrogen bond also acts between solvent and solute molecules. Whether two components are mixed together or phrase-separated is thermodynamically determined by a different between the enthalpy of mixing and the entropy of mixing of these components. However, empirically, substances having close solubility parameters to each other tend to be mixed well. Hence, an SP value also serves as an indicator for determining mixing tendency of a solute and a solvent. Nevertheless, the compatibility of plastic materials constituting the heat sealable printing sheet of the present invention is influenced by polarities of the materials used. The higher the polarities, the higher the compatibility, and the closer the SP values represented by the square root of CED (cohesive energy density) indicating a molecular bonding force, the higher the compatibility.

In the present invention, an SP value is represented by the following equation. Table 1 shows representative SP values. The SP values shown in Table 1 are posted from SP values of various plastics shown in Table 3.20 on page 1474 of "*Purasuchikku Kakougijyutsu Handobukku* (plastic processing technique handbook)", Jun. 12, 1995, edited by the Society of Polymer Science, Japan, published by Nikkan Kogyo Shimbun Ltd.

$$(SP)^2 = CEO = \Delta E/V = (\Delta H - RT)/V = d(CE)/M$$

[$\Delta E$: vaporization energy (kcal/mol), V: molar volume (cm/mol), $\Delta H$: vaporization energy (kcal/mol), R: gas constant, M: gram-molecular weight (g/mol), T: absolute temperature (K), d: density (g/cm$^3$), CE: cohesive energy (kcal/mol)]

TABLE 1

| Abbreviation | Polymer name | SP (theoretical value) |
| --- | --- | --- |
| PTFE | polytetrafluoroethylene | 6.2 |
| PE | polyethylene | 8.1 |
| PP | polypropylene | 8.1 |
| PS | polystyrene | 9.12 |
| PMMA | polymethyl methacrylate | 9.25 |
| PVAC | polyvinyl acetate | 9.4 |
| PVC | polyvinyl chloride | 9.6 |
| PC | polycarbonate | 9.8 |
| PET | polyethylene terephthalate | 10.7 |
| EP | epoxy resin | 11.0 |
| POM | polyacetal | 11.2 |
| PAN | polyacrylonitrile | 12.75 |
| PA | polyamide (Nylon 66) | 13.6 |

The closer the SP values, the higher the compatibility, and the higher the adhesiveness is exhibited. In the present invention, a water dispersible resin and a heat sealable resin material having close SP values to each other are selected for use, and a water soluble resin and a heat sealable resin material having close SP values to each other are selected for use. More specifically, the water dispersible resin in the ink receiving layer differs from the heat sealable resin material in SP value by 0 or more but less than 2. This makes it possible to achieve a favorable adhesiveness between the ink receiving layer and the heat sealable layer, and to prevent the ink receiving layer from forming a burr or peeling off from the base member at a torn portion in unwrapping. Moreover, it is possible to prevent the ink receiving layer from cracking or peeling off from the base member when being folded.

[1] Configuration of Heat Sealable Printing Sheet

Figure 31:
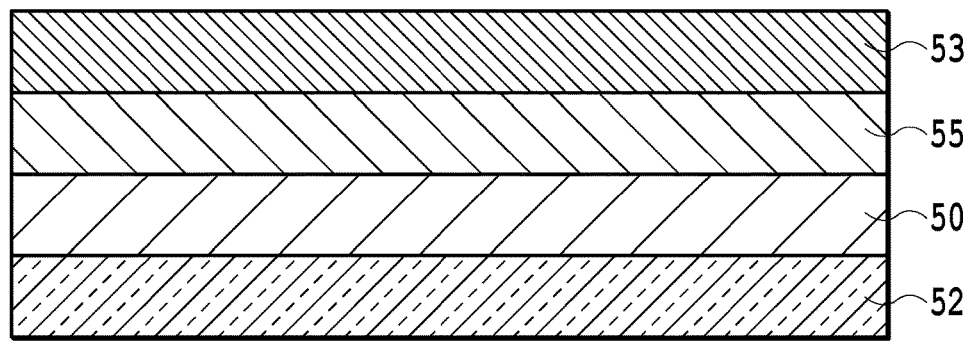
FIG. 31 is a cross-sectional view schematically showing still another embodiment of the heat sealable printing sheet of the present invention.

The heat sealable printing sheet of the present invention, like a heat sealable printing sheet 1 shown in FIG. 1, includes a sheet-shaped base member 50, an ink receiving layer 53 disposed on a first surface of the base member 50 and having a heat sealability, and a heat sealable layer 52 disposed on a second surface of the base member 50. The ink receiving layer 53 having a heat sealability and the heat sealable layer 52 having thermal welding characteristics are disposed with the base member 50 in between. With this arrangement, the ink receiving layer 53 and the heat sealable layer 52 are capable of adhering to each other by thermal pressure bonding in the heat sealable printing sheet of the present invention. In addition, the heat sealable printing sheet of the present invention may further include an adhesive layer 55 disposed between the base member 50 and the ink receiving layer 53 having a heat sealability, as shown in FIG. 31.

[1-1] Base Member

The material and the like of the base member are not particularly limited. Nevertheless, the base member preferably has an SP value close to the SP values of a water soluble resin and a water dispersible resin contained in the ink receiving layer, from the viewpoint of preventing the ink receiving layer forming a burr or peeling off from the base member at a torn portion of the wrapping film in unwrapping, and from the viewpoint of preventing the ink receiving layer from cracking or peeling off from the base member when being folded. Specifically, the base member preferably differs from the water soluble resin and the water dispersible resin contained in the ink receiving layer in SP value by 0 or more but less than 2. Such a base member is preferably a polyolefin-based resin.

The base member is preferably, for example, a resin film made of a resin such as polyester (PET or the like), nylon (aliphatic polyamide), polyimide, cellulose acetate, cellophane, polyethylene, polypropylene, polystyrene, polycarbonate, polyvinyl alcohol, polyvinyl chloride, polyvinylidene chloride, chlorinated rubber, fluororesin, or ionomer; paper, nonwoven fabric, or the like.

Above all, a resin film made of a polypropylene-based resin is preferably used as the base member. The polypropylene-based resin has an SP value close to those of the water soluble resin (for example, polyvinyl alcohol) and the water dispersible resin (for example, acrylic resin) contained in the ink receiving layer. Hence, the use of a resin film made of a polypropylene-based resin as the base member makes it possible to further increase the adhesiveness between the base member and the ink receiving layer. As the polypropylene-based resin, besides crystalline polypropylene (homopolypropylene), even a copolymer obtained by copolymerizing ethylene, butene, pentene, hexane, or the like, and a terpolymer can be used, as long as the stiffness can be ensured to some extent.

The thickness of the base member should be determined as appropriate only in consideration of the material strength and the like, and is not particularly limited. Nevertheless, the thickness of the base member is preferably 5 μm or more but 200 μm or less, furthermore preferably 10 μm or more but 200 μm or less. Setting the base member having a thickness of 5 μm or more makes it possible to prevent curling of a laminate obtained by stacking the ink receiving layer. In a case where the heat sealable printing sheet is formed in a roll shape, the base member preferably has a thickness of 15 μm or more in order to enhance the conveyance performance of the heat sealable printing sheet on a production apparatus. Moreover, in a case where the heat sealable printing sheet is formed in the shape of cut sheet, the base member preferably has a thickness of 30 μm or more from the viewpoint of preventing curling of the cut sheet. Further, the thickness of the base member is furthermore preferably 60 μm or less, and particularly preferably 50 μm or less. This can make the thermal conductivity favorable when the ink receiving layer and the heat sealable layer adhere to each other by thermal pressure bonding, and when the heat sealable layer adhere to itself by thermal pressure bonding.

Figure 2:
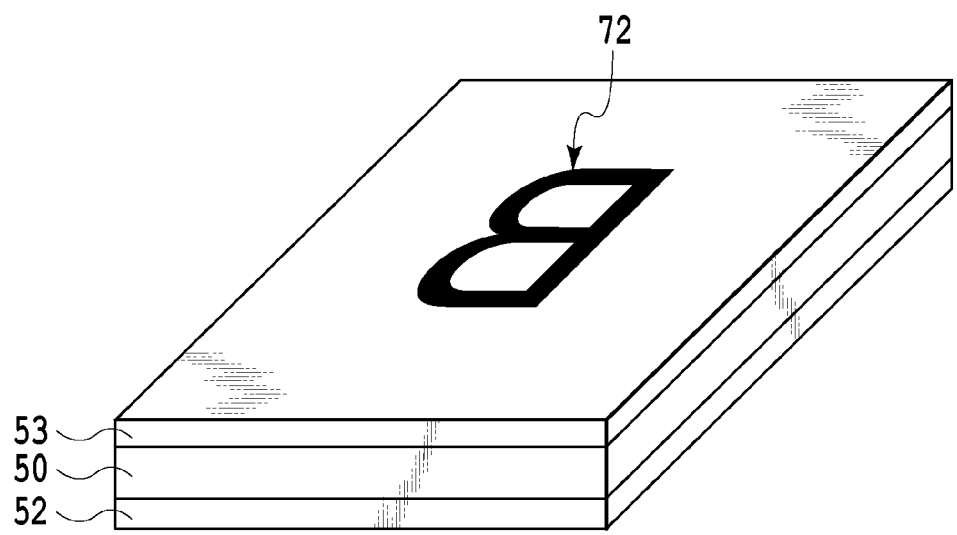
FIG. 2 is a perspective view schematically showing the embodiment where an inverted image is printed on the heat sealable printing sheet of the present invention.
Figure 3:
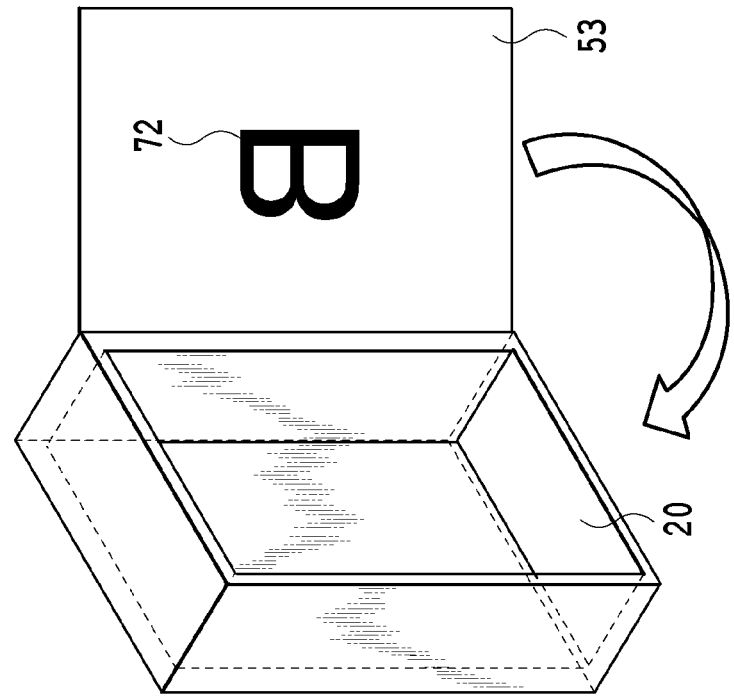
FIG. 3 is a perspective view schematically showing one example of a wrapped article.

In addition, the base member is preferably a transparent film having a total luminous transmittance of 50% or more, which is measured according to JIS K7375, and is furthermore preferably a transparent film having a total luminous transmittance of 90% or more. The use of the transparent film having a total luminous transmittance within the above-described range as the base member is advantageous when a wrapped article is prepared including the heat sealable layer 52 functioning as a protective layer for an image by printing an inverted image on the ink receiving layer 53 and wrapping a packaged object 20 with the heat sealable layer 52 located on an outer side as shown in FIGS. 2 and 3. To put it differently, the transparent film enhances the visibility of an image when the image is viewed from the heat sealable layer 52 side, and can prevent a deterioration of the quality of an image pre-printed on the packaged object 20 in advance. Moreover, a position adjustment in a manner that an image-printed part of the ink receiving layer 53 overlaps with a white or pale part of a box design of the packaged object 20 makes it possible to further enhance the visibility of the image. As a result, a wrapped article can be easily provided with various images to bring a sophisticated preference or value, such as an image of a natural sight, event, or the like in each season to make one feel the season, an image for adding a value as a special gist for a ceremonial occasion or the like, and other images. Note that in a case where an image is printed on the ink receiving layer using a dye ink, a base agent containing a UV cut agent is preferably used to prevent ultraviolet radiation from degrading the dye (optical degradation). Examples of the UV cut agent include ultraviolet absorbers such as benzotriazole-based compound and benzophenone-based compounds; ultraviolet scattering agents such as titanium oxide and zinc oxide; and the like.

[2] Ink Receiving Layer

[2-1] Ink Receiving Layer

The ink receiving layer having a heat sealability is a layer for receiving inks. The type of the ink receiving layer normally includes a swelling absorption type for receiving a coloring material in a network structure of a water soluble polymer and a gap absorption type for receiving a coloring material in gaps formed by inorganic fine particles. The ink receiving layer constituting the heat sealable printing sheet of the present invention is an ink receiving layer of the gap absorption type, and made of a composition containing inorganic fine particles, a water soluble resin, and a water dispersible resin. The ink receiving layer of the gap absorption type is capable of quickly absorbing a coloring material with gaps formed by the inorganic fine particles.

When the ink receiving layer is formed, it is preferable to precisely set the average particle diameter of the inorganic fine particles, the weight-average polymerization degree and saponification degree of the water soluble resin, and the material and added amount of the water dispersible resin. This makes it possible to further enhance the transparency (transmittance) of the ink receiving layer and the adhesion between the ink receiving layer and the base member. Moreover, the ink receiving layer has a heat sealability to incorporate the water soluble resin and the water dispersible resin. Hence, it is possible to enhance the adhesiveness between the ink receiving layer and the heat sealable layer.

[2-2] Inorganic Fine particles

The inorganic fine particles are fine particles made of an inorganic material. The inorganic fine particles have a function to form gaps which allows the ink receiving layer to receive a coloring material.

The type of the inorganic material constituting the inorganic fine particles is not particularly limited. Nevertheless, preferable is an inorganic material having a high ink absorbing ability, excellent in color developability, and capable of forming a high-quality image. Specific examples of the inorganic material include calcium carbonate, magnesium carbonate, kaolin, clay, talc, hydrotalcite, aluminium silicate, calcium silicate, magnesium silicate, diatomaceous earth, alumina, colloidal alumina, aluminum hydroxide, a hydrated alumina having a boehmite structure, a hydrated alumina having a pseudoboehmite structure, lithopone (a mixture of barium sulfate and zinc sulfide), zeolite, and the like.

The inorganic fine particles are preferably alumina fine particles made of at least one of alumina and hydrated alumina. Examples of the hydrated alumina include a hydrated alumina having a boehmite structure, a hydrated alumina having a pseudoboehmite structure, and the like. Alumina, a hydrated alumina having a boehmite structure, and a hydrated alumina having a pseudoboehmite structure are preferable because these can enhance the transparency of the ink receiving layer and the printing density of an image.

A hydrated alumina having a boehmite structure can be obtained by adding an acid to a long-chain aluminum alkoxide to carry out hydrolysis and peptization (see Japanese Patent Laid-Open No. Sho 56-120508). For the peptization, any one of organic acids and inorganic acids may be used. Among these, nitric acid is preferably used. The peptization using nitric acid enhances the reaction efficiency of the hydrolysis, and can obtain a hydrated alumina having a set shape. Thus, a dispersion liquid having a favorable dispersibility can be obtained.

The inorganic fine particles have an average particle diameter of preferably 120 to 200 nm, furthermore preferably 140 nm to 200 nm. The use of the inorganic fine particles having an average particle diameter of 120 nm or more makes it possible to enhance the ink absorbability of the ink receiving layer and suppress the bleeding and beading of an ink in an image after the printing. On the other hand, the use of the inorganic fine particles having an average particle diameter of 200 nm or less suppresses light scattering by the inorganic fine particles and makes it possible to enhance the glossiness and transparency of the ink receiving layer. Hence, the visibility of an image from the heat sealable layer side can be enhanced. Further, even in a case where an image is printed using a pigment ink which hardly permeates the ink receiving layer, it is no longer necessary to increase the thickness of the ink receiving layer in order to increase the ink density or receive a large amount of inks. Thus, the ink receiving layer and the entire heat sealable printing sheet can be made thin. Moreover, the use of the inorganic fine particles having an average particle diameter within the above-described range makes it possible to set the surface roughness of the ink receiving layer to increase the number of fine asperities. Hence, it is possible to increase the contact area between the ink receiving layer and the heat sealable layer, and exhibit an anchor effect to further increase the adhesiveness between the ink receiving layer and the heat sealable layer. Furthermore, the number of the inorganic fine particles per unit area of the ink receiving layer can be increased to enhance the ink absorbability. This enhances the printing density of an image, and can suppress the lack of luster of the image after the printing.

As the inorganic fine particles, known inorganic fine particles may be used without any modification, or known inorganic fine particles whose average particle diameter and polydispersity index have been adjusted using a pulverization dispersing machine may be used. The type of the pulverization dispersing machine is not particularly limited. For example, conventionally known pulverization dispersing machines can be used such as a high-pressure homogenizer, an ultrasonic homogenizer, a wet-medium type pulverizer (a sand mill or a ball mill), a continuous high-speed stirring type dispersion machine, and an ultrasonic dispersion machine.

More specific examples of the pulverization dispersing machine include: Manton-Gaulin homogenizer and Sonolator (these are manufactured by Doyei Shoji Co., LTD.); Microfluidizer (manufactured by MIZUHO INDUSTRIAL CO., LTD.); Nanomizer (manufactured by TSUKISHIMA KIKAI CO., LTD.); Ultimaizer (manufactured by ITOCHU MACHINE-TECHNOS CORPORATION); PEARL MILL, GRAIN MILL, and TORNADO (these are manufactured by ASADA IRON WORKS CO., LTD.); Visco Mill (manufactured by AIMEX CO., Ltd.); MIGHTY MILL, RS MILL, and ST MILL (these are manufactured by INOUE MFG., INC.); Ebara Milder (manufactured by EBARA CORPORATION); and FINE FLOW MILL and CAVITRON (these are manufactured by Pacific Machinery & Engineering Co., Ltd.), all of which are product names.

In addition, the inorganic fine particles used have a polydispersity index ($\mu/<\Gamma>^2$) of preferably 0.01 or more but 0.20 or less, furthermore preferably 0.01 or more but 0.18 or less, while satisfying the above-described range of the average particle diameter. Setting the polydispersity index within the aforementioned range makes it possible to keep the size of the inorganic fine particles constant. Thereby, the glossiness and transparency of the ink receiving layer can be enhanced. Thus, it is possible to enhance the printing density of an image, and suppress the lack of luster of the image after the printing.

Note that the average particle diameter and polydispersity index in the present specification can be determined by analyzing values measured by a dynamic light scattering method according to the cumulant method described in "*Koubunshi no Kouzou* (2), *Sanranjikkenn to Keitaikansatu, Dai* 1 *Shou Hikarisanran* (Structure of Polymer (2), Scattering Experiment and Morphological Observation, Chapter 1 Light Scattering)" (published by KYORITSU SHUPPAN CO., LTD., edited by the Society of Polymer Science, Japan) or J. Chem. Phys., 70 (B), 15 Apl., 3965 (1979). According to the theory of the dynamic light scattering, when fine particles having different particle diameters are mixed, the attenuation of a time correlation function from scattered light has a distribution. The average ($<\Gamma>$) and variance ($\mu$) of an attenuation rate are determined by analyzing the time correlation function by the cumulant method. Since the attenuation rate ($\Gamma$) is represented by a function of the diffusion coefficient and scattering vector of particles, a hydrodynamic average particle diameter can be determined by using Stokes-Einstein equation. Thus, the polydispersity index ($\mu/<\Gamma>^2$) obtained by dividing the variance ($\mu$) of the attenuation rate by the square of the average ($<\Gamma>^2$) represents the extent to which the particle diameters vary, and means that the distribution of the particle diameters is narrowed as the value approaches 0. The average particle diameter and polydispersity index defined in the present specification can be easily measured by using, for example, a laser particle diameter analyzer PARIII (manufactured by Otsuka Electronics Co., Ltd.).

One type of the inorganic fine particles can be used alone, or two or more types thereof can be used in combination. The phrase "two or more types" means to include, besides inorganic fine particles having different materials per se, inorganic fine particles having different characteristics such as average particle diameter and polydispersity index.

[2-3] Water Soluble Resin

The water soluble resin is a resin which completely mixes with water at 25° C., or a resin having a solubility in water at 25° C. of 1 (g/100 g) or more. The water soluble resin functions as a binder for binding the inorganic fine particles. Further, incorporating the water soluble resin into the ink receiving layer makes it possible to impart thermal adhesive characteristics to the ink receiving layer.

Examples of the water soluble resin include: starch, gelatin, casein, and modified products thereof; cellulose derivatives such as methyl cellulose, carboxymethyl cellulose, and hydroxyethyl cellulose; polyvinyl alcohols (completely saponified, partially saponified, low saponified polyvinyl alcohols) and modified products thereof (cationically modified products, anionically modified products, and silanol modified products); and the like.

The water soluble resin is preferably polyvinyl alcohol, furthermore preferably a saponified polyvinyl alcohol obtained by hydrolyzing (saponifying) polyvinyl acetate. The polyvinyl alcohol has an SP value close to the SP value of the aforementioned base member and the SP value of a polypropylene-based material that can constitute the heat sealable layer. Thus, the use of the polyvinyl alcohol as the water soluble resin makes it possible to further enhance the adhesiveness between the base member and the ink receiving layer and the adhesion between the heat sealable layer and the ink receiving layer.

The polyvinyl alcohol preferably has a saponification degree of 70% by mole or more but 100% by mole or less. The saponification degree of the polyvinyl alcohol means a percentage of the number of moles of hydroxyl groups of the polyvinyl alcohol relative to a total number of moles of the hydroxyl groups and acetic acid groups of the polyvinyl alcohol.

The use of the polyvinyl alcohol having a saponification degree of 70% by mole or more, furthermore preferably 86% by mole or more, makes it possible to form an ink receiving layer not excessively hard and having a sufficient viscoelasticity. This can enhance the adhesion between the base member and the ink receiving layer, and can further suppress such a trouble of the ink receiving layer peeling off from the base member due to a lack of the adhesion. Moreover, it is possible to reduce the viscosity of a coating liquid containing the inorganic fine particles and the polyvinyl alcohol. This facilitates coating of the base member with the coating liquid, and can enhance the productivity of the heat sealable printing sheet. On the other hand, the use of the polyvinyl alcohol having a saponification degree of 100% by mole or less, furthermore preferably 90% by mole or less, makes it possible to form an ink receiving layer having an adequate hydrophilicity imparted thereto and an enhanced ink absorbability. Hence, the resulting ink receiving layer enables high-quality image printing.

Examples of the saponified polyvinyl alcohols include completely saponified polyvinyl alcohol (having a saponification degree of 98% by mole or more but 99% by mole or less), partially saponified polyvinyl alcohol (having a saponification degree of 87% by mole or more but 89% by mole or less), low saponified polyvinyl alcohol (having a saponification degree of 78% by mole or more but 82% by mole or less), and the like. Among these, partially saponified polyvinyl alcohol is preferable.

The polyvinyl alcohol preferably has a weight-average polymerization degree of 2,000 or more but 5,000 or less. The polyvinyl alcohol having a weight-average polymerization degree of 2,000 or more, preferably 3,000 or more, has an adequate viscosity. Hence, the use of the polyvinyl alcohol having a weight-average polymerization degree within the above-described range makes it possible to form an ink receiving layer having a sufficient viscoelasticity. Thus, it is possible to enhance the adhesion strength between the base member and the ink receiving layer, and suppress such a trouble of the ink receiving layer peeling off from the base member due to a lack of the adhesion strength. On the other hand, the use of the polyvinyl alcohol having a weight-average polymerization degree of 5,000 or less, furthermore preferably 4,500 or less, makes it possible to reduce the viscosity of a coating liquid containing the inorganic fine particles and the polyvinyl alcohol. This facilitates coating of the base member with the coating liquid, and can enhance the productivity of the heat sealable printing sheet. Moreover, it is possible to prevent the pores of the ink receiving layer from being filled and keep the open state of the pores favorably, so that the ink absorbability is favorable. Thus, a high-quality image can be printed on the ink receiving layer.

The weight-average polymerization degree in the present specification means a value calculated according to JIS-K-6726. One type of the water soluble resin can be used alone, or two or more types thereof can be used in combination. The phrase "two or more types" means to include water soluble resin water soluble resins having different characteristics such as saponification degree and weight-average polymerization degree.

[2-4] Water Dispersible Resin

The water dispersible resin is a water insoluble resin. The use of the water dispersible resin and the water soluble resin in combination makes it possible to form an ink receiving layer having an enhanced transparency (transmittance) and adhesion between the ink receiving layer and the base member. Moreover, the use of the water dispersible resin and the water soluble resin in combination makes it possible to form a thermally-adhesive ink receiving layer. Hence, an ink receiving layer having a heat sealability is formed, making it possible to enhance the adhesiveness between the ink receiving layer and the heat sealable layer. Examples of the water dispersible resin include urea-based resins, melamine-based resins, epoxy-based resins, epichlorohydrin-based resins, urethane-based resins, polyethylene imine-based resins, polyamide-based resins, polyvinylpyrrolidone-based resins, polyvinyl butyral-based resins, acrylic resins such as poly(meth)acrylic acid and (meth)acrylic acid-based copolymers, acrylamide-based resins, maleic anhydride-based copolymer resins, polyester-based resins, and the like.

Among these, acrylic resins and urethane-based resins have SP values close to the SP value of the polypropylene-based material that can constitute the heat sealable layer and the base member. Moreover, in the case where the adhesive layer is disposed between the base member and the ink receiving layer, the SP values of acrylic resins and urethane-based resins are close to the SP value of the material that can constitute the adhesive layer. Thus, acrylic resins and urethane resins are preferably can further enhance the adhesion between the base member and the ink receiving layer, the adhesion between the adhesive layer and the ink receiving layer, and the adhesiveness between the heat sealable layer and the ink receiving layer. Further, the glass transition temperatures Tg of acrylic resins and urethane resins are easily adjusted so that a film can be formed at room temperature or lower temperature.

[2-4-1] Acrylic Resin (Resin Emulsion)

The acrylic resins can be obtained by copolymerizing (meth)acrylic acid, (meth)acrylic acid ester, and a monoethylenically unsaturated monomer copolymerizable therewith. Examples of the (meth)acrylic acid include acrylic acid and methacrylic acid. Among these, (meth)acrylic acid is preferable in consideration that the range where the electrically neutral state and the anionic state coexist can be widely set. Note that the acrylic resins include ones having a random structure, a block structure, a graft structure, or the like, but any of these can be used suitably. Among these, acrylic resins having a block structure are more preferably used because the strength of the resin particles is high.

Examples of the (meth)acrylic acid ester include: alkyl (meth)acrylates such as methyl (meth)acrylate, n-butyl (meth)acrylate, 2-ethylhexyl (meth)acrylate, n-octyl (meth)acrylate, dodecyl (meth)acrylate, octadecyl (meth)acrylate, cyclohexyl (meth)acrylate, and isobornyl (meth)acrylate; hydroxyalkyl (meth)acrylates such as 2-hydroxyethyl (meth)acrylate, 2-hydroxypropyl (meth)acrylate, and 3-hydroxypropyl (meth)acrylate; alkylene glycol mono(meth) acrylates such as diethylene glycol mono(meth)acrylate, triethylene glycol mono(meth)acrylate, polyethylene glycol mono(meth)acrylate, propylene glycol mono(meth)acrylate, dipropylene glycol mono(meth)acrylate, tripropylene glycol mono(meth)acrylate, tetramethylene ether glycol mono(meth)acrylate, a mono(meth)acrylate of random polymer glycol or block polymer glycol of polyethylene oxide-polypropylene oxide, and a mono (meth)acrylate of random polymer glycol or block polymer glycol of polyethylene oxide-polytetramethylene ether; glycidyl (meth)acrylate; benzyl (meth)acrylate; and the like.

Besides the above-described (meth)acrylic acid, (meth) acrylic acid ester, and monoethylenically unsaturated monomer, a styrene-based monomer can also be used as a monomer. Examples of the styrene-based monomer include styrene, α-methylstyrene, o-methylstyrene, m-methylstyrene, p-methylstyrene, p-t-butylstyrene, 4-methoxystyrene, 4-chlorostyrene, and the like. To put it differently, the acrylic resins are preferably styrene-(meth)acrylic acid-based copolymers having a constituent unit derived from a styrene-based monomer.

The acrylic resins may be crosslinked using a crosslinking agent. Examples of the crosslinking agent include multifunctional isocyanate-based crosslinking agents, epoxy-based crosslinking agents, oxazoline-based crosslinking agents, aziridine-based crosslinking agents, metal chelate-based crosslinking agents, dihydrazide compounds such as adipic acid dihydrazide, and the like. The crosslinking agent may be either oil soluble or water soluble. These crosslinking agents can be used alone, or two or more types thereof can be used in combination. For example, in a case where a polymer constituting polymer particles of a water-based emulsion is a specific acrylic resin as described above, an epoxy-based crosslinking agent can be used as the crosslinking agent: particularly, polyglycidyl compounds containing two or more epoxy groups, such as ethylene glycol diglycidyl ether, polyethylene glycol diglycidyl ether, propylene glycol diglycidyl ether, polypropylene glycol diglycidyl ether, neopentyl glycol diglycidyl ether, 1,6-hexanediol diglycidyl ether, dibromoneopentyl glycol diglycidyl ether, o-phthalic acid diglycidyl ester, glycerol polyglycidyl ether, trimethylolpropane polyglycidyl ether, diglycerol polyglycidyl ether, polyglycerol polyglycidyl ether, sorbitol polyglycidyl ether, N,N,N',N'-tetraglycidyl-m-xylylenediamine, N,N,N',N'-pentaglycidyldiethylenetriamine, and N,N,N',N'-tetraglycidylethylenediamine. Among the above crosslinking agents, polyglycerol polyglycidyl ether and polyethylene glycol diglycidyl ether are preferably used from the viewpoint that the mixing characteristics and adhesive force can be increased.

[2-4-2] Urethane-Based Resin

As the urethane-based resin, it is possible to use urethane-based resins synthesized, for example, by combining various diol compounds and diisocyanate compounds together, followed by addition polymerization reaction. One type of each of the diol compounds and diisocyanate compounds may be used alone. Alternatively, two or more types thereof can also be used at any ratio, depending on various purposes (for example, adjustment of the glass transition temperature (Tg) of the polymer, and enhancement of the solubility, impartment of compatibility with the binder, improvement in stability of dispersed materials, and so forth).

Specific examples of the diol compounds include ethylene glycol, 1,2-propanediol, 1,3-propanediol, 1,2-butanediol, 1,3-butanediol, 2,3-butanediol, 2,2-dimethyl-1,3-propanediol, 1,2-pentanediol, 1,4-pentanediol, 1,5-pentanediol, 2,4-pentanediol, 3,3-dimethyl-1,2-butanediol, 2-ethyl-2-methyl-1,3-propanediol, 1,2-hexanediol, 1,5-hexanediol, 1,6-hexanediol, 2,5-hexanediol, 2-methyl-2,4-pentanediol, 2,2- diethyl-1,3-propanediol, 2,4-dimethyl-2,4-pentanediol, 1,7-heptanediol, 2-methyl-2-propyl-1,3-propanediol, 2,5-dimethyl-2,5-hexanediol, 2-ethyl-1,3-hexanediol, 1,2-octanediol, 1,8-octanediol, 2,2,4-trimethyl-1,3-pentanediol, 1,4-cyclohexanedimethanol, hydroquinone, diethylene glycol, triethylene glycol, dipropylene glycol, tripropylene glycol, polyethylene glycol, polypropylene glycol, polyester polyol, 4,4'-dihydroxy-diphenyl-2,2-propane, 4,4'-dihydroxyphenyl sulfone, and the like.

Examples of the diisocyanate compounds include methylene diisocyanate, ethylene diisocyanate, isophorone diisocyanate, hexamethylene diisocyanate, 1,4-cyclohexane diisocyanate, 2,4-toluene diisocyanate, 2,6-toluene diisocyanate, 1,3-xylylene diisocyanate, 1,5-naphthalene diisocyanate, m-phenylene diisocyanate, p-phenylene diisocyanate, 3,3'-dimethyl-4,4'-diphenylmethane diisocyanate, 3,3'-dimethylbiphenylene diisocyanate, 4,4'-biphenylene diisocyanate, dicyclohexylmethane diisocyanate, methylene bis(4-cyclohexyl isocyanate), and the like.

[2-5] Glass Transition Temperature

The water dispersible resin has a glass transition temperature Tg preferably satisfying the following expression (1), furthermore preferably satisfying $0° C. \leq Tg \leq 30° C$. The use of the water dispersible resin having a glass transition temperature Tg of $-35° C$. or more makes it possible to form an ink receiving layer capable of preventing stickiness. Meanwhile, the water dispersible resin having a glass transition temperature Tg of $-35° C$. or less can easily form a film, enhancing the adhesion between the ink receiving layer and the base member. This makes it possible to more effectively prevent the ink receiving layer from forming a burr or peeling off from the base member at a torn portion of the wrapping film in unwrapping. Moreover, since the formation of the water dispersible resin film increases the transparency, a transparent ink receiving layer can be made. Further, the water dispersible resin exhibits a thermal adhesiveness by heat during thermal pressure bonding. This makes it possible to enhance the adhesiveness between the heat sealable layer and the ink receiving layer. Note that the ink receiving layer having a heat sealability exhibits a thermal adhesiveness by heating to $60° C$. or more, preferably $100° C$. to $160° C$. This makes it possible to avoid thermal deformation of the base member.

$$-35° C. \leq Tg \leq 35° C. \tag{1}$$

[2-6] Added Amounts of Water Soluble Resin and Water Dispersible Resin

The water soluble resin and the water dispersible resin used in the present invention have the following actions. First, the water soluble resin predominantly acts as a binder of the inorganic fine particles, enhances the adhesion between the base member and the ink receiving layer, and effectively prevents the ink receiving layer from peeling off from the base member. However, since the water soluble resin has a nature inferior in thermal adhesiveness, it is difficult for the ink receiving layer to exhibit the heat sealability with only the inorganic fine particles and the water soluble resin, and it is difficult to adhere the heat sealable layer to the ink receiving layer. On the other hand, the water dispersible resin has a nature superior in thermal adhesiveness. This makes it possible to further enhance the adhesiveness between the heat sealable layer and the ink receiving layer. Moreover, the water dispersible resin exhibits an SP value close to the value of the material constituting the base member, and can also enhance the adhesion to the ink receiving layer on the base member. Nevertheless, since the water dispersible resin is an emulsion, even if the emulsion forms a film, the binder function just to immobilize the inorganic fine particles is low. For this reason, if an ink receiving layer is formed using the inorganic fine particles and the water dispersible resin but not the water soluble resin, the ink receiving layer has a weak film strength. Hence, the ink receiving layer is likely to peel off from the base member.

From such viewpoints, it is important to strictly set amounts of the water soluble resin and the water dispersible resin used in the present invention in such a manner as to satisfy relations of the following expressions (2) and (3) so as to achieve both the adhesiveness between the heat sealable layer and the ink receiving layer and the adhesion to the ink receiving layer on the base member.

In other words, it is preferable that a content P (g) of the inorganic fine particles, a content A (g) of the water soluble resin, and a content B (g) of the water dispersible resin in the ink receiving layer satisfy the relation of the following expression (2). When a ratio of a total content of the water soluble resin and the water dispersible resin relative to the content of the inorganic fine particles is 0.08 or more, it is possible to further enhance the adhesion between the base member and the ink receiving layer and the adhesiveness between the heat sealable layer and the ink receiving layer. In addition, it is possible to more effectively prevent o the ink receiving layer from forming a burr or peeling off from the base member at a torn portion of the wrapping film in unwrapping. On the other hand, when the ratio of the total content of the water soluble resin and the water dispersible resin relative to the content of the inorganic fine particles is 0.70 or less, it is possible to further enhance the ink absorbability of the ink receiving layer.

Here, if the ratio of the total content of the water soluble resin and the water dispersible resin relative to the content of the inorganic fine particles is less than 0.08, the proportion of the inorganic fine particles increases, while the proportions of the water soluble resin and the water dispersible resin decrease. The decrease in the proportion of the water soluble resin decreases the function of the water soluble resin as a binder of the inorganic fine particles, and hence decreases the film strength of the ink receiving layer. Thus, such a wrapping film is unfavorable because the ink receiving layer forms a burr or peels off from the base member at a torn portion of the wrapping film in unwrapping. Moreover, such a wrapping film is not preferable because when the heat sealable printing sheet is folded at an acute angle for wrapping, the ink receiving layer cracks or the ink receiving layer peels off from the base member. Meanwhile, a decrease in the proportion of the water dispersible resin is not preferable because the thermal adhesiveness is decreased and the adhesiveness between the heat sealable layer and the ink receiving layer is decreased. On the other hand, if the ratio of the total content of the water soluble resin and the water dispersible resin relative to the content of the inorganic fine particles exceeds 0.70, there are excessive amounts of the water soluble resin and the water dispersible resin constituting the ink receiving layer. Such an increase in the amounts of the water soluble resin and the dispersible resin is not preferable because the pores of the inorganic fine particles are filled, decreasing the ink absorbability. Additionally, an increase in the amount of the water dispersible resin is not preferable because such an increase may decrease the transparency of the ink receiving layer and the visibility of an image viewed from the heat sealable layer 52 side, or may impair the quality of an image pre-printed on the packaged object 20 in advance.

$$(A+B)/P=0.08 \text{ to } 0.70 \tag{2}$$

Moreover, it is preferable that the content A (g) of the water soluble resin and the content B (g) of the water dispersible resin in the ink receiving layer simultaneously satisfy the relations of the following expression (3) in addition to the expression (2). When a ratio of the content of the water dispersible resin relative to the content of the water soluble resin is 0.1 or more, the intermolecular force between the water dispersible resin and the constituent material of the heat sealable layer is increased. This makes it possible to further enhance the adhesiveness between the heat sealable layer and the ink receiving layer. On the other hand, when the ratio of the content of the water dispersible resin relative to the content of the water soluble resin is 2 or less, it is possible to further enhance the adhesion between the base member and the ink receiving layer, and more effectively prevent the ink receiving layer from peeling off from the base member. Further, it is possible to prevent the ink receiving layer from whitening attributable to the addition of the water dispersible resin, making the ink receiving layer transparent. If the ratio of the content of the water dispersible resin relative to the content of the water soluble resin is less than 0.1, the amount of the water dispersible resin is decreased and is not preferable because the thermal adhesiveness is decreased and the adhesiveness between the heat sealable layer and the ink receiving layer is decreased. Meanwhile, if the ratio of the content of the water dispersible resin relative to the content of the water soluble resin exceeds 2.0, the amount of the water dispersible resin is increased and is not preferable because the binder function just to immobilize the inorganic fine particles is decreased and the ink receiving layer is likely to peel off from the base member. Further, such an increase is not preferable because it may decrease the transparency of the ink receiving layer and the visibility of an image viewed from the heat sealable layer 52 side, or may impair the quality of an image pre-printed on the packaged object 20 in advance.

$$B/A = 0.1 \text{ to } 2.0 \quad (3)$$

[2-7] Other Additive

Figure 7:
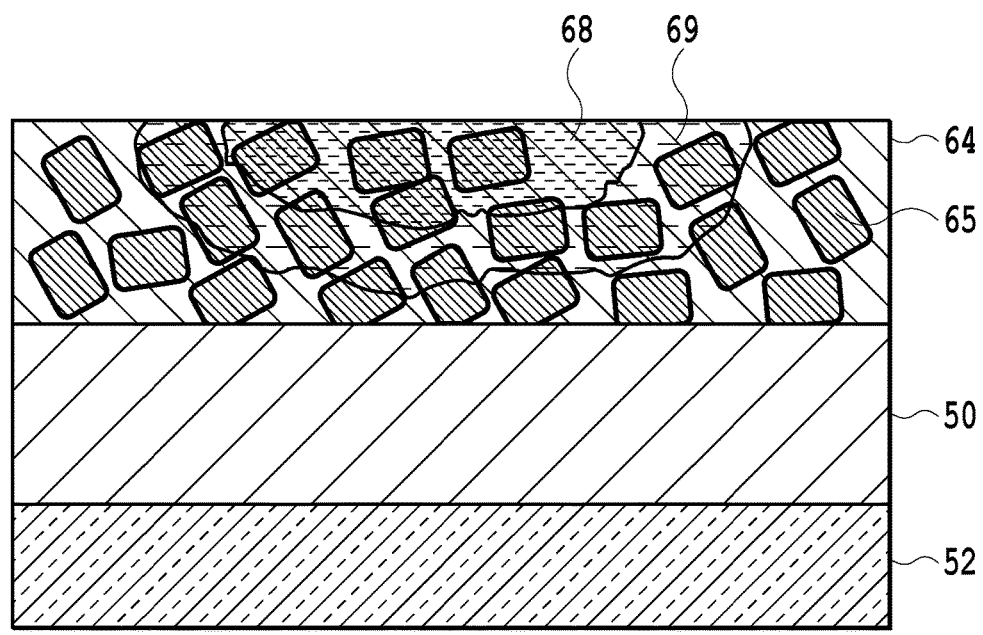
FIG. 7 is a cross-sectional view showing a state where a dye ink is fixed to the heat sealable printing sheet of the present invention.

The ink receiving layer may contain a cationic resin, as necessary, to enhance the ink fixability to the ink receiving layer. The cationic resin is a resin having a cationic atomic group (for example, quaternary ammonium or the like) in the molecule. When a pigment ink and a dye ink are used, the cationic resin strongly binds thereto. A pigment fixed to the surface of the ink receiving layer enters the gaps of the ink receiving layer and strongly binds to the ink receiving layer. Incorporating the cationic resin into the ink receiving layer also enhances the electrostatic binding force and thereby further enhances the binding between the ink receiving layer and the pigment. Moreover, when a dye ink is used, a dye component 68 moves (migrates) like a dye component 69 as shown in FIG. 7 under the influence of residual water, suppresses bleeding, and can enhance the water resistance.

As the cationic resin, it is preferable to use polyallylamine (for example, an allylamine-based polymer, a diallylamine-based polymer, or the like). Among these, a low-molecular-weight polyallylamine is preferable because the molecules are small and many cationic groups can exist per unit area on the surface of the ink receiving layer, promoting electrostatic bonding. Note that, as the polyamine, it is preferable to use polyallylamine represented by the following general formula (4)

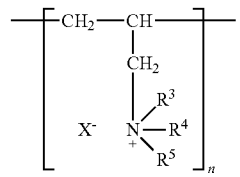

(In the general formula (4), $R^3$, $R^4$, and $R^5$ each independently represent a hydrogen atom or an optionally substituted alkyl group, alkenyl group, alkanol group, arylalkyl group, or arylalkenyl group; $X^-$ represents an anion from an inorganic or organic source; and n is an integer representing a polymerization degree.)

The cationic resin has a weight-average molecular weight of preferably 1,000 or more but 15,000 or less, furthermore preferably 1,000 or more but 10,000 or less, and particularly preferably 1,000 or more but 5,000 or less. The use of the cationic resin having a weight-average molecular weight within the above-described range makes it possible to enhance the stability of a coating liquid, and makes the gaps of the ink receiving layer hardly decreased. Hence, the coloring material absorbability can be maintained. Further, the use of the cationic resin having a weight-average molecular weight of 5,000 or less makes it possible to distribute a larger number of cationic groups (i.e., absorption site where the electrostatic bonding is carried out) on the surface of the ink receiving layer, further enhancing the fixability of a pigment ink and a dye ink.

The amount of the cationic resin in the ink receiving layer is preferably 0.01% by mass or more but 5% by mass or less, furthermore preferably 0.01% by mass or more but 3% by mass or less, relative to the inorganic fine particles (such as hydrated alumina). If the amount of the cationic resin relative to the inorganic fine particles exceeds 5% by mass, this increases the viscosity of a dispersion liquid of the inorganic fine particles and a coating liquid obtained by adding a binder to the dispersion liquid, and may decrease the storability and coatability of the dispersion liquid and the coating liquid.

[2-8] Thickness of Ink Receiving Layer

The thickness of the ink receiving layer is not particularly limited. Nevertheless, the ink receiving layer preferably has a thickness of 5 μm or more but 40 μm or less. Setting the ink receiving layer having a thickness of 5 μm or more, furthermore preferably 8 μm or more, makes it possible to sufficiently ensure the ink absorbability of the ink receiving layer and makes the ink fixability further favorable. On the other hand, setting the ink receiving layer having a thickness of 40 μm or less, furthermore preferably 20 μm or less, makes it possible to enhance the transparency of the ink receiving layer. Further, it is possible to make the thermal conductivity favorable during thermal pressure bonding, further enhancing the adhesiveness between the heat sealable layer and the ink receiving layer.

[2-9] Other

An auxiliary image different from an image to be described later may be formed (pre-printed) on the ink receiving layer in advance.

[3] Heat Sealable Layer

[3-1] Heat Sealable Layer

The heat sealable layer is disposed on the second surface (which is a surface located on an opposite side to the surface where the ink receiving layer is disposed) of the base member. Providing the heat sealable layer on one surface of the base member increases the freedom of selecting the material of the base member when a wrapped article is prepared. In other words, as in the case of the printing sheet described in Japanese Patent Laid-Open No. Hei 10-244749, it is no longer necessary to consider directly adhering the base member and the ink receiving layer to each other (it is not necessary to impart a heat sealability to the base member), and the base member can be selected at will in consideration of only the unwrapping characteristics as a wrapped article and the adhesiveness between the ink receiving layer and the heat sealable layer.

A heat sealable resin material constituting the heat sealable layer is preferably at least one of polyethylene-based resins and polypropylene-based resins. Examples of the polyethylene-based resins include HDPE, LDPE, and L·LDPE. On the other hand, examples of the polypropylene-based resins include propylene-α-olefin copolymers and mixtures thereof. In this event, a content of an α-olefin-derived constituent unit is preferably 3 to 50 mol % in consideration of the heat sealability, the film transparency, the scratch resistance, and so forth. The resins may be any one of a random copolymer and a block copolymer, but a random copolymer is preferable. Examples of the α-olefin include α-olefins having 2 to 10 carbon atoms, such as ethylene, 1-butene, 1-pentene, 1-hexene, 1-heptene, 1-octene, 1-nonene, 1-decene, and 4-methyl-1-pentene. Two or more types of these α-olefins may be used.

Among these, propylene-based resins are preferable because these can adhere at relatively low temperature. Moreover, the heat sealable resin material preferably has a lower melting point than a polypropylene-based resin and the like that can form the base member. Such a material is preferably mixtures of two or more of an ethylene·butene-1 copolymer, an ethylene·propylene·butene-1 copolymer, an ethylene·acrylic acid copolymer, an ionomer obtained by crosslinking an ethylene·acrylic acid copolymer with a metal ion, polybutene-1, a butene·ethylene copolymer, a propylene·ethylene·copolymer, a propylene·butene-1 copolymer, and a propylene·pentene copolymer; and mixtures of polypropylene with these. Note that there is no limitation at all, as long as the adhesiveness is exhibited depending on the purpose and use.

[3-2] Thickness of Heat Sealable Layer

The thickness of the heat sealable layer is not particularly limited. Nevertheless, the heat sealable layer preferably has a thickness of 0.5 µm or more but 40 µm or less. Setting the heat sealable layer having a thickness of 0.5 µm or more, furthermore preferably 1 µm or more, can make the thermal conductivity favorable during thermal pressure bonding, so that the adhesiveness between the ink receiving layer and the heat sealable layer is further favorable. On the other hand, setting the heat sealable layer having a thickness of 40 µm or less, furthermore preferably 10 µm or less, makes it possible to enhance the transparency of the heat sealable layer.

[4] Adhesive Layer

[4-1] Adhesive Layer

The heat sealable printing sheet of the present invention preferably further includes an adhesive layer disposed between the base member and the ink receiving layer. By providing the adhesive layer between the base member and the ink receiving layer, the adhesive layer functions as an anchor layer of the base member and the ink receiving layer. This strengthens the adhesion between the base member and the ink receiving layer, and makes the heat sealable printing sheet flexible, making it possible to enhance the foldability. Note that the material constituting the adhesive layer may be the same as or different from the material constituting the heat sealable layer. In the case where the constituent material of the adhesive layer is the same as the constituent material of the heat sealable layer, the base member hardly curls, and the base member can be kept flatter. This makes it possible to easily coat the adhesive layer with a coating liquid prepared by mixing the inorganic fine particles, the water soluble resin, and the water dispersible resin with an appropriate medium. On the other hand, in the case where the constituent material of the adhesive layer is different from the constituent material of the heat sealable layer, a material having an SP value close to those of both the ink receiving layer and the base member can be selected as the constituent material of the adhesive layer. This makes it possible to further increase the adhesivenesses of the adhesive layer to the ink receiving layer and to the base member.

As the material constituting the adhesive layer, it is possible to use not only polyethylenes and polypropylenes but also the above-mentioned acrylic resins and urethane-based resins used for the ink receiving layer. The use of the acrylic resins and urethane-based resins as the material constituting the adhesive layer makes it possible to enhance the wettability of a coating liquid for forming the ink receiving layer to more easily coat the adhesive layer with the coating liquid.

The acrylic resins and urethane-based resins are preferable because these materials may be incorporated into the ink receiving layer, so that it is possible to bring the SP values of the adhesive layer and the ink receiving layer close to each other, and because the resins can further enhance the adhesion as the anchor layer. On the other hand, the polyethylene-based resins and polypropylene-based resins also can bring the SP values of the adhesive layer and the ink receiving layer close to each other as in the case of the acrylic resins and urethane-based resins. It should be noted that, in order to further enhance the adhesion as the anchor layer, a surface modification treatment is preferably performed; for example, the surface of the adhesive layer may be subjected to a corona discharge treatment and a plasma discharge treatment, or the surface of the base member may be coated with an organic solvent such as isopropyl alcohol and acetone.

To further enhance the foldability of the heat sealable printing sheet, the lowest membrane forming temperature (MFT) of the adhesive layer is set to preferably 23° C., furthermore preferably 0° C. or less. Setting the lowest membrane forming temperature (MFT) of the adhesive layer within the above-described range makes it possible to enhance the foldability while setting the heat sealable printing sheet in a flexible form with the adhesive layer in a film state.

[4-2] Thickness of Adhesive Layer

The thickness of the adhesive layer is not particularly limited. Nevertheless, the adhesive layer preferably has a thickness of 0.5 µm or more but 40 µm or less. Setting the adhesive layer having a thickness of 0.5 µm or more, furthermore preferably 1 µm or more, makes it possible to exhibit the anchor effect more strongly, so that the adhesion between the ink receiving layer and the adhesive layer is further favorable. On the other hand, setting the adhesive layer having a thickness of 40 µm or less, furthermore preferably 10 µm or less, makes it possible to enhance the transparency of the adhesive layer. Additionally, the adhesive layer is preferably thinner than the heat sealable layer because the heat sealable printing sheet can be set flatter.

[5] Shape and Thickness of Heat Sealable Printing Sheet

The shape of the heat sealable printing sheet of the present invention may be a roll shape or a sheet shape (cut sheet shape) depending on the structures of an image printing apparatus and a production apparatus for a printed article to be described later. In the case of the roll shape, the ink receiving layer may be located on an outer side or an inner side. Nevertheless, for the optimization with respect to a conveyance mechanism of the image printing apparatus to be described later, a rolled heat sealable printing sheet is preferably wound into the roll shape in which the ink receiving layer is located on the outer side and the heat sealable layer is located on the inner side.

The base member preferably has a thickness 1.5 times or more but 5 times or less as large as the thickness of the ink receiving layer. Setting the thickness 1.5 times or more makes it possible to prevent curling of the heat sealable printing sheet in the sheet shape (cut sheet shape) and can make the conveyance performance of the heat sealable printing sheet favorable in the image printing apparatus and the production apparatus for a printed article. On the other hand, setting the thickness 5 times or less can make the thermal conductivity favorable during thermal pressure bonding.

[6] Production Method

The heat sealable printing sheet of the present invention can be produced, for example, by: providing a heat sealable layer on a first surface of a base member; and then coating a second surface of the base member with a coating liquid containing inorganic fine particles, a water soluble resin, and a water dispersible resin to form an ink receiving layer on the second surface of the base member. In the following description, the matters having been already described, for example, in the section of the heat sealable printing sheet will be omitted, and only matters specific to the production method will be described.

[6-1] Base Member

The base member to be used may have been subjected to a surface modification in advance. Performing a surface modification to roughen the surface of the base member makes it possible to enhance the wettability of the base member, and enhance the adhesion between the ink receiving layer and the heat sealable layer in some cases. The surface modification method is not particularly limited. Examples thereof include a method in which the surface of the base member is subjected to a corona discharge treatment or a plasma discharge treatment in advance; a method in which the surface of the base member is coated with an organic solvent such as IPA or acetone; and other similar methods. These surface treatments makes it possible to increase the adhesion of the base member to the ink receiving layer and the heat sealable layer, and prevent such a trouble of the ink receiving layer and the heat sealable layer peeling off from the base member.

[6-2] Formation of Heat Sealable Layer

The heat sealable layer can be formed by stacking a heat sealable resin material on the base member by dry lamination, extrusion lamination, or the like. As the method for forming the heat sealable layer by extrusion lamination, it is possible to utilize (i) an extrusion lamination method in which the base member is coated with an anchoring agent such as organic titanate-based, polyethylene.imine, urethane-based, polyester-based, or other anchoring agents, and then the heat sealable layer made of PP, EVA, an ionomer, or the like is molded in a film shape by melt extrusion onto the coated surface of this anchoring agent; (ii) a co-extrusion lamination method in which two or more extruders are used to joint a resin to be a base member and a resin to be the heat sealable layer in a molten state inner side a die or at an opening of the die; and other similar methods.

[6-3] Coating Liquid

The ink receiving layer can be formed by: coating the surface of the base member with a coating liquid prepared by mixing the inorganic fine particles, the water soluble resin, and the water dispersible resin with an appropriate medium; and drying the resultant. As the medium, an aqueous medium is preferably used. Examples of the aqueous medium include water; mixed solvents of water and a water soluble organic solvent; and the like. Examples of the water soluble organic solvent include alcohols such as methanol, ethanol, and propanol; lower alkyl ethers of polyhydric alcohols such as ethylene glycol monomethyl ether and ethylene glycol dimethyl ether; ketones such as acetone and methyl ethyl ketone; ethers such as tetrahydrofuran; and the like.

The coating liquid can contain various additives, as long as the effects of the present invention are not impaired. In the case where a dye ink is used as an ink for printing an inverted image, it is preferable to incorporate a dye fixing agent. Such a dye fixing agent binds to an anionic group of a dye molecule, forming a salt, and making the dye insoluble in water can prevent the migration.

Examples of the other additives include surfactants, pigment dispersing agents, thickeners, antifoaming agents, ink fixing agents, dot regulators, colorants, fluorescent whitening agents, antioxidants, ultraviolet absorbers, preservatives, pH regulators, and the like.

The concentration of the inorganic fine particles in the coating liquid should be determined as appropriate only in consideration of the coatability of the coating liquid, and is not particularly limited. Nevertheless, the concentration is preferably 10% by mass or more but 30% by mass or less relative to the total mass of the coating liquid.

[6-4] Coating

After the surface of the base member is coated with the coating liquid, the coating liquid is dried as necessary. This makes it possible to obtain the heat sealable printing sheet 1 having a layered structure in which the heat sealable layer 52, the base member 50, and the ink receiving layer 53 are sequentially stacked as shown in FIG. 1.

As the coating method, conventionally known coating methods can be used. Examples thereof include a blade coating method, an air knife coating method, a curtain coating method, a slot die coating method, a bar coating method, a gravure coating method, a roll coating method, and the like.

The coating amount of the coating liquid is preferably 10 $g/m^2$ or more but 40 $g/m^2$ or less in terms of solid content. Setting the coating amount to 10 $g/m^2$ or more, furthermore preferably 15 $g/m^2$ or more, makes it possible to form an ink receiving layer excellent in water absorbability. Thus, it is possible to suppress troubles of ink flowing beyond a printed image, and blurring of an image. On the other hand, setting the coating amount to 40 $g/m^2$ or less, furthermore preferably 20 $g/m^2$ or less, makes curling hardly occur when the coated layer is dried. Reducing the thickness of the ink receiving layer to reduce the thickness of the heat sealable printing sheet finally formed can make the thermal conductivity favorable during thermal pressure bonding.

[7] Formation of Image

The use of the heat sealable printing sheet of the present invention makes it possible to prepare a wrapped article by wrapping a packaged object. Moreover, on the ink receiving layer of the heat sealable printing sheet, an image can be formed in any stage before the wrapped article is prepared and after the wrapped article is prepared, depending on the purpose of use.

Figure 32:
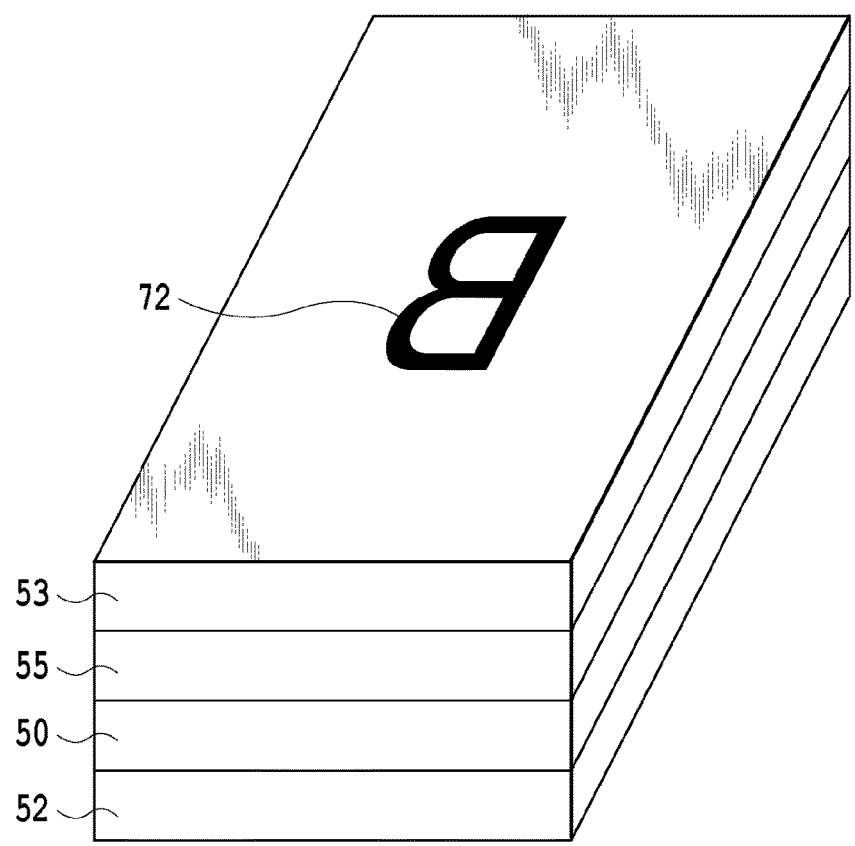
FIG. 32 is a perspective view schematically showing another embodiment in which an inverted image is printed on the heat sealable printing sheet of the present invention.

The use examples of an image formed before the wrapped article is prepared include a case where the printed article is required to have a durability such as abrasion resistance or water resistance; and the like. In this case, as shown in FIGS. 2, 3, and 32, after an inverted image 72 is printed on the ink receiving layer 53 of the heat sealable printing sheet, a packaged object 20 is wrapped in such a manner that the heat sealable layer 52 serving as a protective layer is located on the outer side while the ink receiving layer 53 is located on the inner side (i.e., the packaged object 20 is in contact with the ink receiving layer 53). Thereby, the inverted image 72 is seen as a normal image through the heat sealable layer 52 and the base member 50 (in FIG. 32, through the heat sealable layer 52, the base member 50, and the adhesive layer 55). Moreover, since the heat sealable layer 52 functions as a protective layer, a wrapped article excellent in durability can be prepared.

Figure 4:
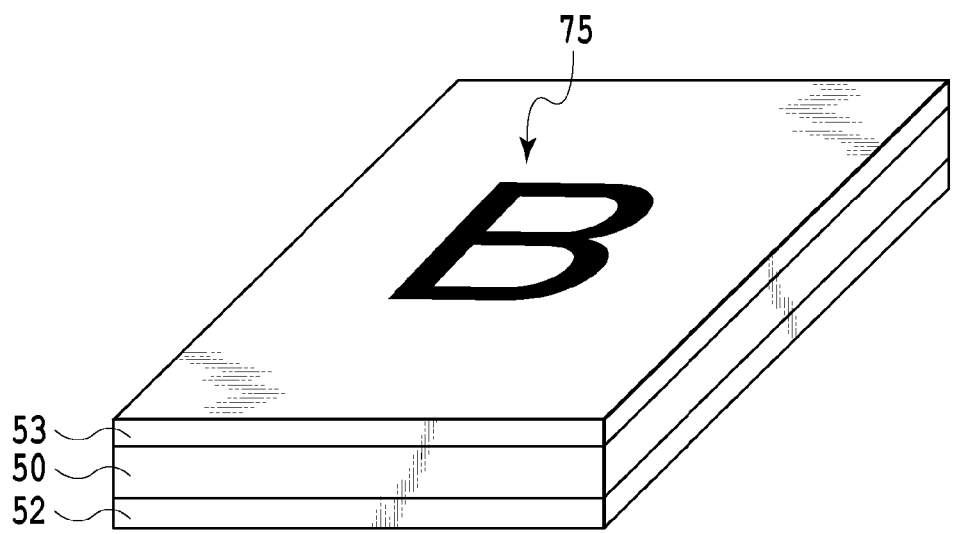
FIG. 4 is a perspective view schematically showing the embodiment where a normal image is printed on the heat sealable printing sheet of the present invention.
Figure 33:
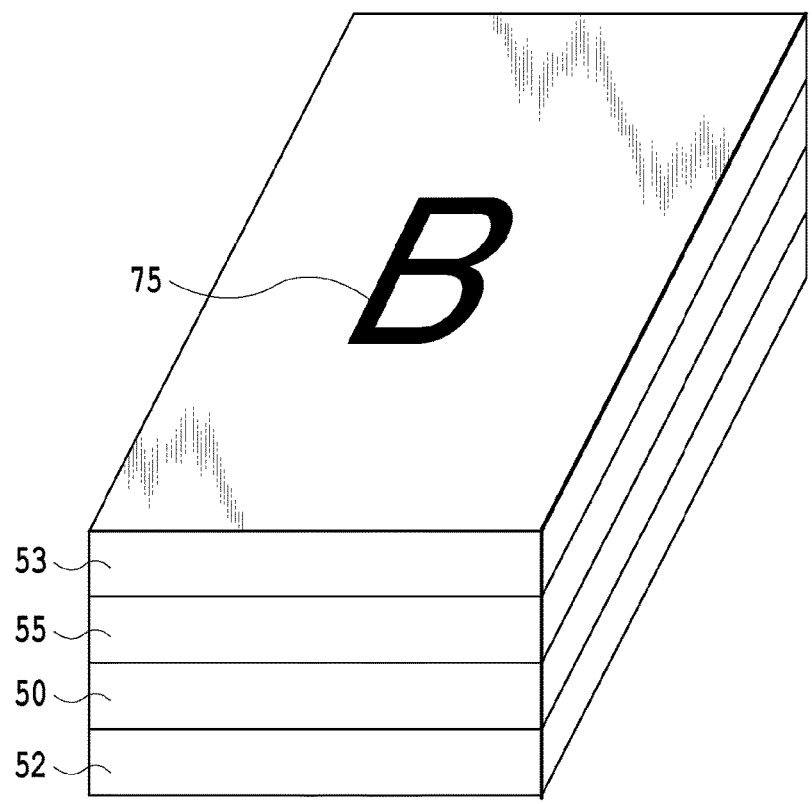
FIG. 33 is a schematically showing another embodiment in which a normal image is printed on the heat sealable printing sheet of the present invention.

On the other hand, the use examples of an image formed after the wrapped article is prepared include a case where a large number of personal customized images are printed in various ways; and the like. In this case, as shown in FIGS. 4, 5, and 33, after a wrapped article 21 is prepared by wrapping the packaged object 20 in such manner that the ink receiving layer 53 of the heat sealable printing sheet is located on the outer side while the heat sealable layer 52 is located on the inner side (i.e., the packaged object 20 is in contact with the heat sealable layer 52), a normal image 75 is printed on the wrapped article 21 (the ink receiving layer 53). Note that it is difficult to print an image on the prepared wrapped article by the gravure printing process. For this reason, an inkjet process capable of non-contact printing is preferable to print an image on the prepared wrapped article.

An image to be printed on the heat sealable printing sheet of the present invention may be an image formed using a dye ink, or may be an image formed using a pigment ink. For example, in the case where an image is formed before the wrapped article is prepared, the image is preferably formed using a pigment ink. When an image is formed using a pigment ink, water and a solvent in the ink hardly remain on the surface of the ink receiving layer, facilitating drying. This makes it possible to effectively prevent the migration (ink movement) due to the water and solvent. Further, the use of a pigment ink can enhance the light resistance and water resistance of an image to be formed. On the other hand, in the case where an image is formed after the wrapped article is prepared, the image is preferably formed using a dye ink. A dye ink permeates into the ink receiving layer. Hence, unlike the case of using a pigment ink which is likely to remain on the surface of the ink receiving layer, the image is unlikely to deteriorate due to rubbing or the like, and can keep the image quality favorably.

Figure 6:
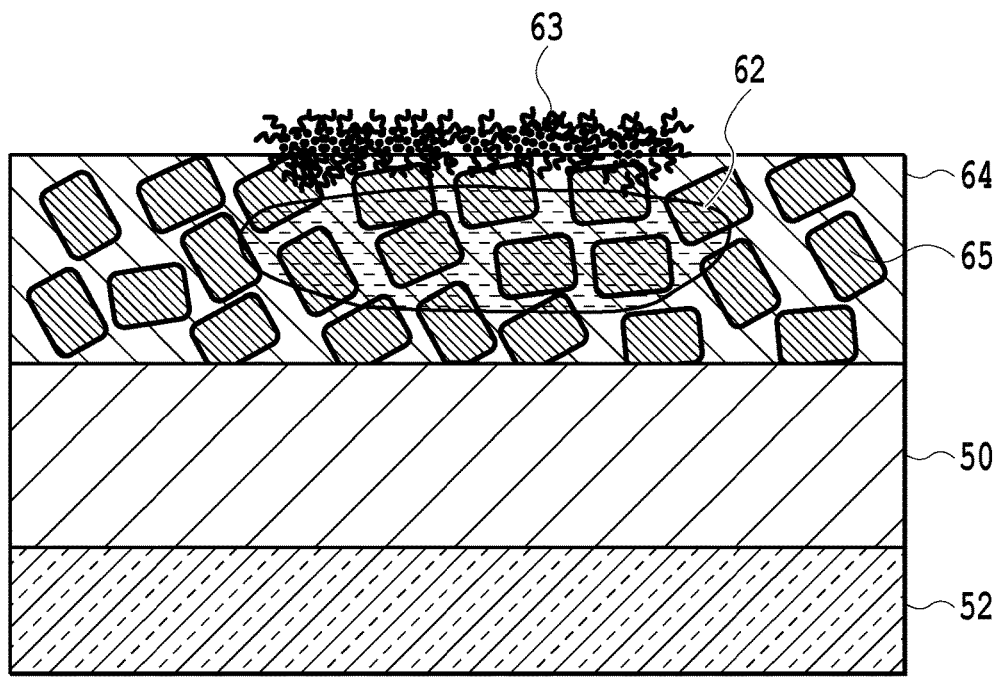
FIG. 6 is a cross-sectional view showing a state where a pigment ink is fixed to the heat sealable printing sheet of the present invention.

As shown in FIG. 6, a pigment component 63 in a pigment ink has large particle diameters, so that the pigment component 63 does not permeate into pores constituted by inorganic fine particles 65 in a gap-absorption-type ink receiving layer 64, and is fixed to the surface of the ink receiving layer 64. Meanwhile, a water-solvent component 62 in the pigment ink permeates into the ink receiving layer 64 and separates from the pigment component 63 (solid-liquid separation). Since the water-solvent component 62 stays inside the ink receiving layer 64, the pigment component 63 no longer touches the water-solvent component 62. Hence, the ink movement (migration) is prevented. On the other hand, as to a dye ink, the dye component 68 moves (migrates) as shown in FIG. 7 like the dye component 69 under the influence of water. Thus, even though bleeding occurs, a dye ink is excellent in abrasion resistance.

Meanwhile, as the pigment component in the pigment ink, a resin-dispersion-type pigment component is preferably used in which a resin covers the periphery of pigment particles. The use of the resin-dispersion-type pigment component makes it possible to increase the binding force between the pigment particles after the ink medium is separated. Thereby, a pigment film formed substantially blocks water on the pigment film from water in the ink receiving layer. Further, the water supply from a lower layer is also substantially blocked. Thus, when the amount of the water on the pigment film is small, sufficient drying is achieved by natural drying.

The resin covering the periphery of the pigment particles is preferably a (meth)acrylic acid ester-based copolymer having an acid value of 100 mgKOH/g or more but 160 mgKOH/g or less. The use of the (meth)acrylic acid ester-based copolymer having an acid value of 100 mgKOH/g or more enhances the ejection stability in an inkjet printing process in which an ink is ejected by a thermal process. On the other hand, when the (meth)acrylic acid ester-based copolymer having an acid value of 160 mgKOH/g or less is used, since the resin is more hydrophobic than the pigment particles, the ink fixability and bleeding resistance are favorable. Thus, the resin is suitable for high-speed ink fixation and high-speed printing.

The acid value of a resin means an amount (mg) of KOH required to neutralize 1 g of the resin, and is a physical property that can serve as an indicator for indicating the hydrophilicity of the resin. Note that the acid value of a resin can be calculated from a composition ratio of the monomer constituting the resin. Examples of the specific method for measuring an acid value of a resin include a potentiometric titration method using Titrino (manufactured by Metrohm) or the like, and other methods.

As the pigment ink, what is called an aqueous pigment ink is preferably used. The aqueous pigment ink is an ink obtained by dispersing a pigment in an aqueous medium. In addition, the aqueous pigment ink is a type called pigment-resin dispersion obtained by adsorbing a (meth)acrylic acid ester-based copolymer having a random structure to the pigment particle surface and dispersing the resultant in an aqueous medium. The method for producing the aqueous pigment ink is disclosed, for example, in Japanese Patent Publication No. 4956917 and so forth.

[7-1] Pigment

Examples of the pigment include carbon blacks, organic pigments, and the like. One type of the pigments can be used alone, or two or more types thereof can be used in combination. Specific examples of the carbon blacks include furnace black, lamp black, acetylene black, channel black, and the like. Examples of product names of the carbon blacks include Raven (manufactured by Columbian Chemicals Co.); Black Pearls L, Regal, Mogul L, Monarch, and Valcan (these are manufactured by Cabot Corporation); Color Black, Printex, and Special Black (these are manufactured by Degussa); and Mitsubishi Carbon Black (manufactured by Mitsubishi Chemical Corporation). It is a matter of course that the carbon black is not limited thereto, and conventionally known carbon blacks can also be used. The carbon black preferably has a primary particle diameter of 10 nm or more but 40 nm or less. The carbon black preferably has a specific surface area of 50 to 400 $m^2/g$ according to a BET method. The carbon black preferably has a DBP oil absorption amount of 40 to 200 mL/100 g measured according to the method in JIS K6221 A. The carbon black preferably has a volatile content of 0.5 to 10% by mass.

Specific examples of the organic pigments include: insoluble azo pigments such as toluidine red, toluidine maroon, hansa yellow, benzidine yellow, and pyrazolone red; soluble azo pigments such as lithol red, helio bordeaux, pigment scarlet, and permanent red 2B; derivatives from vat dyes such as alizarin, indanthrone, and thioindigo maroon; phthalocyanine-based pigments such as phthalocyanine blue and phthalocyanine green; quinacridone-based pigments such as quinacridone red and quinacridone magenta; perylene-based pigments such as perylene red and perylene scarlet; isoindolinone-based pigments such as isoindolinone yellow and isoindolinone orange; imidazolone-based pigments such as benzimidazolone yellow, benzimidazolone orange, and benzimidazolone red; pyranthrone-based pigments such as pyranthrone red and pyranthrone orange; thioindigo-based pigments; condensed azo-based pigments; thioindigo-based pigments; and other pigments such as flavanthrone yellow, acylamide yellow, quinophthalone yellow, nickel azo yellow, copper azomethine yellow, perinone orange, anthrone orange, dianthraquinonyl red, and dioxazine violet.

Moreover, examples of the organic pigments indicated by color index (C.I.) number include the following: C.I. Pigment Yellows 12, 13, 14, 17, 20, 24, 74, 83, 86, 93, 109, 110, 117, 120, 125, 128, 137, 138, 147, 148, 151, 153, 154, 166, and 168; C.I. Pigment Oranges 16, 36, 43, 51, 55, 59, and 61; C.I. Pigment Reds 9, 48, 49, 52, 53, 57, 97, 122, 123, 149, 168, 175, 176, 177, 180, 192, 215, 216, 217, 220, 223, 224, 226, 227, 228, 238, and 240; C.I. Pigment Violets 19, 23, 29, 30, 37, 40, and 50; C.I. Pigment Blues 15, 15:1, 15:3, 15:4, 15:6, 22, 60, and 64; C.I. Pigment Greens 7 and 36; and C.I. Pigment Browns 23, 25, and 26.

[7-2] Resin

A resin used in a pigment dispersion material is preferably one having a dispersing function to favorably disperse a hydrophobic pigment in an aqueous medium, and preferably a random copolymer. Note that a block copolymer is not preferable because many block copolymers increase the hydrophilicity of the pigment and are inferior in water resistance of the printed image.

The random copolymer is preferably a (meth)acrylic acid ester-based copolymer. The (meth)acrylic acid ester-based copolymer can be obtained by copolymerizing (meth)acrylic acid, (meth)acrylic acid ester, and a monoethylenically unsaturated monomer copolymerizable therewith. Examples of the (meth)acrylic acid include acrylic acid and methacrylic acid. Among these, (meth)acrylic acid is preferable because the range where the electrically neutral state and the anionic state coexist can be widely set.

Specific examples of the (meth)acrylic acid ester include: alkyl (meth)acrylates such as methyl (meth)acrylate, n-butyl (meth)acrylate, 2-ethylhexyl (meth)acrylate, n-octyl (meth) acrylate, dodecyl (meth)acrylate, octadecyl (meth)acrylate, cyclohexyl (meth)acrylate, and isobornyl (meth)acrylate; hydroxyalkyl (meth)acrylates such as 2-hydroxyethyl (meth)acrylate, 2-hydroxypropyl (meth)acrylate, and 3-hydroxypropyl (meth)acrylate; alkylene glycol mono(meth) acrylates such as diethylene glycol mono(meth)acrylate, triethylene glycol mono(meth)acrylate, polyethylene glycol mono(meth)acrylate, propylene glycol mono(meth)acrylate, dipropylene glycol mono(meth)acrylate, tripropylene glycol mono(meth)acrylate, tetramethylene ether glycol mono (meth)acrylate, a mono(meth)acrylate of random polymer glycol or block polymer glycol of polyethylene oxide-polypropylene oxide, and a mono (meth)acrylate of random polymer glycol or block polymer glycol of polyethylene oxide-polytetramethylene ether; glycidyl (meth)acrylate; benzyl (meth)acrylate; and the like.

As the constituent monomers, the (meth)acrylic acid ester-based copolymer may also contain a styrene-based monomer besides the (meth)acrylic acid, the (meth)acrylic acid ester, and the monoethylenically unsaturated monomer. Specific examples of the styrene-based monomer include styrene, α-methylstyrene, o-methylstyrene, m-methylstyrene, p-methylstyrene, p-t-butylstyrene, 4-methoxystyrene, 4-chlorostyrene, and the like. To put it differently, the (meth)acrylic acid ester copolymer is preferably a styrene-(meth)acrylic acid-based copolymer having a constituent unit derived from a styrene-based monomer.

The (meth)acrylic acid ester-based copolymer has a weight-average molecular weight (Mw) of preferably 6,000 to 12,000, furthermore preferably 7,000 to 9,000, in terms of styrene. The use of the (meth)acrylic acid ester-based copolymer having a weight-average molecular weight within the above-described range increases the dispersion stability of the pigment dispersion material, so that the viscosity can be set low. Moreover, such a (meth)acrylic acid ester-based copolymer suppresses kogation in a heater portion, and enables stable printing for a long period. If the (meth)acrylic acid ester-based copolymer has a weight-average molecular weight of less than 6,000, the dispersion stability of the aqueous pigment dispersion material is decreased in some cases. On the other hand, if the (meth)acrylic acid ester-based copolymer has a weight-average molecular weight of more than 12,000, this not only increases the viscosity of the aqueous pigment dispersion material, but also decreases the dispersibility as a trend. Further, such a (meth)acrylic acid ester-based copolymer is likely to cause kogation in the heater portion and a failure in ink-droplet ejection from a nozzle tip of a thermal inkjet printer in some cases.

[7-3] Pigment Dispersion Material

The pigment dispersion material can be prepared by, for example, covering a pigment with a resin such as a (meth) acrylic acid ester polymer, and by dispersing the resultant in an aqueous medium. The pigment in the pigment dispersion material has an average particle diameter of preferably 70 nm or more but 150 nm or less, furthermore preferably 80 nm or more but 120 nm or less, which is determined by a dynamic light scattering method. If the pigment has an average particle diameter of more than 150 nm, ink precipitation is promoted, which may impair the dispersion stability for a long period in some cases. On the other hand, if the pigment has an average particle diameter of less than 70 nm, it may be difficult to form an image having sufficient color developability and weatherability.

The average particle diameter of the pigment can be measured, for example, using FPAR-1000 (manufactured by Otsuka Electronics Co., Ltd., analysis by a cumulant method), Nanotrac UPA 150EX (manufactured by NIKKISO CO., LTD., the value takes a 50% integrated value), or the like, which utilize laser scattering.

The amount of the pigment in the ink is preferably 0.5% by mass or more but 10% by mass or less, furthermore preferably 1.0% by mass or more but 8.0% by mass or less, and particularly preferably 1.5% by mass or more but 6.0% by mass or less, relative to a total amount of the ink. If the pigment concentration is less than 0.5% by mass, it may be difficult to form an image having a sufficient color developability. On the other hand, if the pigment concentration exceeds 10.0% by mass, the ink viscosity is increased, making the ejection difficult in some cases.

The amount of the (meth)acrylic acid ester-based copolymer in the pigment dispersion material is preferably 0.2 to 1.0 parts relative to 1 part of the pigment. Setting the amount of the (meth)acrylic acid ester-based copolymer within the above-described range relative to 1 part of the pigment makes it possible to maintain the dispersibility of the pigment dispersion material and keep the ink viscosity low.

When the pigment is covered with the (meth)acrylic acid ester-based polymer, it is preferable to incorporate an acid precipitation step. The acid precipitation refers to an addition of an acidic substance to a liquid medium containing a pigment and a (meth)acrylic acid ester-based copolymer, which is dissolved in an aqueous solution of a basic substance, to return an anionic group in the (meth)acrylic acid ester-based copolymer to a functional group before neutralization, thereby precipitating the (meth)acrylic acid ester-based polymer on the pigment particle surface. Performing the acid precipitation step makes it possible to further increase the interaction between the pigment and the (meth)acrylic acid ester-based copolymer. As a result, composite particles in a microcapsule form can be dispersed in the aqueous dispersion. Moreover, the aqueous pigment dispersion material can exhibit more excellent effects in terms of physical properties such as achieved dispersion level, required dispersion time, and dispersion stability, as well as use applicabilities such as solvent resistance.

Next, a filtration step is performed to filter the obtained precipitate with an increased interaction. Preferably, after the filtration step is completed, a washing step is performed to wash the precipitate, thereby removing a free polymer. Then, a re-dispersion step is performed to disperse the precipitate in the aqueous medium together with the basic substance again. This makes it possible to obtain an aqueous pigment dispersion material more excellent in dispersion stability.

[7-4] Water Soluble Compound

The ink may contain a water soluble compound. The "water soluble compound" is a compound which readily mixes with water, or a compound having a solubility (25° C.) in water of 20 g/100 g or more. The water soluble compound is preferably at least one of water soluble organic solvents, and compounds which are solid at 25° C. Incorporating the water soluble compound makes it possible to prevent water vaporization to prevent ink fixation due to drying.

As the water soluble compound, various water soluble organic solvents can be used: for example, alcohols, polyhydric alcohols, glycol ethers, carboxylic acid amides, heterocycles, ketones, alkanolamines, and the like as follows. Moreover, it is also possible to use water soluble compounds which are solid at 25° C., such as urea, ethylene urea, and trimethylolpropane.

(1) Alcohols

Linear alcohols having 1 to 5 carbon atoms such as methanol, ethanol, n-propyl alcohol, isopropyl alcohol, n-butyl alcohol, sec-butyl alcohol, isobutyl alcohol, tert-butyl alcohol, and n-pentyl alcohol.

(2) Polyhydric Alcohols

Alkanediols such as ethylene glycol (ethanediol), propanediols (1,2-, 1,3-), butanediols (1,2-, 1,3-, 1,4-), 1,5-pentanediol, and 1,2-hexanediol; alkanediol condensates such as diethylene glycol, triethylene glycol, tetraethylene glycol, dipropylene glycol, tripropylene glycol, polyethylene glycol, and polypropylene glycol; and polyhydric alcohols other than alkanediols, such as glycerol, trimethylolpropane, 1,2,6-hexanetriol, and thiodiglycol.

(3) Glycol Ethers

Monomethyl ether of ethylene glycol; monomethyl ether and monoethyl ether of diethylene glycol; monomethyl ether, monoethyl ether, monobutyl ether, dimethyl ether, and diethyl ether of triethylene glycol; and dimethyl ether and diethyl ether of tetraethylene glycol.

(4) Carboxylic Acid Amides

N,N-dimethylformamide and N,N-dimethylacetamide.

(5) Heterocycles

Cyclic ethers such as tetrahydrofuran and dioxane; nitrogen-containing heterocycles such as 2-pyrrolidone, N-methyl-2-pyrrolidone, and N-methylmorpholine; and sulfur-containing heterocycles such as sulfolane.

(6) Ureas

Ureas such as urea, ethylene urea, and 1,3-dimethyl-2-imidazolidinone (N,N'-dimethylethyleneurea).

(7) Ketones

Ketones such as acetone and methyl ethyl ketone; and keto alcohols such as 4-hydroxy-4-methyl-2-pentanone (diacetone alcohol).

(8) Alkanolamines

Monoethanolamine, diethanolamine, and triethanolamine.

(9) Others

Sulfur-containing compounds such as dimethyl sulfoxide and bishydroxyethyl sulfone.

Among the water soluble organic solvents, polyhydric alcohols are preferable, and glycerol is furthermore preferable. Glycerol is preferable because it hardly volatilizes and the effect of preventing ink fixation is excellent. Moreover, one type of the water soluble organic solvents may be used alone, or two or more types thereof may be used in mixture. For example, glycerol, a polyhydric alcohol other than glycerol, and a nitrogen-containing heterocycle are also preferably used. In this event, triethylene glycol can be used as the polyhydric alcohol other than glycerol. In addition, 2-pyrrolidone or the like can be used as the nitrogen-containing heterocycle. Such mixed solvents are preferable because the effect of preventing ink thickening is high.

The content of the water soluble organic solvent is not particularly limited. Nevertheless, in order to obtain the effect of preventing vaporization of the aqueous medium to prevent ink fixation due to drying, the content is preferably 5% by mass or more, furthermore preferably 10% by mass or more, and particularly preferably 15% by mass or more, relative to the total mass of the ink. On the other hand, in order to be applicable also to a high driving frequency (driving frequency of a printing head configured to eject inks) and from the viewpoint of preventing mold formation, the content is preferably 50% by mass or less, furthermore preferably 40% by mass or less, and particularly preferably 30% by mass or less, relative to the total mass of the ink.

As the water soluble compound which is solid at 25° C., urea, ethylene urea, or the like is preferably used, and ethylene urea is furthermore preferably used. The content of the water soluble compound which is solid at 25° C. is not particularly limited. Nevertheless, in order to obtain the effect of preventing vaporization of the aqueous medium to prevent ink fixation due to drying, the content is preferably 5% by mass or more, furthermore preferably 9% by mass or more, relative to the total mass of the ink. On the other hand, in order to prevent a trouble by the excessive addition thereof, the content is preferably 40% by mass or less, furthermore preferably 30% by mass or less, and particularly preferably 15% by mass or less, relative to the total mass of the ink.

[7-5] Surfactant

The ink may contain a surfactant, as necessary, in order to control the surface tension of the ink to control the ink bleeding degree and permeability in an image printing medium at will, or to enhance the wettability of the ink in a printing head to prevent the kogation of the ink on a heater surface of the printing head and enhance the ejectability of the ink. A heater (electrothermal transducer element) is an element configured to generate an energy for ejecting an ink used in a thermal printing head. With this generated heat, bubbles are formed in the ink, and the ink can be ejected by utilizing the bubbling energy. Depending on an ink ejection process of a printing head, a piezoelectric element or the like can also be used as the ejection-energy generating element. Specific examples of the surfactant will be described below. Note that the following surfactants may be used alone, or multiple surfactants may be used in combination.

[Non-Ionic Surfactant]

Polyoxyethylene alkyl ethers, polyoxyethylene fatty acid esters, polyoxyethylene alkylphenyl ethers, polyoxyethylene·polyoxypropylene block copolymers, and the like. Fatty acid diethanolamides, acetylene glycol ethylene oxide adducts, acetylene glycol-based surfactants, and the like.

[Anionic Surfactant]

Polyoxyethylene alkyl ether sulfuric acid ester salts, polyoxyethylene alkyl ether sulfonic acid salts, polyoxyethylene alkylphenyl ether sulfuric acid salts, polyoxyethylene alkylphenyl ether sulfonic acid salts, and the like. Alpha-sulfo-fatty acid ester salts, alkylbenzenesulfonic acid salts, alkylphenolsulfonic acid salts, alkylnaphthalenesulfonic acid salts, alkyltetralinsulfonic acid salts, dialkylsulfosuccinic acid salts, and the like.

[Cationic Surfactant]

Alkyltrimethylammonium salts, dialkyldimethylammonium chlorides, and the like.

[Amphoteric Surfactant]

Alkylcarboxybetaines and the like.

Among these, acetylene glycol-based surfactants, polyoxyethylene alkyl ethers, and the like are particularly preferable because the ink ejection stability can be enhanced.

A compound represented by the following general formula (5) (ethylene oxide adduct of 2,4,7,9-tetramethyl-5-decyne-4,7-diol) is preferably used as the acetylene glycol-based surfactant.

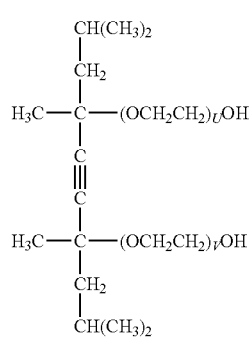

(5)

(In the general formula (5), U and V each independently represent an integer of 1 or more, but U+V is an integer of 2 to 20.)

[7-6] Water

As the water, deionized water (ion exchanged water) is preferably used. The content of the water in the ink is not particularly limited. Nevertheless, the content is preferably 30% by mass or more but 90% by mass or less, furthermore preferably 40% by mass or more but 85% by mass or less, and particularly preferably 50% by mass or more but 80% by mass or less, relative to the total mass of the ink. Setting the water content in the ink to 30% by mass or more makes it possible to hydrate the pigment and the water soluble compound, and prevent the agglomeration the pigment and the water soluble compound. On the other hand, setting the water content in the ink to 90% by mass or less increases the amount of the water soluble compound relatively. Hence, even when volatile components (such as water) in the aqueous medium volatilize, the dispersed state of the pigment can be maintained, making it possible to prevent the deposition and solidification of the pigment.

[7-7] Additives

The ink may contain additives other than the surfactant, depending on the purpose. Examples of the additives include pH regulators, rust inhibitors, preservatives, antifungals, antioxidants, reduction inhibitors, salts, and the like.

[7-8] Viscosity

The ink has a viscosity η of preferably 1.5 mPa·s or more but 5.0 mPa·s or less, furthermore preferably 1.6 mPa·s or more but 3.5 mPa·s or less, and particularly preferably 1.7 mPa·s or more but 3.0 mPa·s or less. Setting the ink viscosity to 1.5 mPa·s or more makes it possible to form favorable ink droplets. On the other hand, setting the ink viscosity to 5.0 mPa·s or less enhances the ink flowability, and enhances the ink supply to a nozzle and consequently the ink ejection stability.

The viscosity of an ink means a value measured using an E-type viscometer (such as, for example, "RE-80L viscometer" manufactured by Toki Sangyo Co., Ltd.) under a temperature condition of 25° C. according to JIS Z 8803. The ink viscosity of an ink can be adjusted by the type and amount of the water soluble organic solvent, and the like, besides the type and amount of the surfactant.

[7-9] Surface Tension

The ink preferably has a surface tension γ of 25 mN/m or more but 45 mN/m or less. Setting the surface tension to 25 mN/m or more makes it possible to maintain the meniscus of the ink at ejection openings of a printing head, preventing the ink from flowing out from the ejection openings. Meanwhile, setting the surface tension to 45 mN/m or less makes it possible to optimize the absorption rate of the ink to a printing medium, preventing fixation failure due to insufficient ink absorption.

The surface tension of an ink means a value measured by a plate method using a platinum plate and an automatic surface tensiometer (such as, for example, "CBVP-Z type" manufactured by Kyowa Interface Science Co., LTD.) under a temperature condition of 25° C. The surface tension of an ink can be adjusted by the amount of the surfactant added, the type and content of the water soluble organic solvent, and the like.

[7-10] pH

The ink has a pH of preferably 7.5 or more but 10.0 or less, more preferably 8.5 or more but 9.5 or less. If the ink has a pH of less than 7.5, the dispersion stability of the pigment particles is decreased, and the pigment particles are likely to agglomerate in some cases. On the other hand, if the ink has a pH of more than 10.0, since the ink pH is too high, a chemical attack occurs, depending on a member of the apparatus used, through the contact with the ink, so that an organic matter or an inorganic matter are eluted into the ink, causing ink ejection failure in some cases. The pH of an ink means a value measured using a pH meter (such as, for example, D-51 manufactured by HORIBA, Ltd.) under a temperature condition of 25° C.

[7-11] Printing of Image

An image can be printed on the ink receiving layer of the heat sealable printing sheet of the present invention by applying an ink thereto by an inkjet printing process.

The inkjet printing process is a process of printing an image by ejecting inks (ink droplets) to a heat sealable printing sheet from multiple nozzles formed in a printing head. The type of the inkjet printing process is not particularly limited, and any of a thermal process and a piezo process can be suitably used. In the thermal process, a heater (electrothermal transducer element) is used as an ejection-energy generating element, and an ink is subjected to film boiling by the heat of the heater generated according to a driving pulse. Utilizing the bubbling energy in this event, an ink droplet is ejected from an ejection opening of a nozzle. Such a thermal inkjet printing process is preferable because a high-resolution image can be printed in comparison with other processes.

The inkjet printing process can be performed using an inkjet printing apparatus (inkjet printer). In an inkjet printer, a printing head does not come into contact with a heat sealable printing sheet during image printing, so that the inkjet printer is capable of quite stable image printing and thus preferable. The type of the inkjet printer is not particularly limited. Nevertheless, it is preferable to use a full-line inkjet printer including a line head. The line head is a head in which a large number of multi-nozzle heads including multiple nozzles each formed of an ink ejection opening, an ink flow path, and so forth are arranged in a direction perpendicular to a conveyance direction of a heat sealable printing sheet. Such a full-line inkjet printer is preferable because it is capable of image printing by simultaneously ejecting inks from the multiple ejection openings in accordance with the conveyance of a heat sealable printing sheet, and accordingly capable of high-speed printing of a high-quality, high-resolution image.

The amount of ink ejected from a printing head is preferably 20 pL or less, furthermore preferably 10 pL or less, and particularly preferably 5 pL or less. Setting the amount of ink ejected to 20 pL or less makes it possible to suppress the spread of the ink on the ink receiving layer, enabling printing of a dense image with a sufficient density and suppressing the thickness of an image layer (ink layer).

Moreover, as the inkjet printing process, it is also possible to employ a serial-head inkjet printing process for printing an image by repeating: an operation of moving a printing head while ejecting inks from the printing head; and an operation of conveying the heat sealable printing sheet. The serial head can reduce the size of ink droplets, and accordingly can easily print a high-quality image.

[7-12] Marking Process

Figure 8:
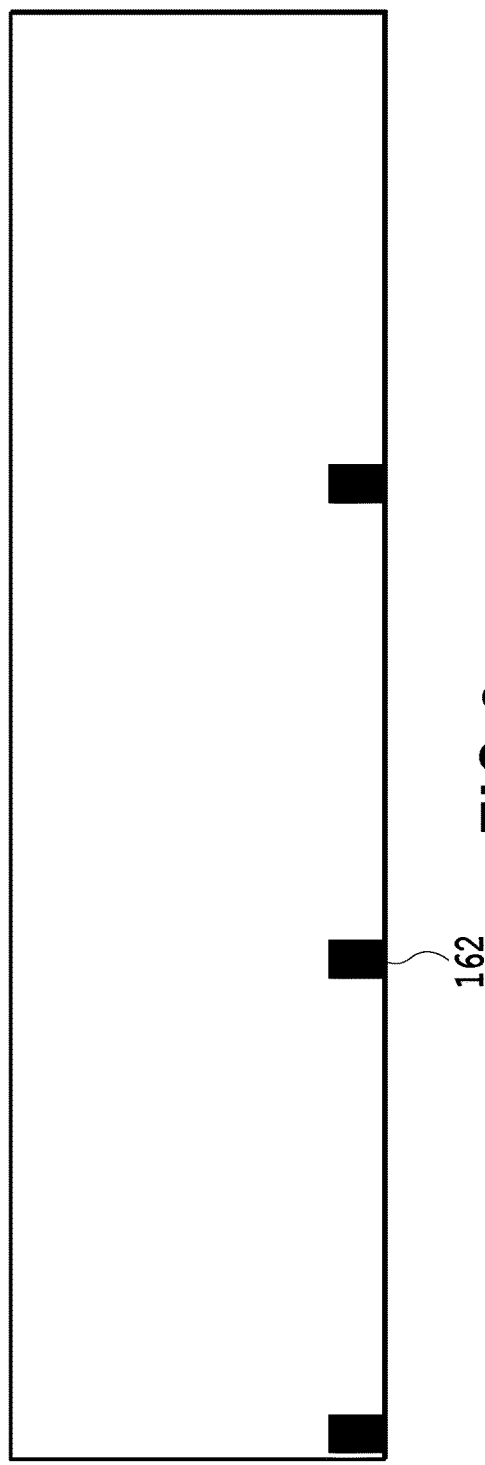
FIG. 8 is a top view showing a state where a marking is printed on the heat sealable printing sheet of the present invention.
Figure 9:
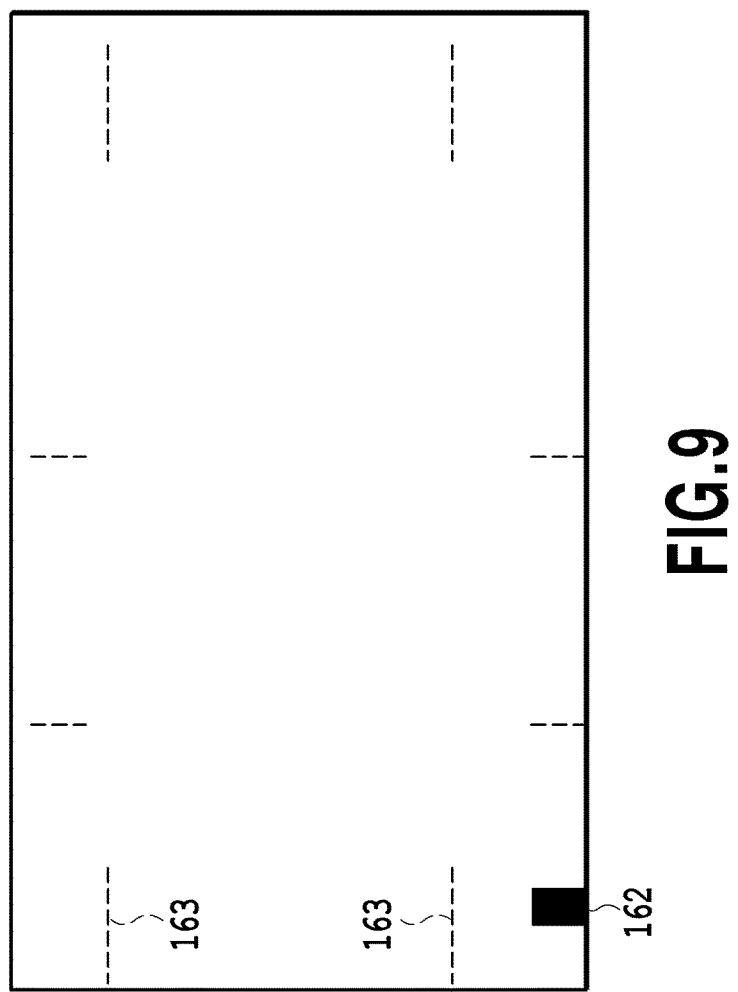
FIG. 9 is a top view showing a state where a pasting guide is printed on the heat sealable printing sheet of the present invention.

Further, when an image is printed, a marking 162 can be printed on a heat sealable printing sheet as shown in FIG. 8 to adjust the position of the heat sealable printing sheet to a packaged object. A position where the heat sealable printing sheet is pasted can be accurately determined by reading the marking 162 with a transmissive or reflective sensor. Moreover, by printing a pasting guide 163 on a heat sealable printing sheet in addition to the marking 162 as shown in FIG. 9, position adjustment of a packaged object and folding operation of the heat sealable printing sheet (folding-position adjustment) can be precisely performed when the packaged object is wrapped with the heat sealable printing sheet.

[7-13] Drying of Ink

When an image is printed using an ink on the heat sealable printing sheet of the present invention, the ink is dried until the amount of the water in the ink reaches preferably 70% by mass or less, furthermore preferably 50% by mass or less, relative to a total ink ejection amount. This makes it possible to prevent the ink on the heat sealable printing sheet from being transferred to the packaged object.

The total ink ejection amount can be adjusted by the amount of ink ejected from a printing head. The amount of ink ejected (ink ejection amount) may be restricted by processing such as reducing the number of ink dots formed during image printing in advance in a way that the water content can be easily controlled.

The ink can be dried with a heater (heat source) such as a halogen heater, an exhaust device such as a fan, or the like. Alternatively, natural drying may be promoted by conveying the heat sealable printing sheet on a sufficiently long conveyance path without providing special drying means such as a heater.

[8] Wrapping and Thermal Pressure Bonding of Heat Sealable Printing Sheet

The heat sealable printing sheet of the present invention can be used for wrapping a packaged object. Hereinafter, description will be given of the wrapping method by taking examples of caramel wrapping and bag-shaped wrapping. However, the wrapping method is not limited to the methods described below.

Figure 10:
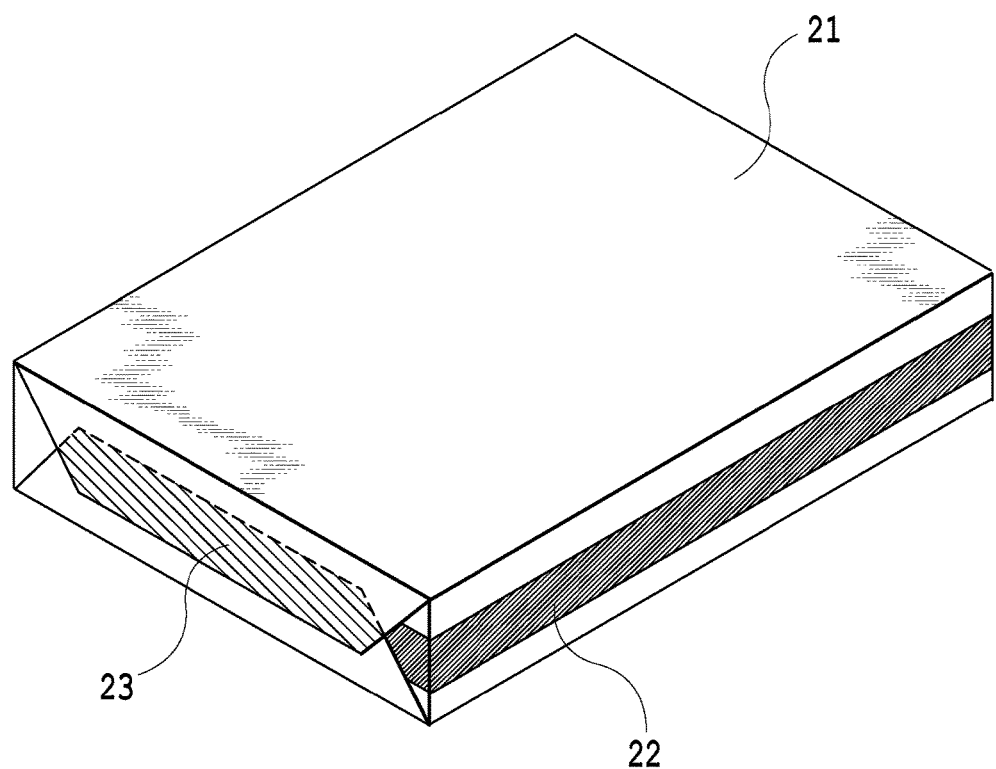
FIG. 10 is a perspective view schematically showing one example of a wrapped article.

FIG. 10 is a perspective view schematically showing one example of a wrapped article. The wrapped article 21 shown in FIG. 10 is obtained by wrapping packaged object with the heat sealable printing sheet in a caramel wrapping way. The surface of the wrapped article 21 may be the ink receiving layer, or may be the heat sealable layer, which can be selected depending on the use. Overlapping portions 22 and 23 are portions where the ink receiving layer and the heat sealable layer adhere to each other. By subjecting the ink receiving layer and the heat sealable layer to thermal pressure bonding at the overlapping portions 22 and 23, the wrapped article 21 is formed. In other words, by making the ink receiving layer and the heat sealable layer capable of adhering to each other by thermal pressure bonding, the wrapped article 21 is prepared.

Figure 28:
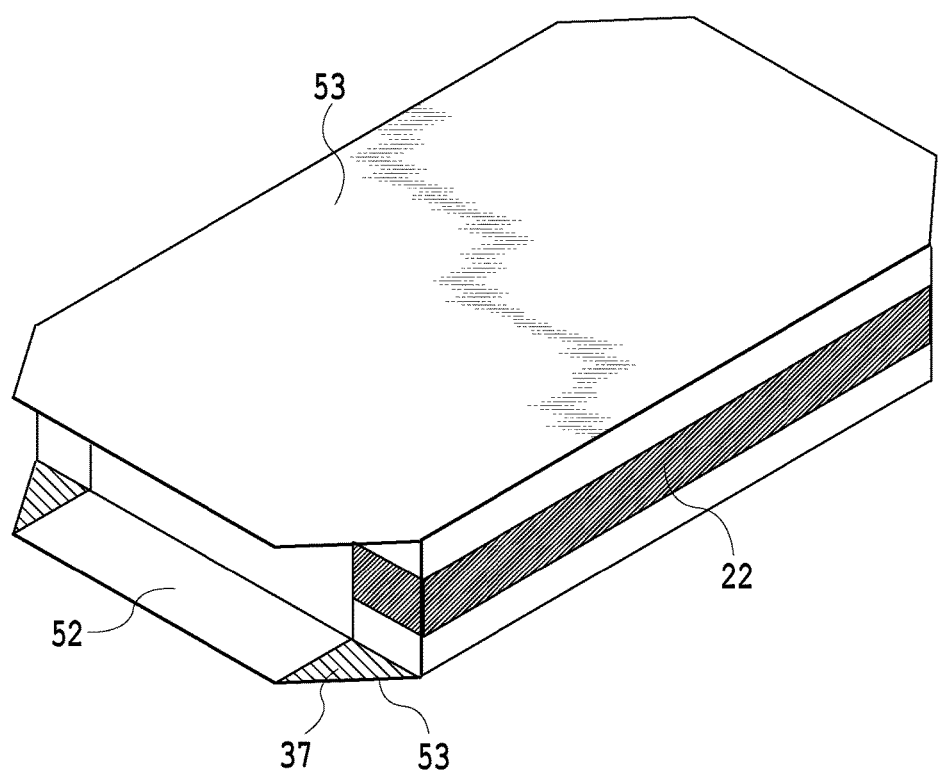
FIG. 28 is a perspective view schematically showing one example of a caramel-wrapping formation process.
Figure 29:
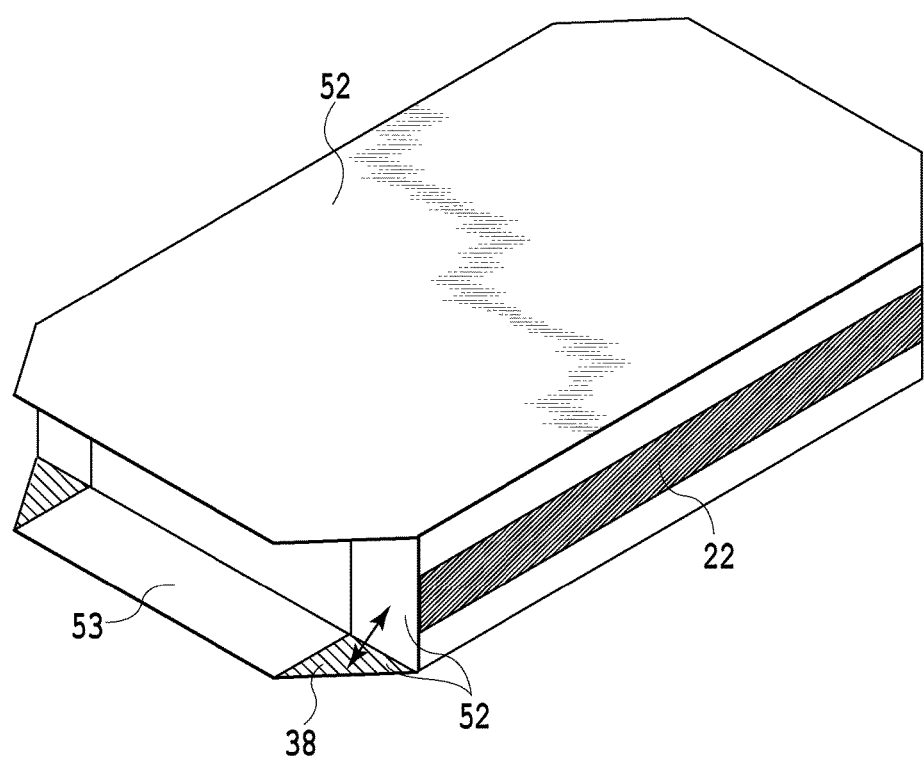
FIG. 29 is a perspective view schematically showing another example of the caramel-wrapping formation process.

FIG. 28 is a perspective view schematically showing one example of a caramel-wrapping formation process. Moreover, FIG. 29 is a perspective view schematically showing another example of the caramel-wrapping formation process. FIG. 28 shows the case where the ink receiving layer 53 is located on the surface of the wrapped article, and an image can be printed after the wrapped article is formed. Meanwhile, FIG. 29 shows the case where the heat sealable layer 52 is located on the surface of the wrapped article, and an image can be printed before the wrapped article is formed. In the process of forming the wrapped article, an overlapping portion 37 shown in FIG. 28 is a place where the heat sealable layer 52 is in contact with itself. On the other hand, in FIG. 29, the heat sealable layers 52 on side surfaces indicated by the arrows come into contact with on an outer side of an overlapping portion 38 shown in the drawing. By providing the heat sealable layer to one surface of the base member as described above, the heat sealable layer can adhere to itself. This makes the adhesiveness at the overlapping portion 23 shown in FIG. 10 favorable, and can prevent a float at the overlapping portion attributable to adhesion failure.

Further, as shown in FIG. 28, the heat sealable layer 52 is in contact with itself on an inner side of the triangular overlapping portion 37, and these heat sealable layers 52 can thermally adhere to each other. Hence, the next trapezoidal folding portions (thermally adhering portions between the heat sealable layer 52 and the ink receiving layer 53, and thermally adhering portions between the ink receiving layers 53) are precisely folded, so that the wrapped article can be prepared stably. On the other hand, as shown in FIG. 29, the ink receiving layer 53 is in contact with itself on an inner side of the triangular overlapping portion 38, and these ink receiving layers 53 can thermally adhere to each other. Hence, the next trapezoidal folding portions (thermally adhering portions between the ink receiving layer 53 and the heat sealable layer 52, and thermally adhering portions between the heat sealable layers 52) are precisely folded, so that the wrapped article can be prepared stably.

Figure 11:
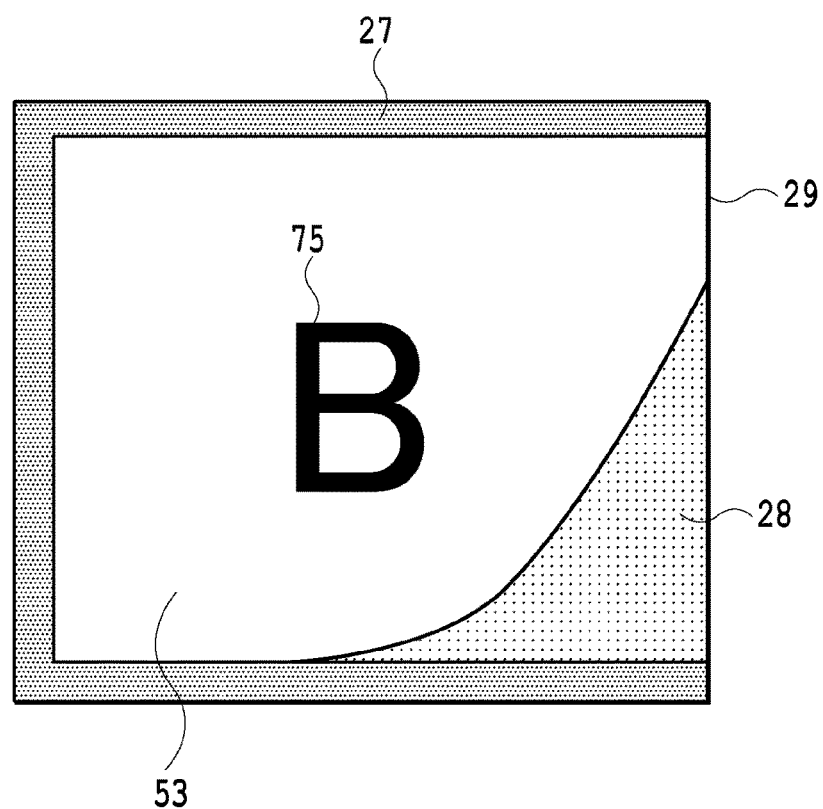
FIG. 11 is a top view schematically showing another example of the wrapped article.
Figure 30:
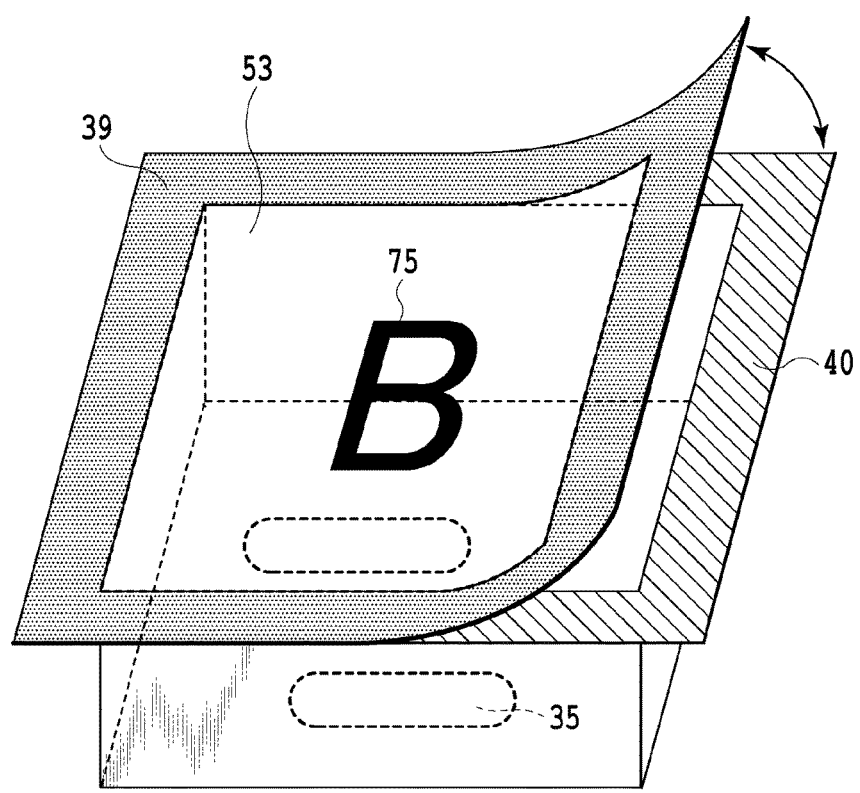
FIG. 30 is a perspective view schematically showing the another example of the wrapped article.

FIG. 11 is a top view schematically showing another example of the wrapped article. The wrapped article shown in FIG. 11 is a bag-shaped wrapped article obtained by wrapping a powder 28 or the like with the heat sealable printing sheet. The heat sealable printing sheet is folded at a folding portion 29 in such a manner that the heat sealable layer is located on the inner side while the ink receiving layer is located on the outer side. Then, an overlapping portion 27 where the heat sealable layer overlaps with itself is subjected to thermal pressure bonding (butt seemed), so that the wrapped article can be prepared. After the wrapped article is prepared, the normal image 75 is printed on the ink receiving layer 53 on the outer side. FIG. 30 is a perspective view schematically showing the another example of the wrapped article. The wrapped article shown in FIG. 30 is a tablet wrapped article obtained by placing a content 35 or the like in a hollow portion thereof, and sealing an opening of the hollow portion with the heat sealable printing sheet. At the opening of the hollow portion where the content 35 is placed, a heat sealable layer 40 is provided on a surface in contact with the heat sealable printing sheet. The heat sealable layer 40 is in contact with the heat sealable layer of the heat sealable printing sheet at an overlapping portion 39. By subjecting the overlapping portion 39 to pressure bonding, the wrapped article can be prepared. After the wrapped article is prepared, the normal image 75 is printed on the ink receiving layer 53 on the outer side. In this event, the inkjet process capable of non-contact image printing can reduce heat damage to the content. For this reason, the inkjet process is preferable because it is capable of printing an image on the wrapped article after the content (the powder 28) is sealed, unlike a thermal transfer process.

Note that in the case where the heat sealable printing sheet of the present invention is used as a wrapping film, examples of an applicable method for heat-sealing the sealed portion as described above include an impulse sealing method, a thermal cutting-sealing method, an impulse cutting-sealing method, a melt sealing method, a high-frequency sealing method, an ultrasonic sealing method, and the like, besides a heat-sealing method in which a hot plate heated to a certain temperature is pressure-bonded to a surface to be sealed.

The temperature of the thermal pressure bonding is preferably set to 60° C. or more, and furthermore preferably set to 60° C. or more but 160° C. or less. Setting the temperature of the thermal pressure bonding to 60° C. or enables the heat sealable layer and the ink receiving layer to adhere to each other, and the heat sealable layer to adhere to itself. On the other hand, setting the temperature of the thermal pressure bonding to 160° C. or less makes it possible to avoid thermal deformation of the base member due to excessive heat. Moreover, the deformation of the packaged object can be prevented by brief heating within the above-described temperature range. Further, it is possible to prevent the heat sealable layer from sticking to the packaged object.

[9] Unwrapping of Wrapped Article

Figure 12:
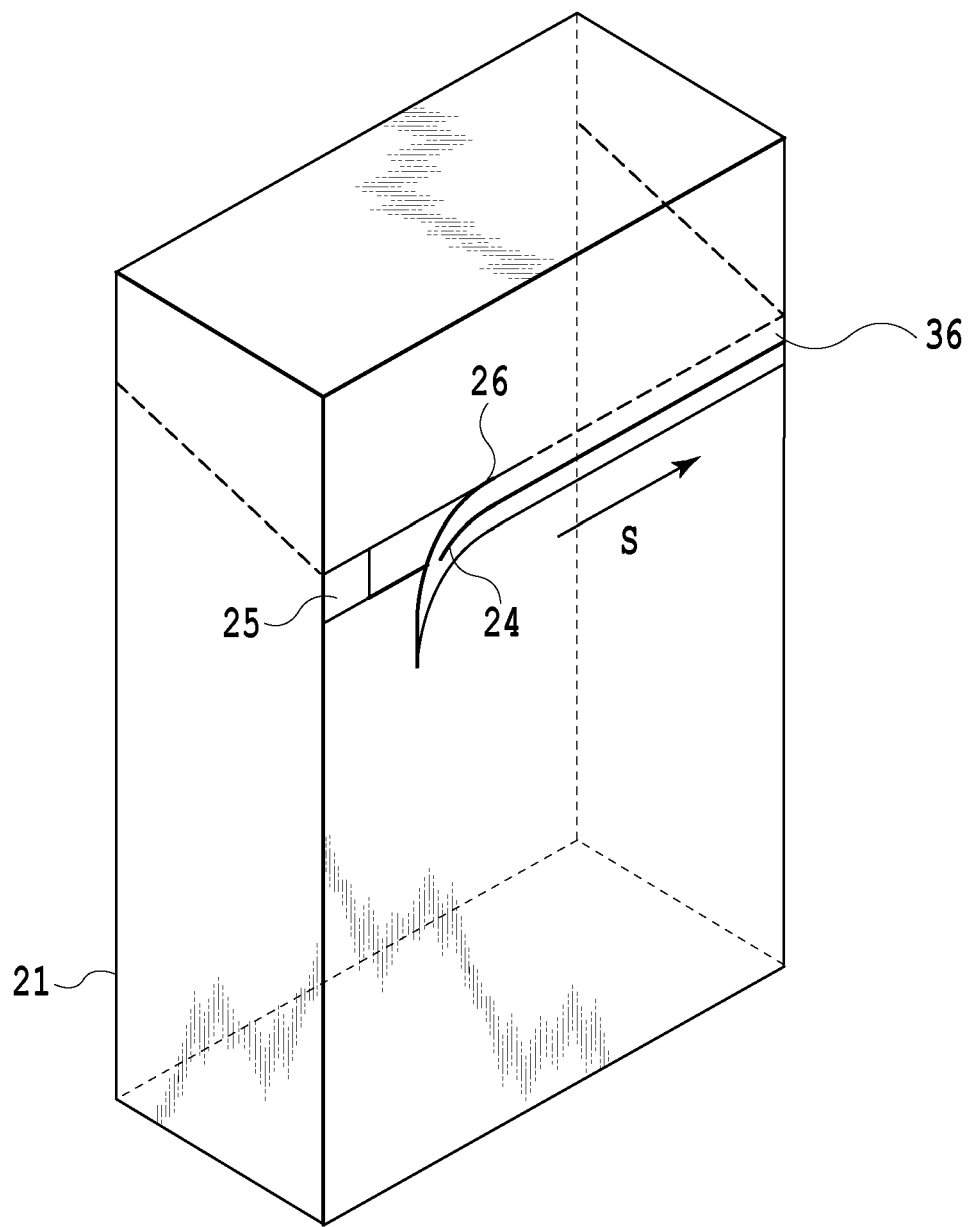
FIG. 12 is a perspective view schematically showing a process of unwrapping of the wrapped article.

As shown in FIG. 12, a pinch portion 24 can be formed by partially providing a cut 25 in the wrapped article 21. As soon as the user pinches and pulls the pinch portion 24 with hand in a direction of the arrow S, a torn portion 26 is formed from the pinch portion 24. Thereby, the wrapped article 21 can be unwrapped easily. Since the heat sealable printing sheet of the present invention has a favorable adhesiveness between the ink receiving layer and the base member, it is possible to prevent a burr at the torn portion 26 and prevent the ink receiving layer from peeling off from the base member. Note that, for precise unwrapping, the pinch portion 24 is preferably provided with a pinch core 36 having a high strength additionally. The pinch core 36 can be formed by lamination or other methods. In the present invention, the pinch core 36 can be formed on top of the ink receiving layer or the heat sealable layer. As the pinch core, known pinch cores can be used, and Supastip (manufactured by PAYNE) or the like is preferably used. In addition, the pinch core is preferably disposed perpendicularly to a direction in which the base member is extended because the unwrapping characteristics can be further enhanced.

[10] First Production Apparatus

Figure 13:
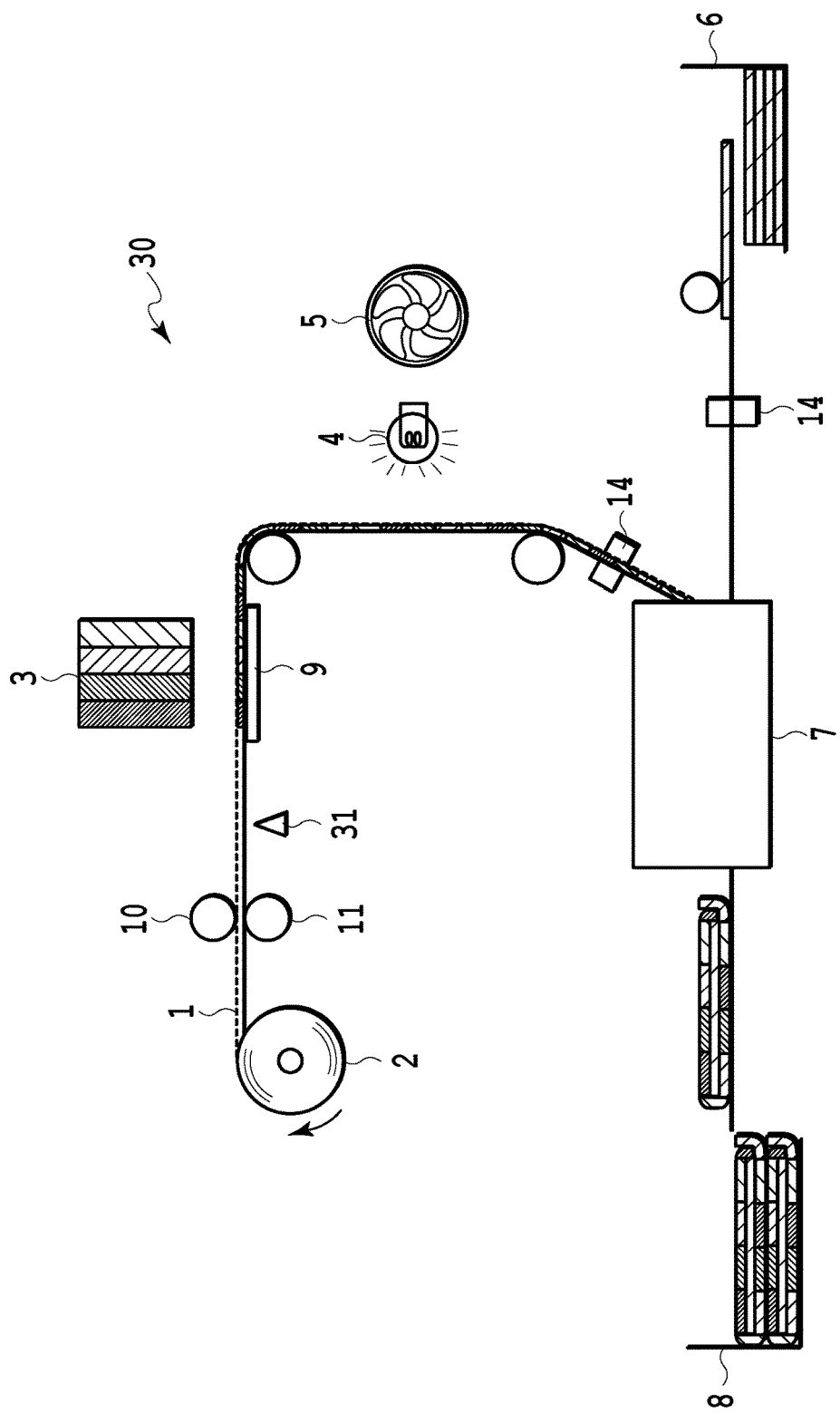
FIG. 13 is aside view schematically showing a first configuration example of a production apparatus for preparing a wrapped article using the heat sealable printing sheet of the present invention.

FIG. 13 is a side view schematically showing a first configuration example of a production apparatus (hereinafter also referred to as "first production apparatus") for preparing a wrapped article using the heat sealable printing sheet of the present invention.

[10-1] Main Configuration

A production apparatus 30 includes: a feeder 2 configured to feed, to a conveyance path, the heat sealable printing sheet 1 wound into a roll shape in such a manner that the ink receiving layer is located on the outer surface; and a printer 3 configured to print an image on the heat sealable printing sheet 1 fed to the conveyance path by directly ejecting an aqueous ink containing a coloring material, water, a non-volatile organic solvent, and so on.

Moreover, the production apparatus 30 includes: a dryer 4 configured to vaporize the water from the heat sealable printing sheet 1 provided with the ink to enhance the ink fixability; and a fan 5 configured to prevent dew in the apparatus attributable to the vaporized water.

Further, the production apparatus 30 includes: a packaged object supplier 6 configured to supply a packaged object; a wrapper 7 configured to wrap the packaged object with the heat sealable printing sheet 1; and a discharger 8 configured to discharge a wrapped article.

[10-2] Operations

The feeder 2 rotates the heat sealable printing sheet 1, which is wound into the roll shape in such a manner that the ink receiving layer is located on the outer surface, in a direction indicated by the arrow in the drawing and thereby feeds the heat sealable printing sheet 1 to the printer 3. In this event, the heat sealable printing sheet 1 is conveyed in a flat state to the printer 3, while being guided by a guide plate 9 and sandwiched between a grip roller 10 and a nip roller 11.

When the conveyance of the heat sealable printing sheet 1 is started from the feeder 2, the printer 3 prints an image on the ink receiving layer of the heat sealable printing sheet 1. Then, the heat sealable printing sheet 1 passes through the dryer 4. The dryer 4 vaporizes the water and the like in the ink for printing the image, and the fan 5 exhausts the vaporized water. Thereby, the heat sealable printing sheet 1 having the image printed on the ink receiving layer is obtained. In this event, a marking is also printed to precisely perform a folding operation during wrapping.

On the other hand, the packaged object supplier 6 supplies packaged objects one by one. The heat sealable printing sheet 1 and the packaged objects are conveyed to the wrapper 7. The wrapper 7 wraps each packaged object with the heat sealable printing sheet 1, and a wrapped article is obtained by thermal pressure bonding. In this event, a pinch portion can be formed on the wrapped article by cutting. By such operations of the wrapper 7, a wrapped article can be obtained.

[10-3] Connection Between First Production Apparatus and Controller

Figure 14:
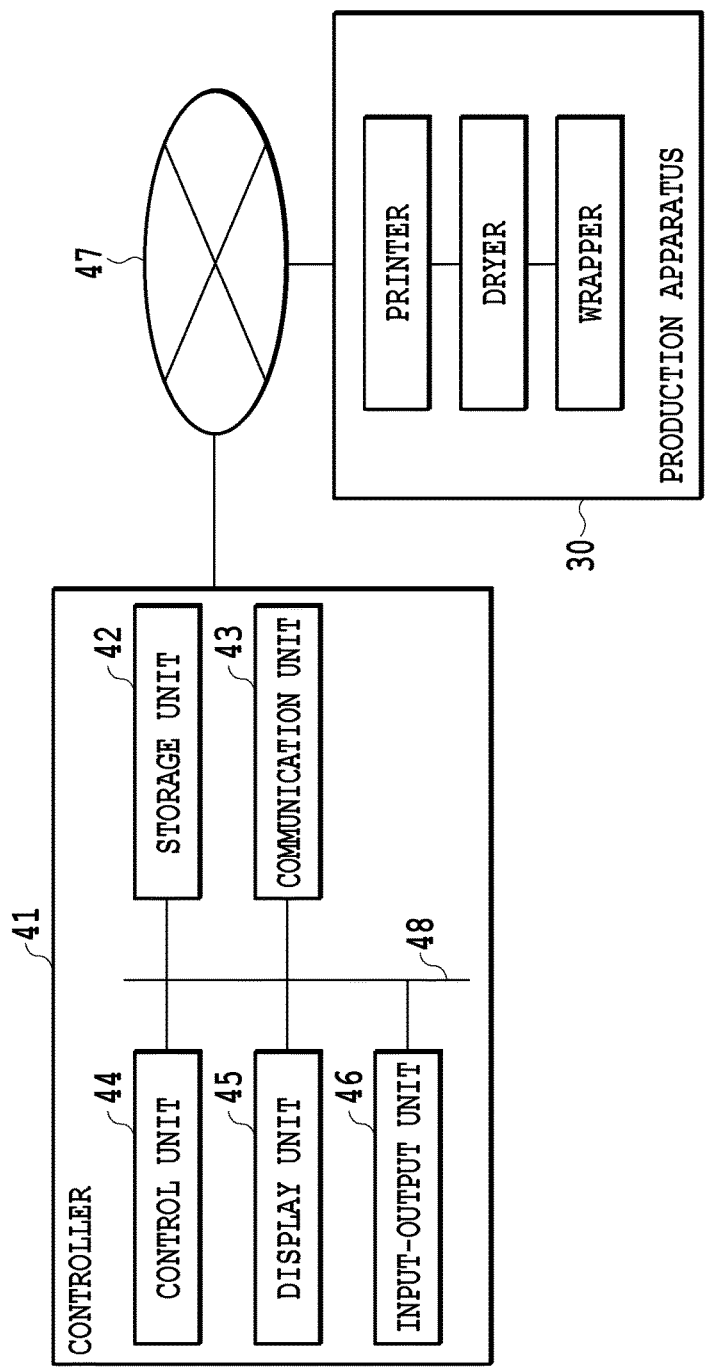
FIG. 14 is a block diagram showing a connection state between the first production apparatus and a controller.

As shown in FIG. 14, the production apparatus 30 is connected to a controller 41 via a network 47. Nevertheless, the production apparatus 30 can also be connected to the controller 41 via a serial port, a parallel port, or a USB port instead of the network 47. The production apparatus 30 including the printer, the dryer, the wrapper, and so forth, and also includes a CPU to be described later. The CPU is connected to the printer, the dryer, and the wrapper. The CPU is configured to control the operations of the printer, the dryer, and the wrapper. In this example, the printer includes the CPU.

The network 47 is a network such as the Internet or a local area network (LAN), and may be a wired network or a wireless network. The controller 41 is a computer for controlling the production apparatus 30. In the controller 41, a control unit 44, a display unit 45, an input-output unit 46, a storage unit 42, and a communication unit 43 are connected to each other through a system bus 48. Moreover, a digital camera, a driver configured to read image data or the like, and so forth may also be connected to the controller 41 in some cases. Further, a plate-making apparatus or the like may be connected to the controller 41.

The control unit 44 has a central processing unit (CPU), a random access memory (RAM), a read only memory (ROM), and the like. The CPU is configured to call programs stored in the printer, the ROM, and the like, to a work memory area on the RAM, and execute the programs to perform arithmetic processing and operation control, thereby controlling the entire system. The ROM is a nonvolatile memory configured to permanently hold a program, data, and the like. Moreover, the RAM is a volatile memory configured to temporarily hold a program, data, and the like.

The display unit 45 is, for example, a display device such as a CRT monitor or a liquid crystal panel; and a display device for a logic circuit (such as a video adapter) for realizing a video function of a computer in cooperation with the display device.

The input-output unit 46 is a unit where data is inputted and outputted. A part where data is inputted is, for example, a keyboard, a pointing device such as a mouse, a numeric keypad, and the like. Through these input units, an operation instruction, a movement instruction, a data input, a maintenance management, and the like can be performed on the controller 41. Moreover, the input-output unit 46 is connected to a scanner, the driver, and the like, which are not shown, and is configured to transfer inputted data from these external devices to the control unit 44, and output the data to the external devices.

The storage unit 42 is a unit configured to store data, and includes a magnetic disk, a memory, an optical disk unit, and the like. The storage unit 42 stores a program executed by the control unit 44, data necessary for the program to be executed, an operating system (OS), and the like. Moreover, the storage unit 42 may also store a pattern to be printed by the printer of the production apparatus 30. The communication unit 43 is a communication interface configured to mediate communications between the controller 41 and the network 47, and has a communication control unit, a communication port, and the like. Note that a personal computer or the like can also be used in place of the controller 41.

[10-4] Control System

Figure 15:
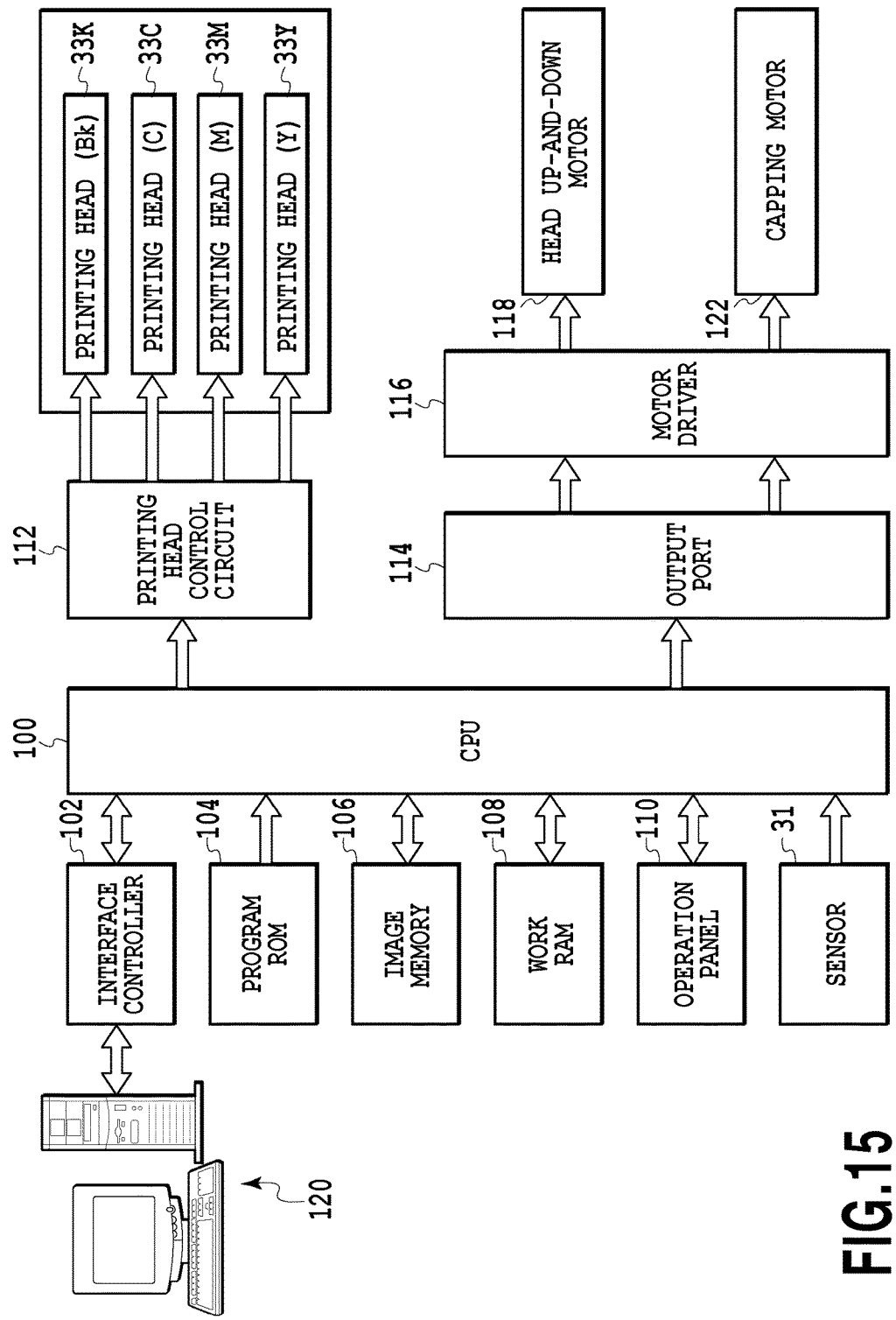
FIG. 15 is a block diagram showing a configuration of a control system provided in a printer shown in FIG. 13.

FIG. 15 is a block diagram showing a configuration of a control system provided in the printer shown in FIG. 13. A CPU 100 receives printing data and command transmitted from a host PC 120 via an interface controller 102. The CPU 100 is an arithmetic processing unit configured to perform general control such as the reception of the printing data of the printer, printing operation, and handling of rolls. The CPU 100 analyzes a received command, and then performs bit map development of image data on each color component of the printing data to an image memory 106. As an operation process before the printing operation, the CPU 100 drives a capping motor 122 and a head up-and-down motor 118 via an output port 114 and a motor driver 116, and moves each printing head 33K, 33C, 33M, and 33Y from a capping position (wait position) away to a printing position (image forming position).

Subsequently, a sensor 31 (tip detection sensor) in FIG. 13 detects the position of the heat sealable printing sheet 1 in order to determine timing (printing timing) when to start ejecting an ink to the heat sealable printing sheet 1 conveyed at a constant speed. Then, in synchronization with the conveyance of the heat sealable printing sheet 1, the CPU 100 sequentially reads out the printing data corresponding to each ink color from the image memory 106, and transmits the printing data to the respective printing heads 33K, 33C, 33M, and 33Y via a printing head control circuit 112. Thereby, ejection-energy generating elements provided in the nozzles of the printing heads are driven according to the printing data, and ink droplets are ejected from the corresponding nozzles by the driven ejection-energy generating elements. The ejected ink droplets land on the ink receiving layer of the heat sealable printing sheet at positions facing the printing heads to form dots. Thus, a desired image is printed by the set of dots.

Note that the operations of the CPU 100 as described above are executed based on a processing program stored in a program ROM 104. The program ROM 104 stores a processing program, a table, and the like corresponding to a control flow. In addition, a work RAM 108 is used as a working memory.

[10-5] Operation Flow of First Production Apparatus

Next, the operations of the production apparatus 30 shown in FIG. 13 will be described according to a flowchart shown in FIGS. 16A and 16B. These processes according to the flowchart are executed by the CPU 100 shown in FIG. 15.

Figure 16A:
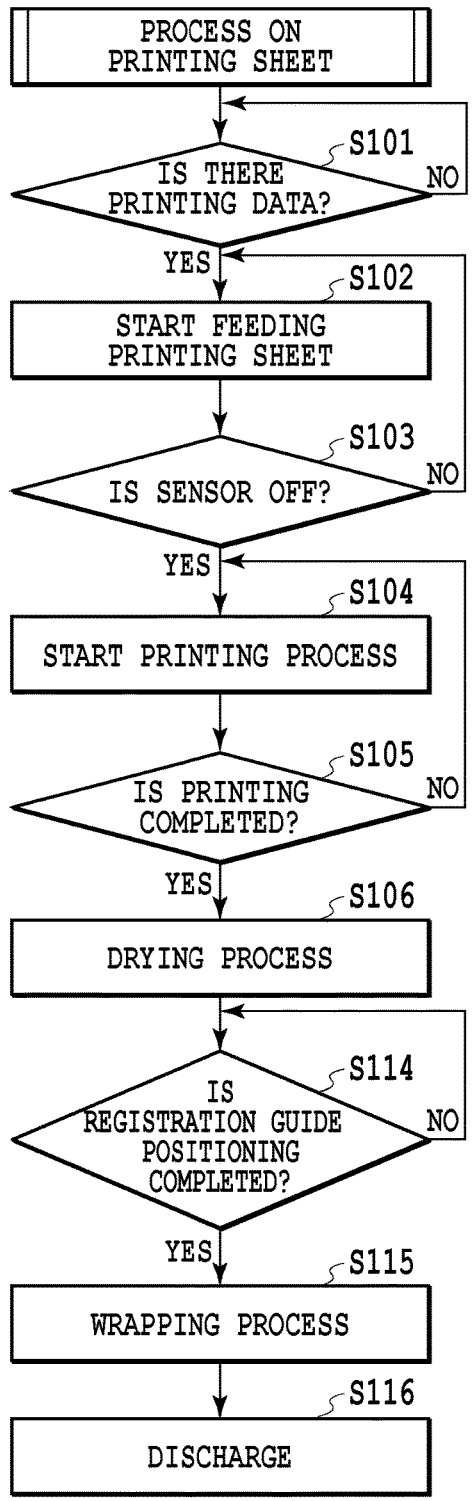
FIG. 16A is a flowchart for describing processes on the heat sealable printing sheet in the first production apparatus.

In FIG. 16A, the CPU in the printer determines whether the printing data is received via the network or various ports from the controller (S101). When the printing data is received, the feeder is caused to start feeding the heat sealable printing sheet (S102), and the sensor 31 detects the heat sealable printing sheet. After the sensor 31 detects the heat sealable printing sheet, the printer starts printing an image on the heat sealable printing sheet (S104). After the printing operation is completed, the dryer performs a drying process to vaporize excessive water from the heat sealable printing sheet on which the image has been printed by the printer (S106).

Figure 16B:
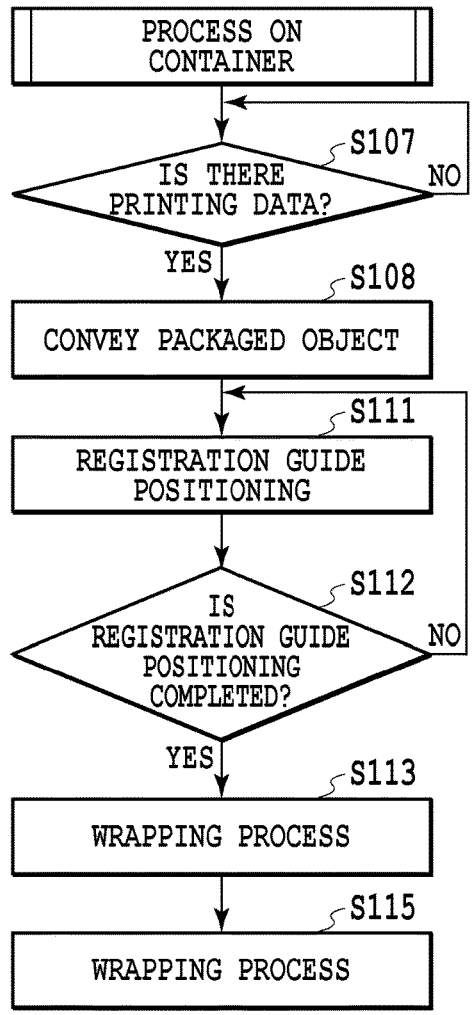
FIG. 16B is a flowchart for describing processes on a packaged object in the first production apparatus.

On the other hand, in FIG. 16B, when the CPU confirms that the printing data is received (S107) as described above, the packaged object supplier supplies a packaged object (S108). Then, the positioning of the heat sealable printing sheet having the image printed by the printer is stated (S111). After the positioning between the heat sealable printing sheet and the packaged object is completed (S114 in FIG. 16A and S113 in FIG. 16B), the wrapper wraps the packaged object with the heat sealable printing sheet (S115). Subsequently, the packaged object wrapped with the heat sealable printing sheet, that is, a wrapped article (final printed article) is discharged and mounted on the discharger (S116 in FIG. 16A).

[10-6] Printing Process

Inkjet printing apparatuses (inkjet printers) configured to print an image by ejecting inks (ink droplets) on a heat sealable printing sheet from multiple nozzles formed in a printing head are widely used. As a technique of ejecting an ink from nozzles, there is known a technique in which a thermal energy according to a driving pulse is supplied to the ink in the nozzles to form air bubbles in the ink by film boiling, and ink droplets are ejected from the nozzles by the air bubbles. A large number of ink droplets corresponding to an image to be printed are ejected from the nozzles, so that the image is printed on a heat sealable printing sheet.

Figure 17:
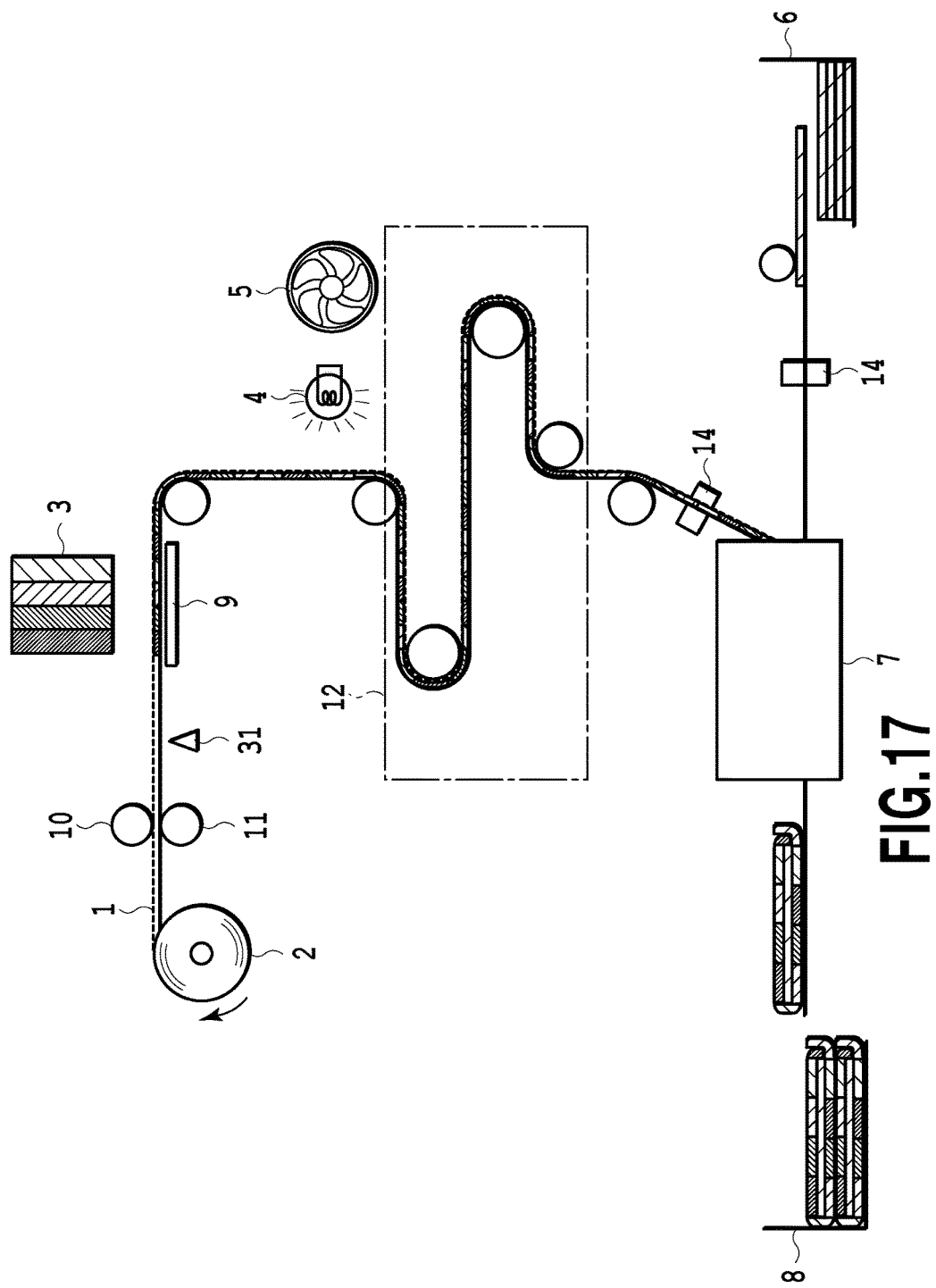
FIG. 17 is a side view schematically showing the first configuration example of the production apparatus for preparing a wrapped article using the heat sealable printing sheet of the present invention.

As an inkjet printer with an enhanced image-printing speed, there is a full-line printer using a line head. The line head is a printing head in which a large number of multi-nozzle heads including multiple nozzles each formed of an ink ejection opening, an ink flow path, and so forth are arranged in a direction intersecting with (for example, a direction perpendicular to) a conveyance path of a heat sealable printing sheet. The full-line printer is capable of printing an image by simultaneously ejecting inks from the ejection openings of the multiple nozzles in accordance with the conveyance of the heat sealable printing sheet. Hence, such a full-line inkjet printer can print a high-quality, high-resolution image at a high speed. Thus, the full-line inkjet printer can satisfy the requirement of printing an image at a speed as high as the speed of wrapping. Nevertheless, when there is a difference in speed between the printer and the wrapper, an extension 12 (FIG. 17) may be provided to buffer or adjust the speed difference. Moreover, the inkjet printer has an advantage in that quite stable image printing is possible because the printing head is not in contact with a heat sealable printing sheet during image printing.

In the production apparatus 30 shown in FIG. 13, when the heat sealable printing sheet 1 is conveyed to the printer 3 while being sandwiched between the grip roller 10 and the nip roller 11, the heat sealable printing sheet 1 passes over the guide plate 9. The heat sealable printing sheet 1 is guided by the guide plate 9 and enters the printer 3. The printer 3 has four printing heads as main constituents for ejecting black K, cyan C, magenta M, and yellow Y inks. These printing heads print an image on the ink receiving layer provided to the heat sealable printing sheet 1 by ejecting the corresponding inks in accordance with the image data.

[10-7] Water Vaporization Control

If an ink remains on the surface of the ink receiving layer of the heat sealable printing sheet, the ink is transferred to a packaged object in some cases. To prevent this, it may be necessary to effectively pre-dry the heat sealable printing sheet on a conveyance path where the heat sealable printing sheet is conveyed after the inkjet printing and before wrapping. Natural drying of the heat sealable printing sheet may be promoted by sufficiently increasing the length of the heat sealable printing sheet before the image is transferred without providing special drying means such as a heater. Moreover, airflow control or exhaust of the vaporized ink component may be necessary in the apparatus. In FIG. 13, the dryer 4 having a vaporization function with a halogen, a heat source equivalent thereto, wind, or a combination thereof vaporizes water and some volatile solvent component, which are main components of the ink contained in the image printed on the ink receiving layer on the heat sealable printing sheet 1. Further, in order to prevent vaporized gases of these from forming dew or the like in the apparatus, the fan 5 performs airflow control and exhaust control. The use of the airflow control in combination improves the saturated vapor pressure of the surface of the ink receiving layer, and promotes the drying in some cases.

By the water control, the water content (a total amount of the water, the nonvolatile solvent, and the like except for the coloring material) in the ink in the ink receiving layer is controlled to preferably 70% by mass or less, furthermore preferably 50% by mass or less, relative to the total ink ejection amount. If the remaining water content of the ink is more than 70% by mass, the ink is insufficiently dried, depending on the thickness of the ink receiving layer. Consequently, the undried ink may be transferred to the packaged object. Meanwhile, the total ink ejection amount can be set as appropriate by restricting the amount of ink ejected by processing such as reducing the number of ink dots formed during image printing in advance in a way that the water control is appropriately performed.

[10-8] Wrapping Process

As shown in FIG. 13, the heat sealable printing sheet 1 having the image printed on the ink receiving layer by the printer 3 is guided on the guide plate 9 and moved to the wrapper 7. Packaged objects individually mounted on the packaged object supplier 6 are subjected to position correction by a registration guide 14, and supplied to the wrapper 7 in accordance with the conveyance of the heat sealable printing sheet 1.

The wrapper 7 wraps the packaged object with the heat sealable printing sheet 1, and performs thermal pressure bonding on portions where the ink receiving layer overlaps with the heat sealable layer, and where the heat sealable layer overlaps with itself. Thereby, the ink receiving layer adheres to the heat sealable layer, and the heat sealable layer adheres to itself. In this manner, a wrapped article is prepared.

The temperature of the thermal pressure bonding should be controlled to 60° C. or more but 160° C. or less. The thermal pressure bonding within this temperature range makes it possible to prevent the base member and the packaged object from deforming due to excessive heat and damage to the content, and prevent the heat sealable layer from sticking to the packaged object.

[11] Second Production Apparatus

Next, description will be given of a second configuration example of the production apparatus (hereinafter also referred to as "second production apparatus") for preparing a wrapped article using the heat sealable printing sheet of the present invention.

Figure 18:
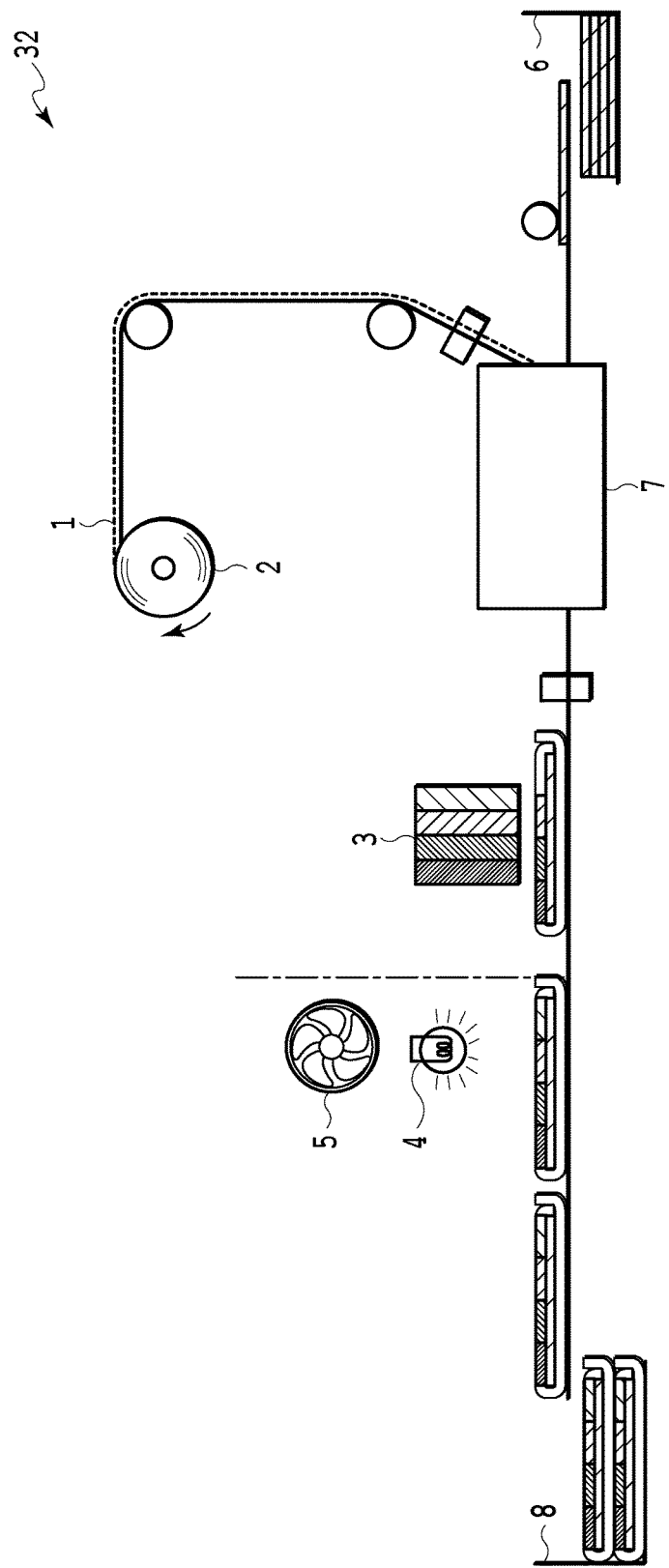
FIG. 18 is a side view schematically showing a second configuration example of the production apparatus for preparing a wrapped article using the heat sealable printing sheet of the present invention.

FIG. 18 is a side view schematically showing the second configuration example of the production apparatus for preparing a wrapped article using the heat sealable printing sheet of the present invention. As shown in FIG. 18, a production apparatus 32 includes: the feeder 2 configured to feed, to the conveyance path, the heat sealable printing sheet 1 wound in such a manner that the ink receiving layer 53 is located on the outer surface; the packaged object supplier 6 configured to supply a packaged object to a wrapper; the wrapper 7 configured to wrap the packaged object with the heat sealable printing sheet 1; and the printer 3 configured to print a wrapped article by directly ejecting an aqueous ink. Further, the production apparatus 32 includes: the dryer 4 configured to dry the ink printed on the wrapped article; and the fan 5 configured to prevent dew in the apparatus attributable to vaporized water. The packaged object is wrapped in such a manner that the ink receiving layer of the heat sealable printing sheet is located on the outer side. The printer 3 is configured to print an image on the wrapped article after the wrapped article is prepared. In this point, the printer 3 in the production apparatus 32 is different from that in the above-described first production apparatus. Common members to those in the first production apparatus have the same configurations as those in the first production apparatus, and the descriptions thereof will be omitted.

[12] Third Production Apparatus

In a third production apparatus, the printer and the wrapper are separated and independent from each other. In the third production apparatus, the heat sealable printing sheet processed into a roll shape is placed in a printer including a line head. Then, the heat sealable printing sheet having an image printed is wound into a roll shape. Subsequently, in a known wrapper, a packaged object is wrapped with the heat sealable printing sheet to prepare a wrapped article. When an image is printed on the heat sealable printing sheet, a marking is also simultaneously printed. When the heat sealable printing sheet is transferred, a sensor reads the marking on the rolled heat sealable printing sheet, and the positions of the heat sealable printing sheet and the packaged object are automatically adjusted to wrap the packaged object.

Figure 19:
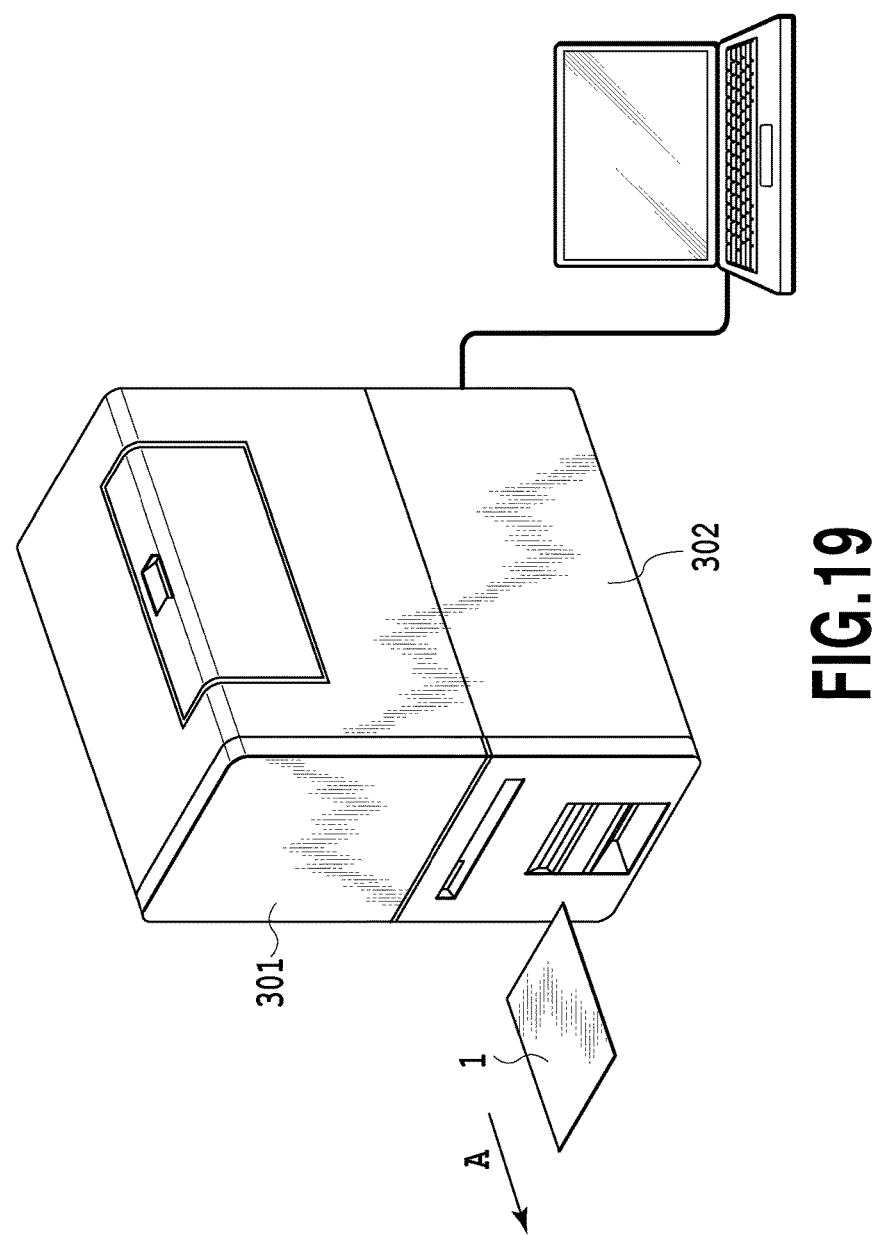
FIG. 19 is a perspective view schematically showing one example of a printing device for printing of the heat sealable printing sheet of the present invention.
Figure 20:
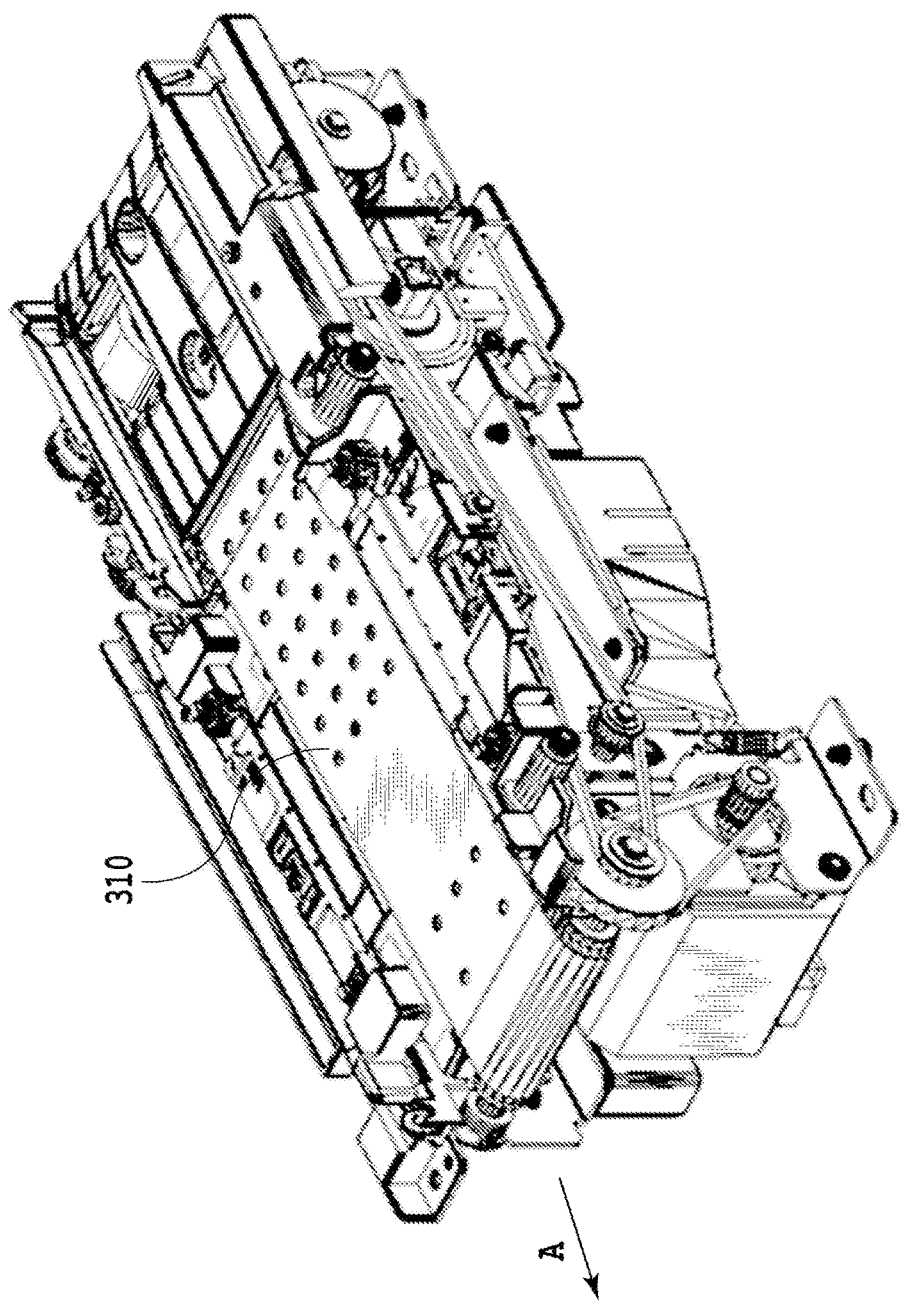
FIG. 20 is a perspective view schematically showing a conveyor in FIG. 19.
Figure 21:
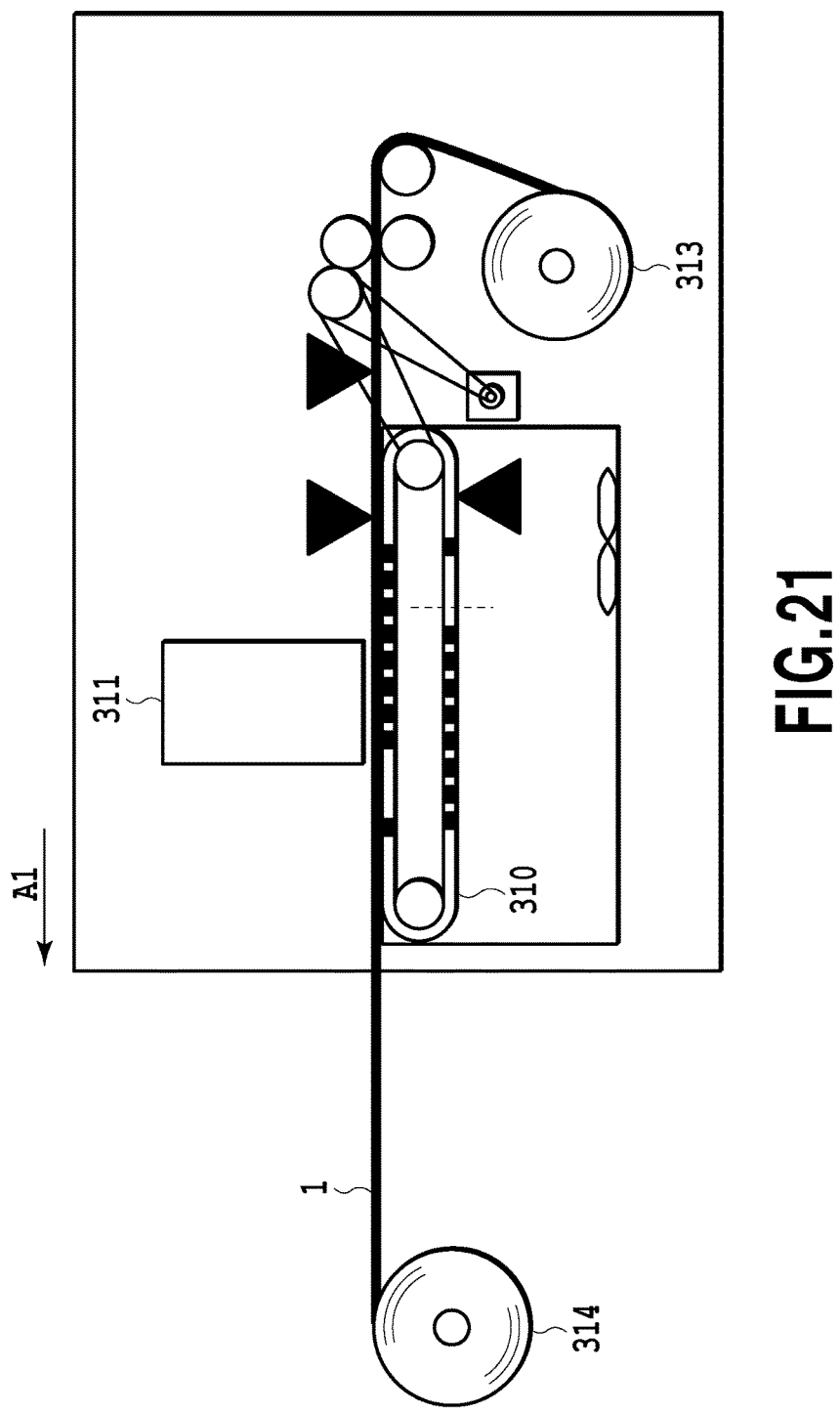
FIG. 21 is a side view schematically showing a configuration example of a conveyance mechanism of a line head printer.
Figure 22:
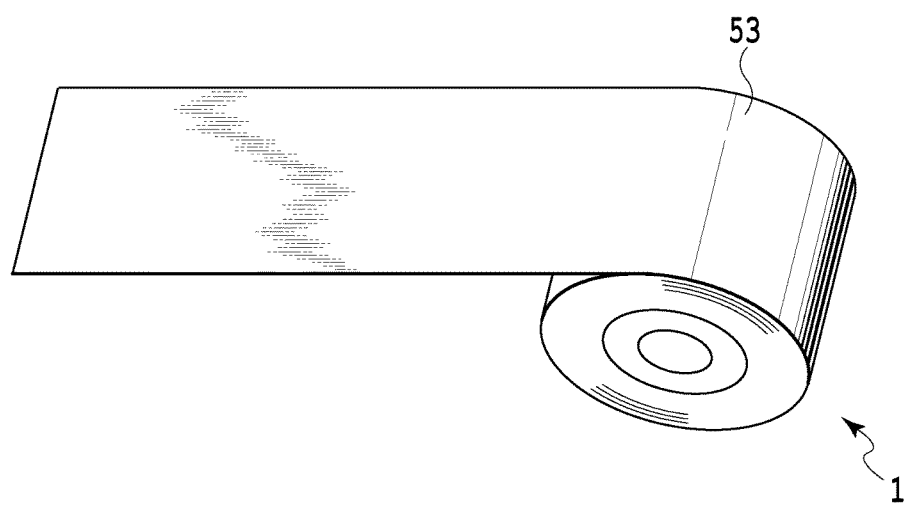
FIG. 22 is a perspective view schematically showing one embodiment of the heat sealable printing sheet of the present invention.

FIG. 19 is a perspective view schematically showing one example of the printing device configured to print an image on the heat sealable printing sheet of the present invention. The printing device shown in FIG. 19 is a printer 301 in which an image is printed on the heat sealable printing sheet. FIG. 20 is a perspective view schematically showing a conveyance mechanism in the printer 301 in FIG. 19. Moreover, FIG. 21 is a side view schematically showing a configuration example of a conveyance mechanism of a line head printer. First, the heat sealable printing sheet 1 wound in such a manner that the ink receiving layer 53 is located on the outer surface as shown in FIG. 22 is set on a rolling-up roller 313 shown in FIG. 21. The heat sealable printing sheet 1 is conveyed to a printing head 311 by a conveyance belt 310. After an image is printed, the heat sealable printing sheet 1 is rolled as a printed article by a take-up roll 314.

Figure 23:
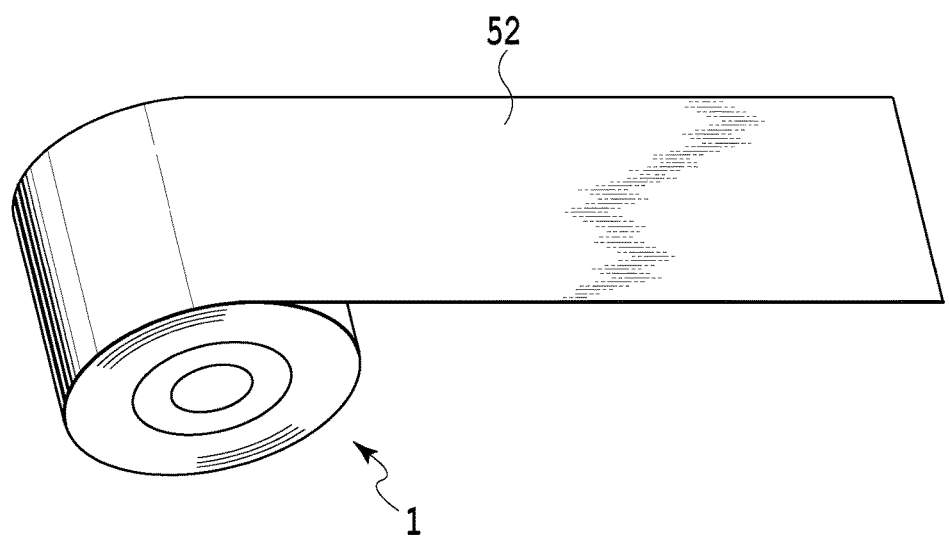
FIG. 23 is a perspective view schematically showing another embodiment of the heat sealable printing sheet of the present invention.
Figure 24:
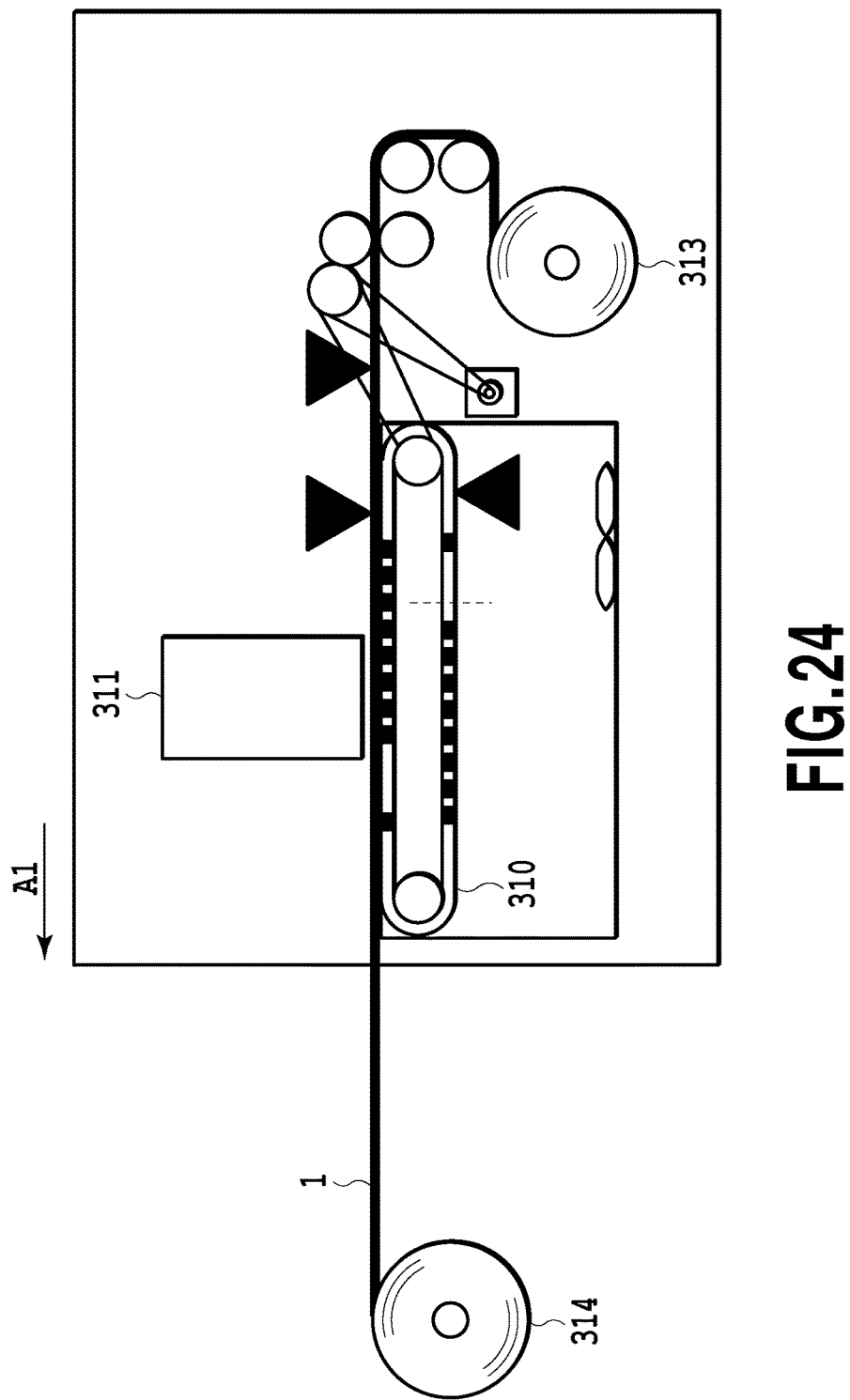
FIG. 24 is a side view schematically showing a configuration example of the conveyance mechanism of the line head printer using the heat sealable printing sheet of the present invention.

Note that in a case of using the heat sealable printing sheet 1 wound in such a manner that the heat sealable layer 52 is located on the outer surface (inwardly-wound roll) like the heat sealable printing sheet 1 shown in FIG. 23, a conveyance mechanism as shown in FIG. 24 is used. The inwardly-wound roll has such an effect of preventing dust from attaching to the surface of the ink receiving layer.

[13] Fourth Production Apparatus

Figure 25:
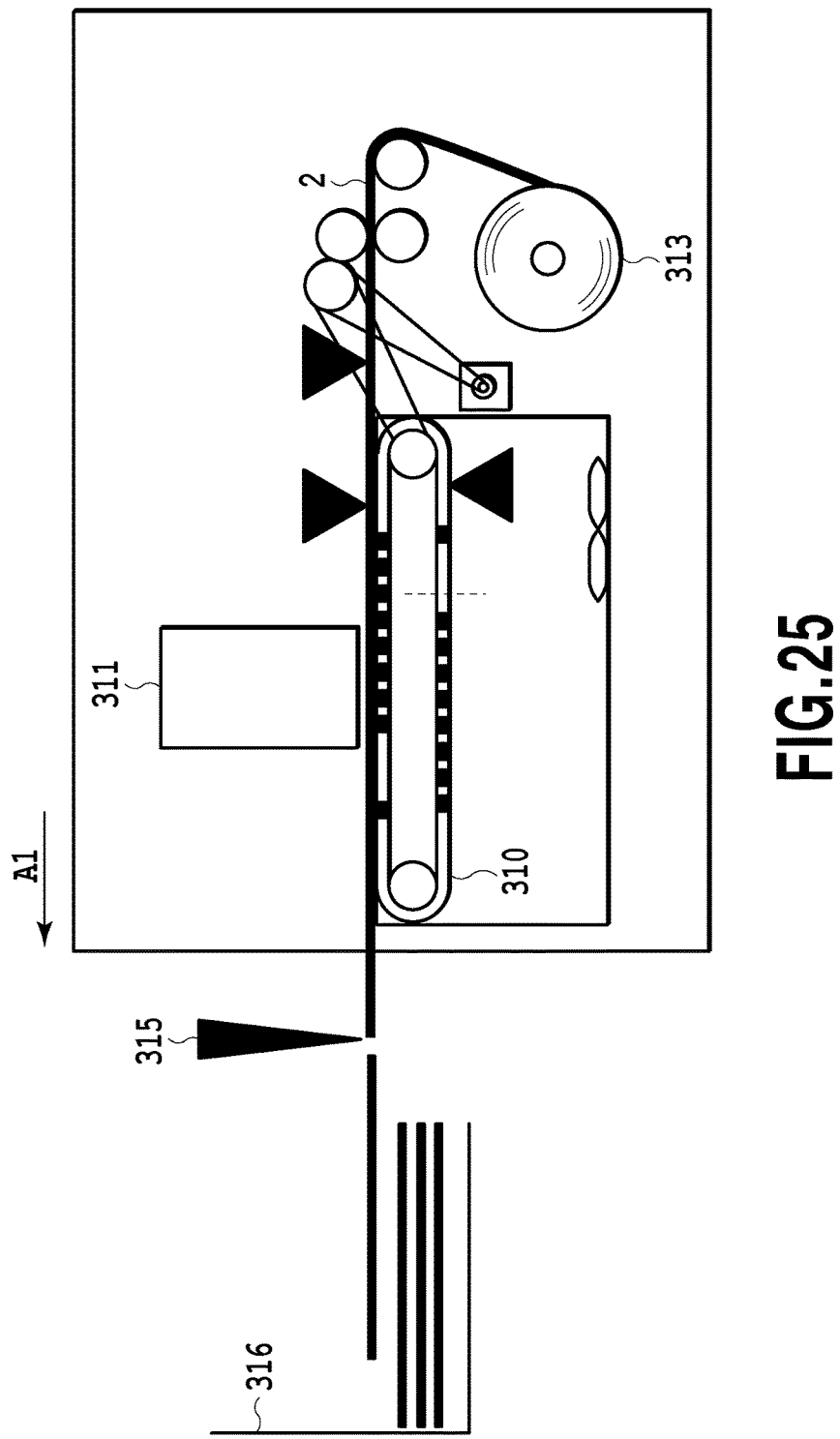
FIG. 25 is a side view schematically showing a configuration example of the conveyance mechanism of the line head printer using the heat sealable printing sheet of the present invention.

In a fourth production apparatus, the printer and the wrapper are separated and independent from each other. As shown in FIG. 25, in the fourth production apparatus, after the line head provided to the printer prints an image on the heat sealable printing sheet in a roll shape, a cutter 315 cuts the heat sealable printing sheet into a sheet shape as shown in FIG. 25. Then, in a known wrapper, a packaged object is wrapped with the heat sealable printing sheet to prepare a wrapped article.

[14] Fifth Production Apparatus

Figure 26:
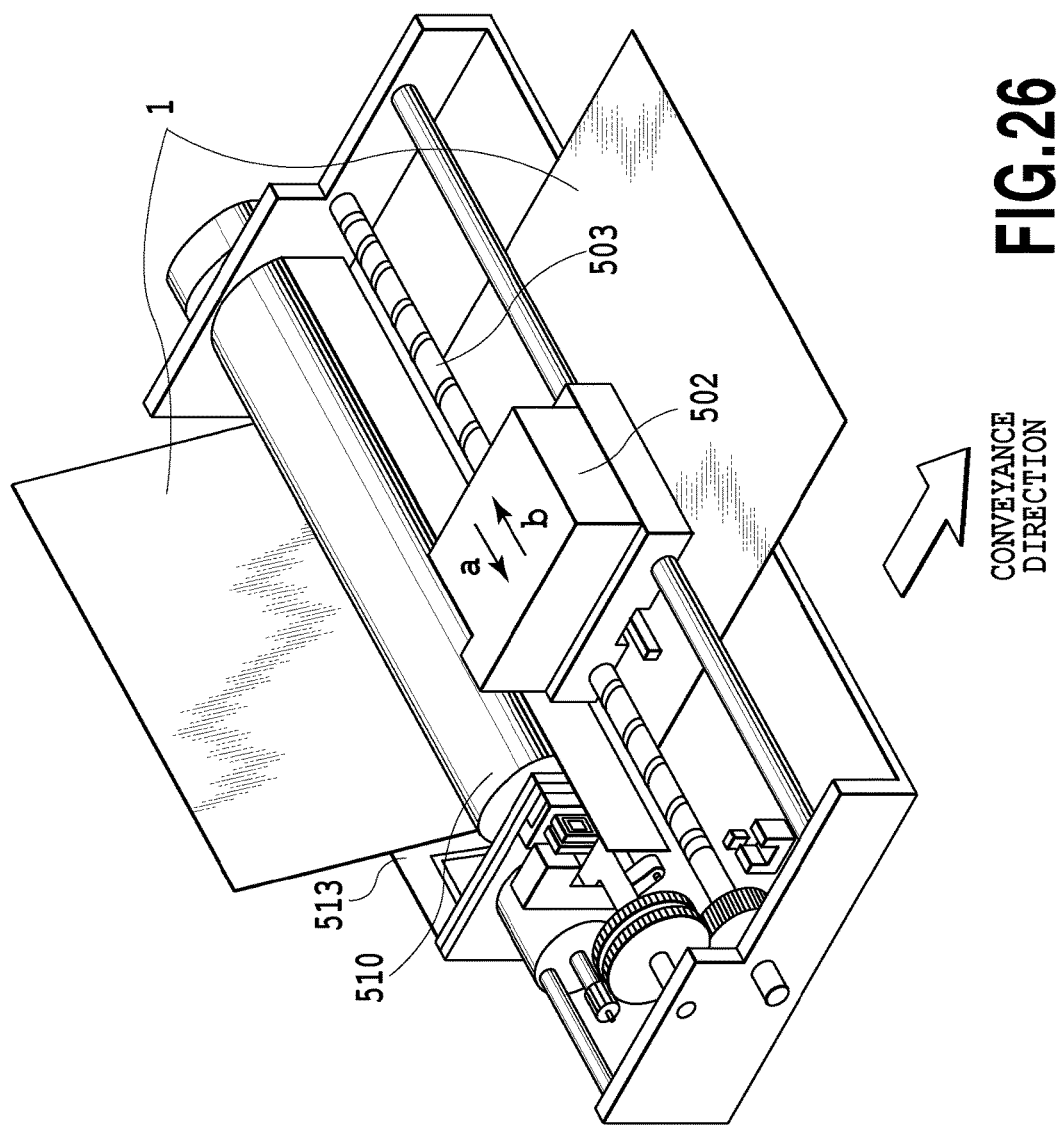
FIG. 26 is a perspective view showing one example of a printer for printing of the heat sealable printing sheet and the wrapped article.

In a fifth production apparatus, the printer and the wrapper are separated and independent from each other. In the fifth production apparatus, a serial head provided to a printer prints an image on the heat sealable printing sheet in the shape of a cut sheet as shown in FIG. 26. Then, in a known wrapper, a packaged object is wrapped with the heat sealable printing sheet to prepare a wrapped article.

[15] Sixth Production Apparatus

Figure 27:
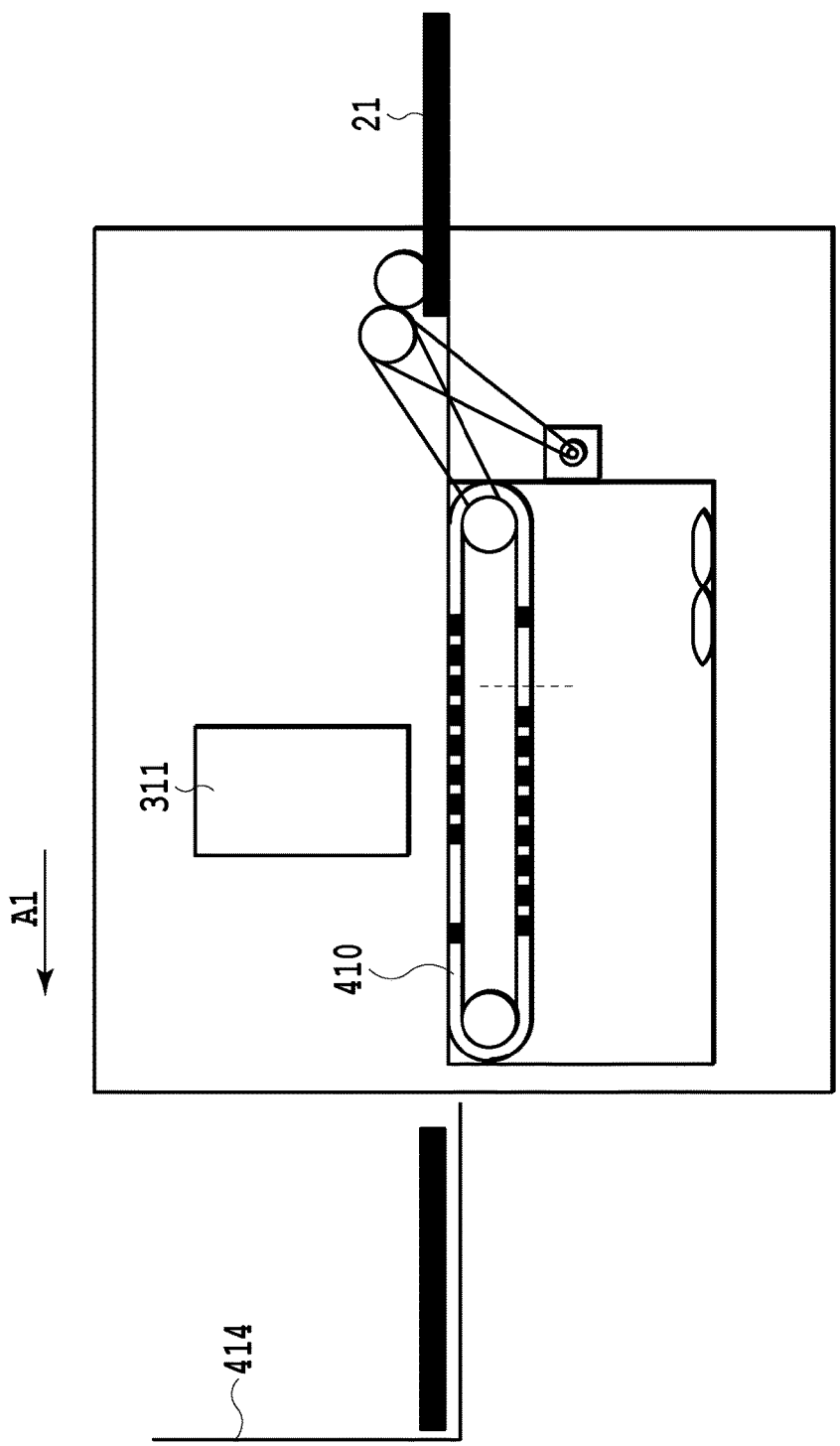
FIG. 27 is a side view schematically showing a configuration example of the conveyance mechanism of the line head printer.

In a sixth production apparatus, the printer and the wrapper are separated and independent from each other. In the sixth production apparatus, using a known wrapper, a packaged object is wrapped with the heat sealable printing sheet to prepare a wrapped article. In this event, the wrapped article is prepared in such a manner that the ink receiving layer is located on the outer side. Then, the printer provided with the line head as shown in FIG. 27 prints an image on the wrapped article.

[16] Seventh Production Apparatus

In a seventh production apparatus, the printer and the wrapper are separated and independent from each other. In the seventh production apparatus, using a known wrapper, a packaged object is wrapped with the heat sealable printing sheet to prepare a wrapped article. In this event, the wrapped article is prepared in such a manner that the ink receiving layer is located on the outer side. Then, the printer provided with the serial head as shown in FIG. 26 prints an image on the wrapped article.

As has been described above, the first to seventh production apparatuses are capable of providing various wrapped articles in accordance with the usage by using the heat sealable printing sheet of the present invention.

EXAMPLES

Hereinafter, the present invention will be more specifically described by way of Examples and Comparative Examples. However, the present invention is not limited to only the constructions of Examples below. It should be noted that "part (s)" and "%" in the following description refer to "part (s) by mass" and "% by mass", respectively, unless otherwise stated.

<Preparation of Pigment Ink>
(Synthesis of (Meth)Acrylic Acid Ester-Based Copolymer)

Into a reaction vessel equipped with a stirring device, a dropping device, a temperature sensor, and a reflux device having a nitrogen-introducing device on an upper portion thereof, 1,000 parts of methyl ethyl ketone were loaded. With the methyl ethyl ketone being stirred, the inside of the reaction vessel was replaced with nitrogen. While the nitrogen atmosphere was kept in the reaction vessel, the temperature was increased to 80° C. Then, a mixture liquid was dropped over 4 hours using the dropping device. The mixture liquid had been obtained by mixing 63 parts of 2-hydroxyethyl methacrylate, 141 parts of methacrylic acid, 417 parts of styrene, 188 parts of benzyl methacrylate, 25 parts of glycidyl methacrylate, 33 parts of a polymerization degree regulator (product name: "BLEMMER TGL", manufactured by NOF CORPORATION), and 67 parts of t-butyl peroxy-2-ethylhexanoate. After the completion of the dropping, the reaction was further continued at the same temperature for 10 hours to thus obtain a solution (resin content: 45.4%) of a (meth)acrylic acid ester-based copolymer (A-1) having an acid value of 110 mgKOH/g, a glass transition temperature Tg of 89° C., and a weight-average molecular weight of 8,000.

(Preparation of Aqueous Pigment Dispersion Material)

The solution of the (meth)acrylic acid ester-based copolymer (A-1) obtained in Synthesis Example, 1,000 parts of a phthalocyanine-based blue pigment, a 25% aqueous solution of potassium hydroxide, and water were loaded into a mixing tank having a cooling function, then stirred and mixed to obtain a mixture liquid. Note that the (meth)acrylic acid ester-based copolymer (A-1) was used in an amount of 40% in terms of nonvolatile content relative to the phthalocyanine-based blue pigment. Moreover, the 25% aqueous solution of potassium hydroxide was used in an amount to neutralize the (meth)acrylic acid ester-based copolymer (A-1) by 100%. Further, the water was in such an amount that the obtained mixture liquid had a nonvolatile content of 27%. The resulting mixture liquid was passed through a dispersing device filled with zirconia beads having a diameter of 0.3 mm, and dispersed by a circulating system for 4 hours. Note that the temperature of the dispersion liquid was maintained at 40° C. or less.

After the dispersion liquid was extracted from the mixing tank, a flow path between the mixing tank and the dispersing device was washed with 10,000 parts of water. The washing liquid was mixed with the dispersion liquid to obtain a diluted dispersion liquid. The resulting diluted dispersion liquid was put into a distilling device. All of the methyl ethyl ketone and a part of the water were distilled off to obtain a concentrated dispersion liquid. The concentrated dispersion liquid was left to cool to room temperature. While being stirred, the resultant was adjusted to have a pH of 4.5 by dropping 2% hydrochloric acid. Then, the solid content was filtered using a Nutsche-type filtering device and washed with water. The resulting solid content (cake) was put into a packaged object. After water was added thereto, the resultant was re-dispersed using a dispersion stirring machine, and the pH was adjusted to 9.5 with a 25% aqueous solution of potassium hydroxide. Coarse particles were removed using a centrifugal separator at 6,000 G for 30 minutes. Subsequently, the nonvolatile content was adjusted to obtain an aqueous cyan pigment dispersion material (pigment content: 14%).

An aqueous black pigment dispersion material, an aqueous magenta pigment dispersion material, and an aqueous yellow pigment dispersion material were obtained in the same manner as in the above-described case of the aqueous cyan pigment dispersion material, except that the phthalocyanine-based blue pigment was changed to a carbon black-based black pigment, a quinacridone-based magenta pigment, and a diazo-based yellow pigment, respectively.

(Preparation of Ink)

The aqueous pigment dispersion materials and each component were introduced into a packaged object in amounts to obtain compositions (total: 100 parts each) shown in Table 2, followed by stirring with a propeller stirring machine for 30 minutes or longer. Thereafter, each resultant was filtered using a filter having a pore diameter of 0.2 µm (manufactured by Nihon Pall Ltd.). Thus, pigment inks of each color (Bk, C, M, and Y) were prepared. Note that "ΔE-100" in Table 2 means 10-mol ethylene oxide adduct of acetylene glycol (product name: "Acetylenol E100", manufactured by Kawaken Fine Chemicals Co., Ltd.).

|  | Bk | C | M | Y |
|---|---|---|---|---|
| Pigment (parts) | 2.5 | 2.5 | 2.5 | 2.5 |
| Glycerol (parts) | 7.0 | 7.0 | 7.0 | 7.0 |

-continued

|  | Bk | C | M | Y |
|---|---|---|---|---|
| Triethylene glycol (parts) | 5 | 5 | 5 | 5 |
| Ethylene urea (parts) | 12 | 12 | 12 | 12 |
| AE-100 (parts) | 1 | 1 | 1 | 1 |
| Pure water (parts) | balance | balance | balance | balance |

Production of Heat Sealable Printing Sheet and Wrapped Article

Example 1

[Preparation of Hydrated Alumina Dispersion Liquid]

To pure water, 20 parts of a hydrated alumina having a boehmite structure (pseudoboehmite structure) (product name: "Disperal HP14", manufactured by Sasol) was added. Further, 0.4 parts of acetic acid was added thereto to perform a peptization treatment. Thus, a hydrated alumina dispersion liquid was obtained. The hydrated alumina fine particles in the obtained hydrated alumina dispersion liquid had an average particle diameter of 140 nm. To the resulting hydrated alumina dispersion liquid, 0.3 parts of boric acid was added to obtain a 20% boric acid-added hydrated alumina dispersion liquid.

[Preparation of Aqueous Solution of Polyvinyl Alcohol]

Polyvinyl alcohol (product name: "PVA235", manufactured by KURARAY CO., LTD.) was dissolved in ion exchanged water to prepare an aqueous solution of the polyvinyl alcohol having a solid content of 8%. Note that the polyvinyl alcohol had a weight-average polymerization degree of 3,500, a saponification degree of 87 to 89% by mole, and an SP value of 9.4.

[Preparation of Coating Liquid for Forming Ink Receiving Layer]

To 100 parts of the boric acid-added hydrated alumina dispersion liquid, 25.0 parts of the aqueous solution of the polyvinyl alcohol was added. Further, 0.74 parts of an acrylic resin was added as a water dispersible resin thereto. The resultant was mixed using a static mixer to prepare a coating liquid for forming an ink receiving layer. As the acrylic resin, product name: "Vinylblan 2684" (manufactured by Nissin Chemical Co. Ltd., Tg: 20.0° C., solid content concentration: 30.0%) was used. Additionally, the acrylic resin had an SP value of 9.3.

[Production of Heat Sealable Printing Sheet and Wrapped Article]

A gap-absorption-type heat sealable printing sheet was produced by coating one surface of a base member with the prepared coating liquid (immediately after the mixing), followed by drying. The base member was a part of a layered sheet, and on the other surface of which a heat sealable layer had been formed in advance. For the coating of the coating liquid, a die coater was used at a coating speed of 5 m/minute, and the coating was performed in such a manner that the coating amount after the drying was 15 g/m². Moreover, the drying temperature was set to 100° C. Note that the layered sheet used was a layered sheet (product name: "Alphan HS-101", manufactured by Oji F-Tex Co., Ltd.) including: the polypropylene-based base member having a thickness of 25 µm; and the polypropylene-based heat sealable layer formed on the other surface of the base member. The ink receiving layer thus formed had a thickness of 15 μm. Additionally, the heat sealable layer had an SP value of 8.1.

On the resulting heat sealable printing sheet, an image was printed with the pigment ink by using the above-described first production apparatus (the production apparatus 30 shown in FIG. 13). Thus, the heat sealable printing sheet and a wrapped article were obtained and used for the evaluation. A print module (product name: "PM-200Z", manufactured by CANON FINETECH INC.) provided to a line head was used as the printer 3 of the production apparatus 30. When the wrapped article was produced, the thermal pressure bonding was performed at a temperature of 150° C. and a pressure of 0.5 kg/cm.

Example 2

A heat sealable printing sheet and a wrapped article were obtained in the same manner as in Example 1, except that the acrylic resin was changed to an acrylic resin (product name: "Vinylblan 2642", manufactured by Nissin Chemical Co. Ltd., Tg: −34.0° C., solid content concentration: 40.0%), and that the added amount was changed to 0.55 parts.

Example 3

A heat sealable printing sheet and a wrapped article were obtained in the same manner as in Example 1, except that the acrylic resin was changed to an acrylic resin (product name: "Vinylblan 2651", manufactured by Nissin Chemical Co. Ltd., Tg: 0° C., solid content concentration: 30.0%), and that the added amount was changed to 0.74 parts.

Example 4

A heat sealable printing sheet and a wrapped article were obtained in the same manner as in Example 1, except that the acrylic resin was changed to an acrylic resin (product name: "Vinylblan 2641", manufactured by Nissin Chemical Co. Ltd., Tg: 32° C., solid content concentration: 40.0%), and that the added amount was changed to 0.55 parts.

Example 5

A heat sealable printing sheet and a wrapped article were obtained in the same manner as in Example 1, except that the acrylic resin was changed to an acrylic resin (product name: "Vinylblan 2652", manufactured by Nissin Chemical Co. Ltd., Tg: 32° C., solid content concentration: 28.0%), and that the added amount was changed to 0.79 parts.

Example 6

A heat sealable printing sheet and a wrapped article were obtained in the same manner as in Example 1, except that the amount of the acrylic resin added was changed to 0.37 parts, and that the amount of the polyvinyl alcohol added was changed to 26.3 parts.

Example 7

A heat sealable printing sheet and a wrapped article were obtained in the same manner as in Example 1, except that the amount of the acrylic resin added was changed to 4.44 parts, and that the amount of the polyvinyl alcohol added was changed to 11.11 parts.

Example 8

A heat sealable printing sheet and a wrapped article were obtained in the same manner as in Example 1, except that the amount of the acrylic resin added was changed to 5.12 parts, and that the amount of the polyvinyl alcohol added was changed to 8.33 parts.

Example 9

A heat sealable printing sheet and a wrapped article were obtained in the same manner as in Example 1, except that the amount of the acrylic resin added was changed to 6.66 parts, and that the amount of the polyvinyl alcohol added was changed to 225.00 parts.

Example 10

A heat sealable printing sheet and a wrapped article were obtained in the same manner as in Example 1, except that the amount of the acrylic resin added was changed to 4.44 parts, and that the amount of the polyvinyl alcohol added was changed to 150.00 parts.

Example 11

A heat sealable printing sheet and a wrapped article were obtained in the same manner as in Example 1, except that the amount of the acrylic resin added was changed to 0.56 parts, and that the amount of the polyvinyl alcohol added was changed to 18.75 parts.

Example 12

A heat sealable printing sheet and a wrapped article were obtained in the same manner as in Example 1, except that the amount of the acrylic resin added was changed to 0.51 parts, and that the amount of the polyvinyl alcohol added was changed to 17.31 parts.

Example 13

A heat sealable printing sheet and a wrapped article were obtained in the same manner as in Example 1, except that the hydrated alumina was changed to a hydrated alumina (product name: "Disperal HP13", manufactured by Sasol, the hydrated alumina fine particles had an average particle diameter of 130 nm).

Example 14

A heat sealable printing sheet and a wrapped article were obtained in the same manner as in Example 1, except that the hydrated alumina was changed to a hydrated alumina (product name: "Disperal HP18", manufactured by Sasol, the hydrated alumina fine particles had an average particle diameter of 180 nm).

Example 15

A heat sealable printing sheet and a wrapped article were obtained in the same manner as in Example 1, except that the hydrated alumina was changed to a hydrated alumina (product name: "Disperal HP22", manufactured by Sasol, the hydrated alumina fine particles had an average particle diameter of 220 nm).

Example 16

A heat sealable printing sheet and a wrapped article were obtained in the same manner as in Example 1, except that the layered sheet was changed to a layered sheet (product name: "MYLAR 850", manufactured by Teijin DuPont Films Japan Limited) including a PET-based base member having a thickness of 30 μm and a PE-based heat sealable layer formed thereon. Note that the heat sealable layer had an SP value of 8.1.

Example 17

A heat sealable printing sheet and a wrapped article were obtained in the same manner as in Example 1, except for the following. Specifically, an adhesive layer was formed by coating one surface of the base member with an acrylic resin (product name: "Vinylblan 5202C", manufactured by Nissin Chemical Co. Ltd., MFT: 18° C., solid content concentration: 40.0%), followed by drying. The base member was the part of the layered sheet, and on the other surface of which the heat sealable layer had been formed in advance. The coating was performed using a gravure printer at a coating speed of 5 m/minute in such a manner that the coating amount after the drying was 2 g/m². The drying temperature was set to 100° C. In addition, the heat sealable layer had an SP value of 8.1, and the adhesive layer had an SP value of 9.25. Then, the ink receiving layer was formed on the surface of the adhesive layer thus formed.

Example 18

A heat sealable printing sheet and a wrapped article were obtained in the same manner as in Example 17, except that the acrylic resin used to form the adhesive layer was an acrylic resin (product name: "Vinylblan 2651", manufactured by Nissin Chemical Co. Ltd., MFT: 0° C., solid content concentration: 30.0%).

Example 19

A heat sealable printing sheet and a wrapped article were obtained in the same manner as in Example 17, except that the resin used to form the adhesive layer was a urethane-based resin (product name: "SUPERFLEX 170", manufactured by DKS Co. Ltd., MFT: 5° C., solid content concentration: 33.00).

Example 20

A heat sealable printing sheet and a wrapped article were obtained in the same manner as in Example 17, except that the layered sheet used was a sheet (product name: "Alphan BDH-224", manufactured by Oji F-Tex Co., Ltd.) including a polypropylene-based base member having a thickness of 25 μm; a polypropylene-based adhesive layer formed on the one surface thereof; and a heat sealable layer formed on the other surface of the base member. Note that the adhesive layer had a kinetic friction coefficient of 0.27, and the heat sealable layer had a kinetic friction coefficient of 0.23. Moreover, the adhesive layer and the heat sealable layer had been subjected to a surface treatment by corona treatment.

Example 21

A heat sealable printing sheet and a wrapped article were obtained in the same manner as in Example 17, except that the resin used to form the adhesive layer was a urethane-based resin (product name: "SUPERFLEX 210", manufactured by DKS Co. Ltd., MFT: 23° C., solid content concentration: 35.00).

Example 22

A heat sealable printing sheet and a wrapped article were obtained in the same manner as in Example 17, except that the acrylic resin used to form the adhesive layer was an acrylic resin (product name: "Vinylblan 2585", manufactured by Nissin Chemical Co. Ltd., MFT: 30° C., solid content concentration: 45.0%).

Comparative Example 1

A heat sealable printing sheet and a wrapped article were obtained in the same manner as in Example 1, except that no inorganic fine particles were added in preparing the coating liquid for forming an ink receiving layer.

Comparative Example 2

A heat sealable printing sheet and a wrapped article were obtained in the same manner as in Example 1, except that no water soluble resin was added in preparing the coating liquid for forming an ink receiving layer.

Comparative Example 3

A heat sealable printing sheet and a wrapped article were obtained in the same manner as in Example 1, except that no water dispersible resin was added in preparing the coating liquid for forming an ink receiving layer.

Comparative Example 4

A heat sealable printing sheet and a wrapped article were obtained in the same manner as in Example 1, except that a base member (product name: "Tetron G2 25-μ thick film", manufactured by Teijin DuPont Films Japan Limited) having no heat sealable layer was used.

Comparative Example 5

A heat sealable printing sheet and a wrapped article were obtained in the same manner as in Example 1, except that the acrylic resin was changed to an acrylic resin (product name: "Vinylblan 2650", manufactured by Nissin Chemical Co. Ltd., Tg: −39° C., solid content concentration: 40.0%).

Comparative Example 6

A heat sealable printing sheet and a wrapped article were obtained in the same manner as in Example 1, except that the acrylic resin was changed to an urethane resin (product name: "SUPERFLEX 620", manufactured by DKS Co. Ltd., Tg: 43° C., solid content concentration: 30.0%), and the added amount was changed to 0.74 parts. Note that the urethane resin had an SP value of 10.5.

<Evaluation>
(Ink Absorbability)

An image was printed on the heat sealable printing sheet to evaluate the ink absorbability. The image was printed using a print module (product name: "PM-200Z", manufactured by CANON FINETECH INC.). In this case, the magenta (M) ink was used which had the lowest fixability among inks used in the printer to print a single-color image for the evaluation. The printing was performed by setting an ink ejection density within a range of 10 to 100% (10% increment) per unit area (1200 dpi×1200 dpi), so that a solid image was printed on the heat sealable printing sheet. Poor ink fixation includes: ink transfer to a wrapped article caused by poor ink fixation onto a printed surface; and density nonuniformity caused by coating variation, or the like, on an ink receiving layer. The ink absorbability (fixability) was evaluated according to the following criteria by visually observing the heat sealable printing sheet after the image printing by checking the transfer to the wrapped article and the presence or absence of density nonuniformity. Tables 3-1, 3-2, and 3-3 show the evaluation result.

Evaluation criteria (a judgment was performed under a condition that the ratio of an ink coating amount relative to unit area was 40%)

⊙: no image disturbances (nonuniformity, transfer).

○: partially nonuniform, but no ink was transferred to the packaged object.

Δ: the ink was partially transferred to the packaged object.

x: the ink was not dried, and the ink was transferred to the packaged object.

(Adhesiveness)

Using the wrapped article, the adhesiveness between the heat sealable layer and the ink receiving layer was evaluated. Specifically, a pasted portion between the heat sealable layer and the ink receiving layer, which was a sealed portion of the wrapped article after the thermal pressure bonding, was peeled by hand, and the adhesiveness was evaluated according to the following criteria. Tables 3-1, 3-2, and 3-3 show the evaluation result.

○: the heat sealable layer and the ink receiving layer adhered to each other at the pasted portion between and were hardly peeled off.

Δ: the heat sealable layer and the ink receiving layer were easily peeled off at some portion of the pasted portion.

x: the heat sealable layer and the ink receiving layer did not adhere to each other at the pasted portion.

(Adhesion)

Using the wrapped article, the adhesion between the base member and the ink receiving layer was evaluated. Specifically, a pinch portion was formed by partially cutting the wrapped article, and the pinch portion was pinched and pulled by hand. Then, a torn portion formed from the pinch portion was visually observed to evaluate the adhesion according to the following criteria. Tables 3-1, 3-2, and 3-3 show the evaluation result.

○: no burr was formed at the torn portion, and the ink receiving layer was not peeled off from the base member.

Δ: a burr was partially formed, and some portion of the ink receiving layer was peeled off from the base member.

x: a burr was formed, and the ink receiving layer was peeled off from the base member.

(Stickiness of Ink Receiving Layer)

The stickiness of the ink receiving layer constituting the heat sealable printing sheet was evaluated. Specifically, the stickiness when the ink receiving layer was touched by hand was evaluated according to the following criteria. Tables 3-1, 3-2, and 3-3 show the evaluation result.

○: the ink receiving layer was not sticky.

Δ: the ink receiving layer was somewhat sticky, but did not stick to hand.

x: the ink receiving layer was badly sticky, and stuck to hand.

(Foldability)

Using the wrapped article, the foldability of the base member and the ink receiving layer was evaluated. Specifically, the base member and the ink receiving layer were folded at 180° in such a manner that the ink receiving layer was located on the inner side and the ink receiving layer portion came into contact with itself. Next, the base member and the ink receiving layer were folded along a folding line in such a manner that the heat sealable layer portion came into contact with each other. Then, the two folding lines were visually observed and evaluated according to the following criteria. Tables 3-1, 3-2, and 3-3 show the evaluation result.

TABLE 3-1

| | | | Example | | | | | | | | | | |
|---|---|---|---|---|---|---|---|---|---|---|---|---|---|
| | | | 1 | 2 | 3 | 4 | 5 | 6 | 7 | 8 | 9 | 10 | 11 |
| Ink receiving layer | Inorganic fine particles (P) | Type | alumina | alumina | alumina | alumina | alumina | alumina | alumina | alumina | alumina | alumina | alumina |
| | | Average particle diameter (nm) | 140 | 140 | 140 | 140 | 140 | 140 | 140 | 140 | 140 | 140 | 140 |
| | Type of water soluble resin (A) | | PVA | PVA | PVA | PVA | PVA | PVA | PVA | PVA | PVA | PVA | PVA |
| | Water dispersible resin (B) | Type | acryl | acryl | acryl | acryl | acryl | acryl | acryl | acryl | acryl | acryl | acryl |
| | | Tg (° C.) | 20 | −34 | 0 | 32 | 22 | 20 | 20 | 20 | 20 | 20 | 20 |
| | (A − B)/P | | 0.11 | 0.11 | 0.11 | 0.11 | 0.11 | 0.11 | 0.11 | 0.11 | 1 | 0.67 | 0.083 |
| | B/A | | 0.11 | 0.11 | 0.11 | 0.11 | 0.05 | 1.5 | 2.3 | 0.11 | 0.11 | 0.11 | 0.11 |
| Adhesive layer | Type | | — | — | — | — | — | — | — | — | — | — | — |
| | MFT (° C.) | | — | — | — | — | — | — | — | — | — | — | — |
| Base member | | | PP | PP | PP | PP | PP | PP | PP | PP | PP | PP | PP |
| Heat sealable layer | | | PP | PP | PP | PP | PP | PP | PP | PP | PP | PP | PP |
| Evaluation | Ink absorbability | | ⊙ | ○ | ⊙ | ⊙ | ⊙ | ⊙ | ○ | — | — | ○ | ⊙ |
| | Adhesiveness | | ○ | ○ | ○ | — | ○ | — | ○ | ○ | ○ | ○ | ○ |
| | Adhesion | | ○ | ○ | ○ | — | ○ | ○ | ○ | — | ○ | ○ | ○ |
| | Stickiness | | ○ | — | ○ | ○ | ○ | ○ | ○ | ○ | ○ | ○ | ○ |
| | Foldability | | — | — | — | — | — | — | — | — | — | — | — |

TABLE 3-2

| | | | Example 12 | 13 | 14 | 15 | 16 | 17 | 18 | 19 | 20 | 21 | 22 |
|---|---|---|---|---|---|---|---|---|---|---|---|---|---|
| Ink receiving layer | Inorganic fine particles (P) | Type | alumina | alumina | alumina | alumina | alumina | alumina | alumina | alumina | alumina | alumina | alumina |
| | | Average particle diameter (nm) | 140 | 140 | 140 | 140 | 140 | 140 | 140 | 140 | 140 | 140 | 140 |
| | Type of water soluble resin (A) | | PVA | PVA | PVA | PVA | PVA | PVA | PVA | PVA | PVA | PVA | PVA |
| | Water dispersible resin (B) | Type | acryl | acryl | acryl | acryl | acryl | acryl | acryl | acryl | acryl | acryl | acryl |
| | | Tg (° C.) | 20 | 20 | 20 | 20 | 20 | 20 | 20 | 20 | 20 | 20 | 20 |
| | | (A + B)/P | 0.11 | 0.11 | 0.11 | 0.11 | 0.11 | 0.11 | 0.11 | 0.11 | 0.11 | 0.11 | 0.11 |
| | | B/A | 0.11 | 0.11 | 0.11 | 0.11 | 0.11 | 0.11 | 0.11 | 0.11 | 0.11 | 0.11 | 0.11 |
| Adhesive layer | Type | | — | — | — | — | — | acryl | acryl | urethane | PP | urethane | acryl |
| | MFT (° C.) | | — | — | — | — | — | 18 | 0 | 5 | 0 | 23 | 30 |
| | Base member | | PP | PP | PP | PP | PP | PP | PP | PP | PP | PP | PP |
| | Heat sealable layer | | PP | PP | PP | PP | PP | PP | PP | PP | PP | PP | PP |
| Evaluation | Ink absorbability | | ◉ | Δ | ◉ | ◉ | ◉ | ◉ | ◉ | ◉ | ◉ | ◉ | ◉ |
| | Adhesiveness | | Δ | ○ | ○ | Δ | ○ | ○ | ○ | ○ | ○ | ○ | ○ |
| | Adhesion | | Δ | ○ | ○ | ○ | Δ | ○ | ○ | ○ | ○ | ○ | ○ |
| | Stickiness | | ○ | ○ | ○ | ○ | ○ | ○ | ○ | ○ | ○ | ○ | ○ |
| | Foldability | | Δ | Δ | Δ | Δ | Δ | ○ | ○ | ○ | ○ | Δ | Δ |

TABLE 3-3

| | | | Comparative Example 1 | 2 | 3 | 4 | 5 | 6 |
|---|---|---|---|---|---|---|---|---|
| Ink receiving layer | Inorganic fine particles (P) | Type | none | alumina | alumina | alumina | alumina | alumina |
| | | Average particle diameter (nm) | — | 140 | 140 | 140 | 140 | 140 |
| | Type of water soluble resin (A) | | PVA | none | PVA | PVA | PVA | PVA |
| | Water dispersible resin (B) | Type | acryl | acryl | none | acryl | acryl | urethane |
| | | Tg (° C.) | 20 | 20 | — | 20 | −39 | 43 |
| | | (A + B)/P | — | 0.11 | 0.11 | 0.11 | 0.11 | 0.11 |
| | | B/A | 0.11 | — | — | 0.11 | 0.11 | 0.11 |
| Adhesive layer | Type | | — | — | — | — | — | — |
| | MFT (° C.) | | — | — | — | — | — | — |
| | Base member | | PP | PP | PP | PP | PP | PP |
| | Heat sealable layer | | PP | PP | PP | none | PP | PP |
| Evaluation | Ink absorbability | | X | X | ◉ | ◉ | ○ | ◉ |
| | Adhesiveness | | ○ | ○ | X | X | ○ | X |
| | Adhesion | | ○ | X | ○ | ○ | ○ | X |
| | Stickiness | | ○ | ○ | ○ | ○ | X | ○ |
| | Foldability | | ○ | X | X | Δ | Δ | Δ |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2015-068370, filed Mar. 30, 2015, No. 2016-001682, filed Jan. 7, 2016 which are hereby incorporated by reference wherein in their entirety.

What is claimed is:

1. A printing sheet comprising:
a sheet-shaped base member;
an ink receiving layer disposed on a first surface of the base member and having a heat sealability; and
a heat sealable layer disposed on a second surface of the base member and made of a heat sealable resin material,
wherein the ink receiving layer comprises inorganic fine particles, a water soluble resin, and a water dispersible resin,
wherein the inorganic fine particles have an average particle diameter of 140 to 200 nm,
wherein the water dispersible resin has a glass transition temperature Tg satisfying the following expression (1),
wherein a content P (g) of the inorganic fine particles, a content A (g) of the water soluble resin, and a content B (g) of the water dispersible resin in the ink receiving layer simultaneously satisfy relations of the following expressions (2) and (3), and
wherein the ink receiving layer and the heat sealable layer are used so as to adhere to each other by thermal pressure bonding:

$$0° C. \leq Tg \leq 30° C., \tag{1}$$

$$A+B/P=0.08 \text{ to } 0.70, \text{ and} \tag{2}$$

$$B/A=0.1 \text{ to } 2.0 \tag{3}$$

2. The printing sheet according to claim 1, further comprising an adhesive layer disposed between the base member and the ink receiving layer.

3. The printing sheet according to claim 1, wherein the water dispersible resin differs from the heat sealable resin material in SP value by 0 or more but less than 2.

4. The printing sheet according to claim 1, wherein the heat sealable resin material is at least one of polyethylenes and polypropylenes.

* * * * *